US 8,213,497 B2

(12) United States Patent
Kobayashi et al.

(10) Patent No.: US 8,213,497 B2
(45) Date of Patent: Jul. 3, 2012

(54) MOVING IMAGE CONVERTING APPARATUS, MOVING IMAGE CONVERTING METHOD, AND COMPUTER PROGRAM

(75) Inventors: Seiji Kobayashi, Tokyo (JP); Yasutaka Hirasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1314 days.

(21) Appl. No.: 11/769,614

(22) Filed: Jun. 27, 2007

(65) Prior Publication Data
US 2008/0279282 A1 Nov. 13, 2008

(30) Foreign Application Priority Data

Jul. 4, 2006 (JP) ................. 2006-184973

(51) Int. Cl.
*H04B 1/66* (2006.01)
*H04N 7/12* (2006.01)
*G06K 9/36* (2006.01)
(52) U.S. Cl. ............ 375/240; 375/240.16; 382/236
(58) Field of Classification Search .......... None
See application file for complete search history.

(56) References Cited

U.S. PATENT DOCUMENTS

| | | | | |
|---|---|---|---|---|
| 6,104,753 A * | 8/2000 | Kim et al. | ........ | 375/240.16 |
| 2002/0075959 A1 * | 6/2002 | Dantwala | ........ | 375/240.16 |
| 2004/0036807 A1 * | 2/2004 | Takahashi et al. | ........ | 348/700 |
| 2005/0025244 A1 * | 2/2005 | Lee et al. | ........ | 375/240.16 |
| 2005/0259740 A1 | 11/2005 | Kobayashi et al. | | |
| 2006/0023089 A1 | 2/2006 | Kobayashi | | |
| 2006/0120612 A1 * | 6/2006 | Manjunath et al. | ........ | 382/236 |

FOREIGN PATENT DOCUMENTS

| | | |
|---|---|---|
| JP | 2005-198268 | 7/2005 |
| JP | 2006-5904 | 1/2006 |
| WO | WO 98/33315 | 7/1998 |
| WO | WO 00/10129 | 2/2000 |

* cited by examiner

*Primary Examiner* — Shin-Hon Chen
(74) *Attorney, Agent, or Firm* — Finnegan, Henderson, Farabow, Garrett & Dunner, L.L.P.

(57) ABSTRACT

A moving image converting apparatus includes: a block dividing unit executing block division processing for each of frames that form the moving image data; a motion amount detecting unit detecting a block motion amount corresponding to a motion amount of an object contained in each of blocks obtained; a line-of-sight motion amount detecting unit calculating a line-of-sight motion amount of a viewer who views the moving image data; a sampling point phase change amount determining unit receiving the block motion amount and the line-of-sight motion amount as input, and determining a block-corresponding sampling point phase change amount to be applied to spatial decimation processing on each of the blocks; and a decimation executing unit receiving the blocks obtained as input, executing the spatial decimation processing on the inputted blocks, the spatial decimation processing being executed by applying the block-corresponding sampling point phase change amount determined.

13 Claims, 62 Drawing Sheets

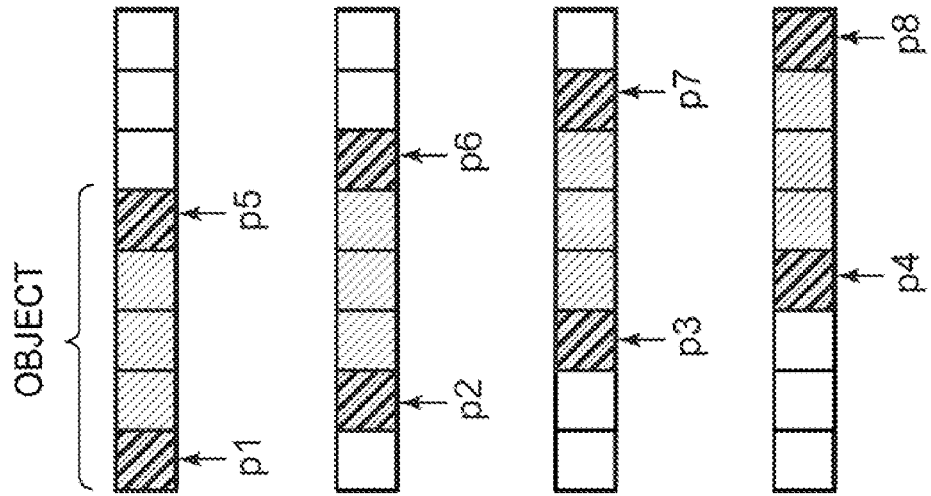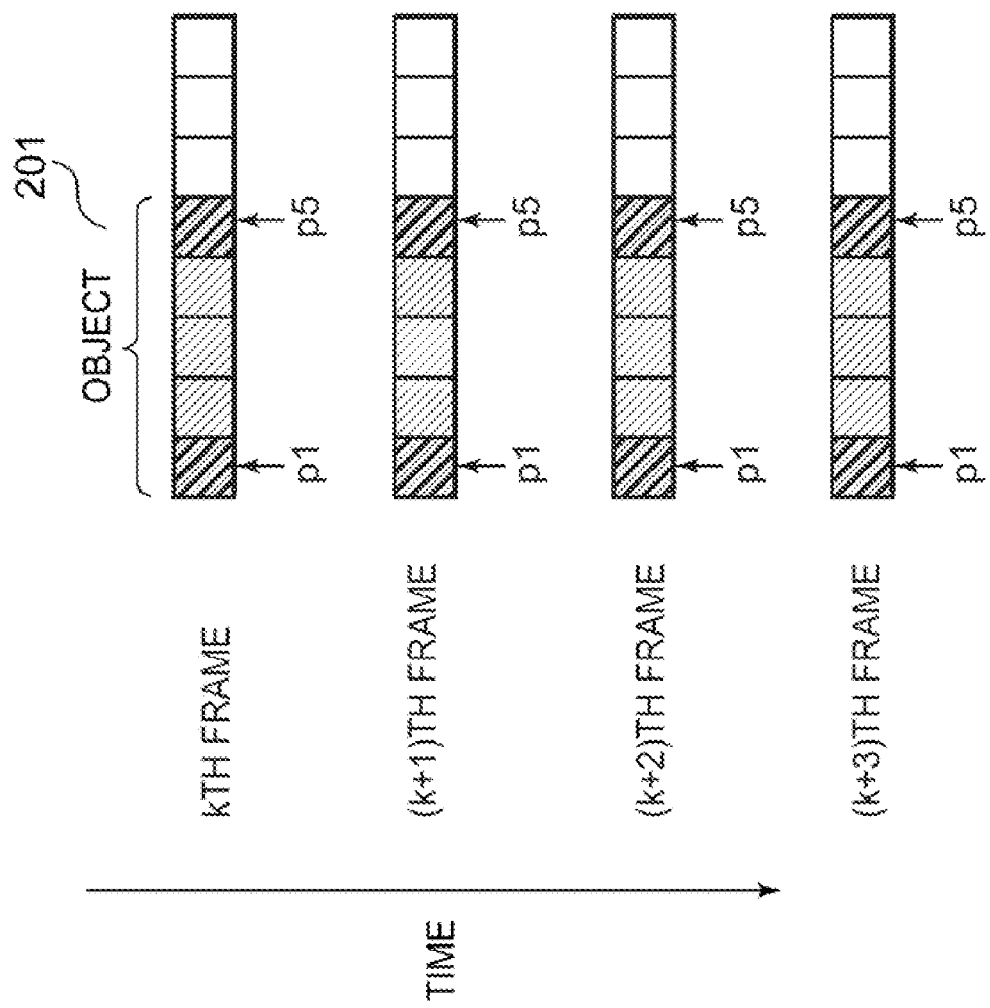

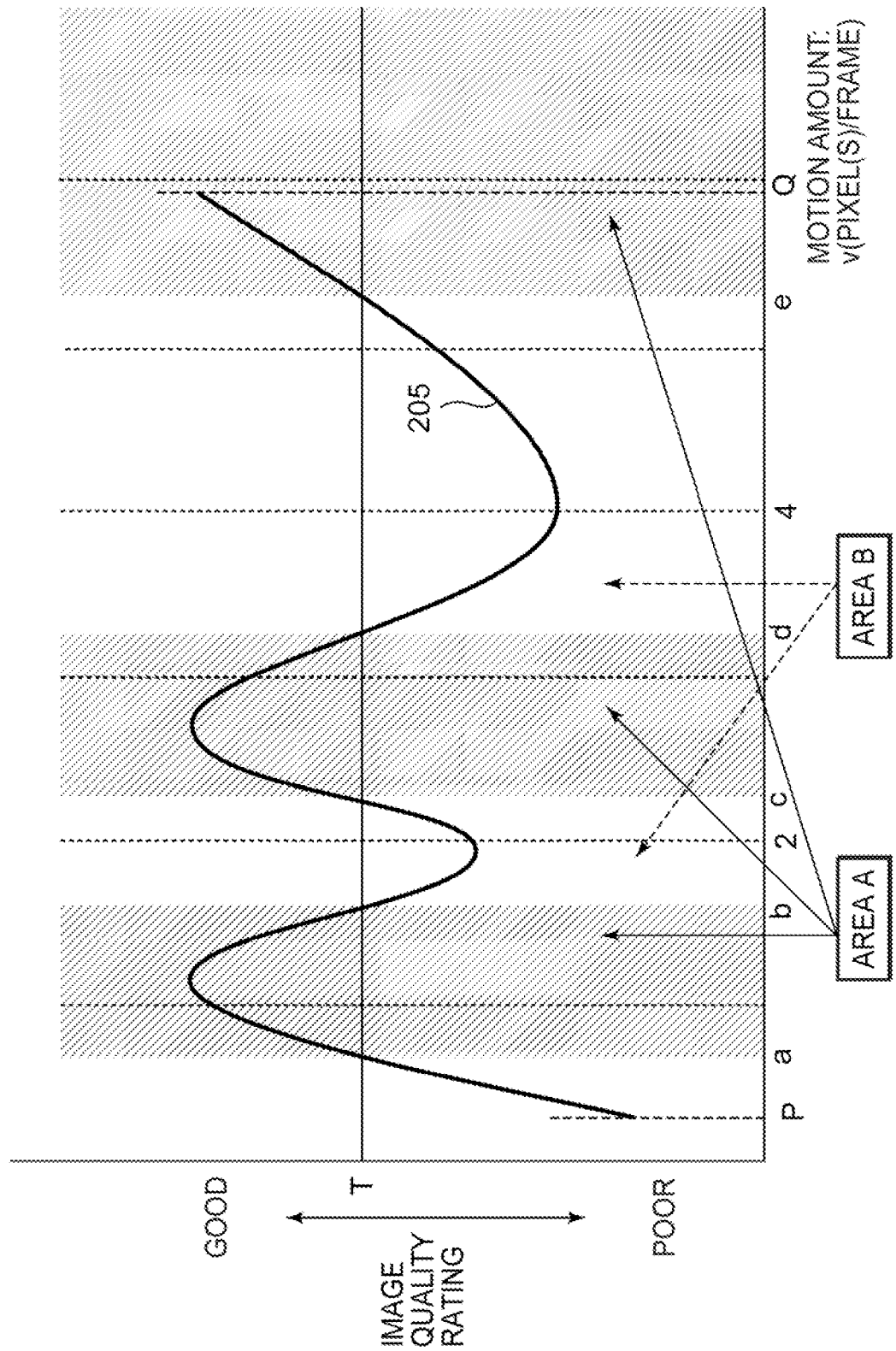

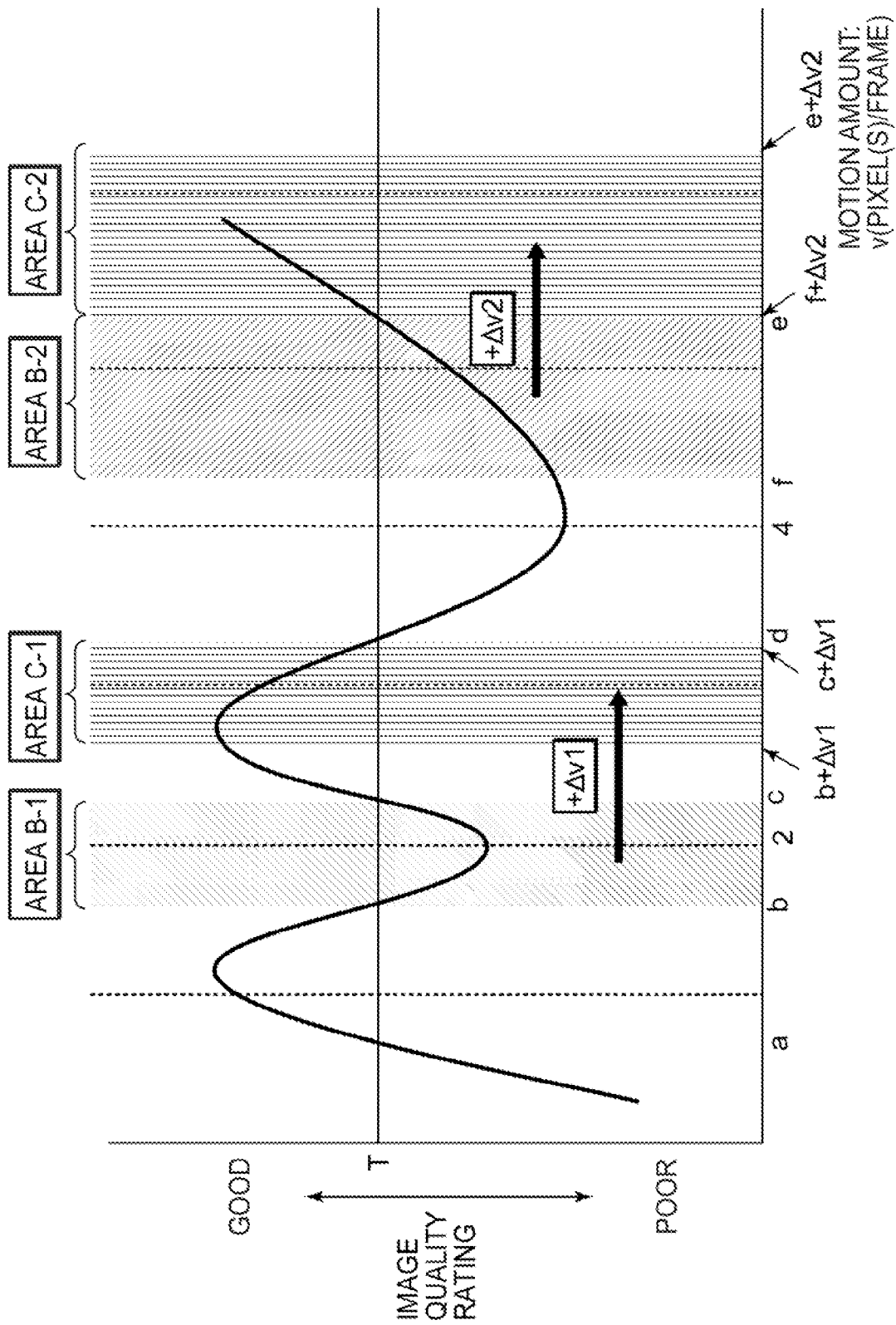

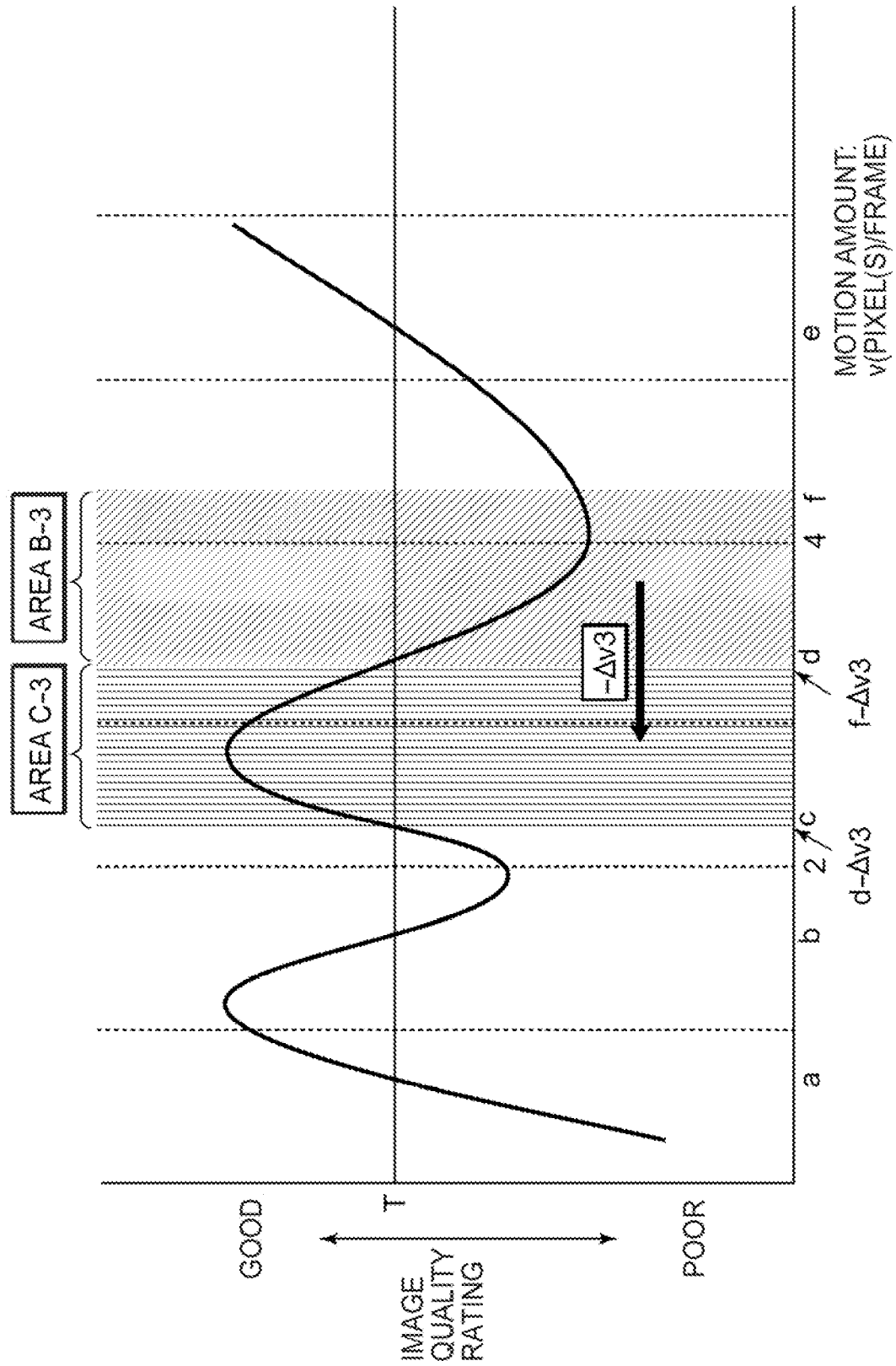

FIG. 11

| | MOTION VELOCITY:v (PIXEL(S)/FRAME) | MOTION DIRECTION | DECIMATION PROCESSING MODE | | |
|---|---|---|---|---|---|
| (a) | $2 \leq v < c$ | RIGHT | DECIMATION PROCESSING FOR MOVING SAMPLING POINT POSITION TO RIGHT AS FORWARDING FRAME (VIRTUAL ACCELERATION) SAMPLING POINT PHASE CHANGE AMOUNT = [+n] | FIG. 5 | FROM AREA B-1 TO AREA C-1 OF FIG. 9 |
| (b) | $f \leq v < e$ | LEFT | DECIMATION PROCESSING FOR MOVING SAMPLING POINT POSITION TO LEFT AS FORWARDING FRAME (VIRTUAL ACCELERATION) SAMPLING POINT PHASE CHANGE AMOUNT = [-n] | FIG. 4 | FROM AREA B-2 TO AREA C-2 OF FIG. 9 |
| (c) | $2 \leq v < c$ | LEFT | DECIMATION PROCESSING FOR MOVING SAMPLING POINT POSITION TO LEFT AS FORWARDING FRAME (VIRTUAL DECELERATION) SAMPLING POINT PHASE CHANGE AMOUNT = [-n] | FIG. 4 | FROM AREA B-1 TO AREA C-1 OF FIG. 9 |
| (d) | $f \leq v < e$ | RIGHT | DECIMATION PROCESSING FOR MOVING SAMPLING POINT POSITION TO RIGHT AS FORWARDING FRAME (VIRTUAL DECELERATION) SAMPLING POINT PHASE CHANGE AMOUNT = [+n] | FIG. 5 | FROM AREA B-2 TO AREA C-2 OF FIG. 9 |
| (e) | $d \leq v < f$ | RIGHT | | FIG. 4 | |
| (f) | $d \leq v < f$ | LEFT | | FIG. 5 | FROM AREA B-3 TO AREA C-3 OF FIG. 10 |
| (g) | MOTION VELOCITIES OTHER THAN ABOVE $c \leq v < d$ $e \leq v$ | LEFT/RIGHT | DECIMATION PROCESSING FOR NOT MOVING SAMPLING POINT POSITION AS FORWARDING FRAME SAMPLING POINT PHASE CHANGE AMOUNT = [0] | FIG. 3 | AREA A OF FIG. 8 |

MOVING IMAGE CONVERTING APPARATUS, MOVING IMAGE CONVERTING METHOD, AND COMPUTER PROGRAM

BACKGROUND OF THE INVENTION

1. Field of the Invention

The present invention relates to a moving image converting apparatus, a moving image converting method, and a computer program. Particularly, in data conversion executed as data compression processing of moving image data, the invention relates to a moving image converting apparatus, a moving image converting method, and a computer program, which enable high-quality data conversion by suppressing image quality degradation, and also realizing compression that enables playback of high-quality images by performing compression processing in accordance with motion of the viewer's line of sight on played-back data.

2. Description of Related Art

Moving image data is converted, i.e., compressed to reduce its amount, for storage on a storage medium such as a hard disk or a DVD, or for distribution via a network. Particularly, with recent progress in quality enhancement for moving image data, such as high-definition data, the volume of data is drastically increasing. Under such circumstances, many discussions and studies are under way on technology regarding compression efficiency improvement in the processing of compressing/reconstructing moving image data, and quality degradation prevention for the reconstructed data.

Compression processing method for moving image data include, e.g., processing of decimating pixels forming image frames of moving image data, i.e., spatial decimation, and processing of decimation in terms of frame rate, i.e., temporal decimation.

Data reduction based on such data conversion provides an advantage that transmission of data for storage into a storage medium or via a network is performed efficiently. However, reconstruction of compressed data addresses a problem of image quality degradation. Particularly, when original data is a high-definition image, ins quality degradation becomes noticeable.

How such image quality degradation is reduced has been discussed variously. For example, Japanese Patent Application Publication No. 2005-198268 (Patent Reference 1) discloses an image compression processing configuration in which spatial, pixel decimation and temporal pixel decimation are switched according to the magnitude of the motion velocity of an object. Furthermore, Japanese Patent Application Publication No. 2006-5904 (Patent Reference 2) discloses a compress ion processing configuration in which sampling point phase changing processing according to the motion velocity of an object is added to the processing disclosed in Patent Reference 1, in spatial pixel decimation.

SUMMARY OF THE INVENTION

As described above, some of the related art disclose a configuration in which different processing is performed for each of areas of an image according to the motion velocity of an object, whereby image quality degradation due to decimation-based compression processing is suppressed to enhance data quality. However, to view a played-back image, which is reconstructed from compressed image data generated by application of the hitherto disclosed compression methods, as a high-quality image, it has been a condition that the line of sight of a viewer who is viewing the played-back image is tracking or following the motion of an object appearing in the moving image (smooth pursuit).

Typically, a plurality of objects are contained in moving image data. Namely, there usually is a mixture of objects in different motions, such as an object with large motion, a object with small motion, and a stationary object. It is hard for the viewer to follow all such different motions simultaneously. Therefore, there is an issue such that the viewer, following the motion of a certain object, can obtain good visual information about that object, but for the other objects, he cannot obtain good visual information.

Accordingly, it is desirable to provide a moving image converting apparatus, a moving image converting method, and/or a computer program, which enable compression with the least or small image quality degradation, by determining an optimal compression processing mode corresponding to the motion of an object and the motion of the viewer's line of sight for each of areas of an image, and performing data conversion optimal for each of the areas according to the determined mode . The present invention has been made in view of such circumstances.

A first aspect, of the present invention is to provide a moving image converting apparatus executing data conversion processing of moving image data, which includes:

a block dividing unit executing block division processing for each of frames that form the moving image data;

a motion amount detecting unit detecting a block motion amount corresponding to a motion amount of an object contained in each of blocks obtained by the block division processing in the block dividing unit;

a line-of-sight motion amount detecting unit calculating a line-of-sight motion amount of a viewer who views the moving image data;

a sampling point phase change amount determining unit receiving the block motion amount and the line-of-sight motion amount as input, and determining a block-corresponding sampling point phase change amount to be applied to spatial decimation processing on each of the blocks; and a decimation executing unit receiving the blocks obtained by the block division processing in the block dividing unit as input, executing the spatial decimation processing on the inputted blocks, the spatial decimation processing being executed by applying the block-corresponding sampling point phase change amount determined by the sampling point phase change amount determining unit.

Furthermore, in an embodiment of the moving image converting apparatus of the present invention, the line-of-sight motion amount detecting unit calculates the line-of-sight motion amount corresponding to each of the blocks obtained by the block division processing in the block dividing unit. Specifically, among block motion amounts, a block motion amount having a higher occurrence is calculated as the line-of-sight motion amount, the block motion amounts corresponding to blocks contained in a block expansion area which is an area up to which a block for calculation of the line-of-sight motion amount is expanded, and the block expansion area containing the block for calculating the line-of-sight motion amount.

In another embodiment of the moving image converting apparatus of the present invention, the line-of-sight motion amount detecting unit calculates the line-of-sight motion amount by analyzing a line of sight of a viewer who views a moving image for processing.

In another embodiment of the moving image converting apparatus of the present invention, the sampling point phase change amount determining unit executes sampling point phase change amount determination processing to which image quality rating curves as results of measurement of image quality rating corresponding to various values of the block motion amounts are applied, and the block-corresponding sampling point phase change amount is determined by selecting a sampling point phase change amount which corresponds to a rating equal to or above a preset reference rating.

In another embodiment of the moving image converting apparatus of the present invention, the sampling point phase change amount determining unit executes a first step processing of selecting sampling point phase change amount candidates that obtain the ratings equal to or above the preset reference rating in the image quality rating curves on the basis of the block motion amount, and a second step processing of analyzing the sampling point phase change amount candidates selected in the first step processing to check if pixel inversion is caused or not in an image perceived by the viewer who views a played-back image obtained by reconstructing an image converted by the moving image converting apparatus, whereby to select a sampling point phase change amount that does not cause the pixel inversion in the perceived image.

In another embodiment of the moving image converting apparatus of the present invention, in the selecting the sampling point phase change amount that does not cause the pixel inversion in the perceived image, the sampling point phase change amount determining unit executes determination processing to which the block motion amount, the line-of-sight motion amount, and a sampling point phase change amount in a retina coordinate system are applied.

In another embodiment of the moving image converting apparatus of the present invention, the sampling point phase change amount determining unit executes processing of determining a sampling point phase change amount for one of 0 to (M−1), if the spatial decimation processing executed by the decimation executing unit is 1/M decimation processing for reducing the number of pixels to 1/M.

In another embodiment of the moving image converting apparatus of the present invention, the decimation processing unit determines a decimation processing mode on the basis of a horizontal motion amount Vx and a vertical motion amount Vy of the block obtained from block motion amount information inputted from the motion amount detecting unit, and a preset threshold Vt, and executes pixel decimation processing in a horizontal direction
if Vx>Vy and Vx>Vt,
executes pixel decimation processing in a vertical direction
if Vy>Vx and Vy>Vt,
executes no spatial pixel decimation processing
if both Vx and Vy are below Vt.

A second aspect of the present invention is to provide a moving imago converting method for executing data conversion processing of moving image data in a moving image converting apparatus, which includes:

executing block division processing for each of frames that form the moving image data, in a block dividing unite detecting a block motion amount corresponding to a motion amount of an object contained in each of blocks obtained by the block division processing in the block dividing unit, in a motion amount detecting unit;

calculating a line-of-sight motion amount of a viewer who views the moving image data, in a line-of-sight motion amount detecting unit;

receiving the block motion amount and the line-of-sight motion amount as input, and determining a block-corresponding sampling point phase change amount applied to spatial decimation processing on each of the blocks, in a sampling point phase change amount determining unit; and receiving the blocks obtained by the block division processing in the block dividing unit as input, executing the spatial decimation processing on the inputted blocks, and executing the spatial decimation processing to which the block-corresponding sampling point phase change amount determined by the sampling point phase change amount determining unit is applied, in a decimation processing unit.

In another embodiment of the mooing image converting method of the present invention, in the line-of-sight motion amount detecting, the line-of-sight motion amount corresponding to each of the blocks obtained by the block division processing in the block dividing unit is calculated, and among block motion amounts, a block motion amount having a higher occurrence is calculated as the line-of-sight motion amount, the block motion amounts corresponding to blocks contained in a block expansion area which is an area up to which a block for calculation of the line-of-sight motion amount is expanded, and the block expansion area containing the block for calculating the line-of-sight motion amount.

In another embodiment of the moving image converting method of the present invention, in the line-of-sight motion amount detecting, the line-of-sight motion amount is calculated by analyzing a line of sight of a viewer who views a moving image for processing.

In another embodiment of the moving image converting method of the present invention, in the sampling point phase change amount determining, sampling point phase change amount determination processing is executed, the sampling point phase change amount determination processing being processing to which image quality rating curves as results of measurement of image quality rating corresponding to various values of the block motion amounts are applied, and the block-corresponding sampling point phase change amount is determined by selecting a sampling point phase change amount which corresponds to a rating equal to or above a preset reference rating.

In another embodiment of the moving image converting method of the present invention, in the sampling point phase change amount determining, a first step processing and a second step processing are executed. The first step processing selects sampling point phase change amount candidates that obtain the ratings equal to or above the preset reference rating in the image quality rating curves on the basis of the block motion amount, and the second step processing analyzes the sampling point phase change amount candidates selected in the first step processing to check if pixel inversion is caused or not in an image perceived by the viewer who views a played-back image obtained by reconstructing an image converted by the moving image converting apparatus, whereby to select a sampling point phase change amount that does not cause the pixel inversion in the perceived image.

In another embodiment of the moving image converting method of the present invention, in the selecting the sampling point phase change amount that does not cause the pixel inversion in the perceived image, the sampling point phase change amount determining executes determination processing to which the block motion amount, the line-of-sight motion amount, and a sampling point phase change amount in a retina coordinate system are applied.

In another embodiment of the moving image converting method of the present invention, in the sampling point phase change amount determining, processing of determining a sampling point phase change amount is executed for one of 0 to (M−1), if the spatial decimation processing executed by the decimation executing unit is 1/M decimation processing for reducing the number of pixels to 1/M.

In another embodiment of the moving image converting method of the present invention, in the decimation processing, a decimation processing mode is determined on the basis of a horizontal motion amount Vx and a vertical motion amount Vy of the block obtained from block motion amount information inputted from the motion amount detecting unit, and a preset threshold Vt, and the pixel decimation processing is executed in a horizontal direction if Vx>Vy and Vx>Vt, the pixel decimation processing is executed in a vertical direction if Vy>Vx and Vy>Vt, no spatial pixel decimation processing is executed if both Vx and Vy are below Vt.

A third aspect of the present invention is to provide a computer program for causing a moving image converting apparatus to execute data conversion processing of moving image data, which includes:

a block dividing step of executing block division processing for each of frames that form the moving image data, in a block dividing unit;

a motion amount detecting step of detecting a block motion amount corresponding to a motion amount of an object contained in each of blocks obtained by the block division processing in the block dividing unit, in a motion amount detecting unit;

a line-of-sight motion amount detecting step of calculating a line-of-sight motion amount of a viewer who views the moving image data, in a line-of-sight motion amount detecting unit;

a sampling point phase change amount determining step of receiving the block motion amount and the line-of-sight motion amount as input, and determining a block-corresponding sampling point phase change amount applied to spatial decimation processing on each of the blocks, in a sampling point phase change amount determining unit; and a decimation executing step of receiving the blocks obtained by the block division processing in the block dividing unit as input, executing the spatial decimation processing on the inputted blocks, and executing the spatial decimation processing to which the block-corresponding sampling point phase change amount determined by the sampling point phase change amount determining unit is applied, in a decimation processing unit.

It should be noted that the computer program of the present invention is a computer program that can be provided by a storage medium, a communication medium, e.g., a storage medium such as a CD or an FD, an MO, or a communication medium such as a network, provided in a computer-readable form to, e.g., a general-purpose computer system that can execute various program codes. By providing such a program in a computer-readable form, processing according to the program is realized on the computer system.

Further objects, features and advantages of the present invention will become apparent from a more detailed description that is based on later-described embodiments of the present invention and accompanying drawings. It should be noted that the system used in the present specification means a logical set configuration of a plurality of apparatuses, and is not limited to one wherein apparatuses each having its own configuration are grouped within the same enclosure.

According to an embodiments of the present invention, it determines an optimal compression processing mode corresponding to the motion of an object within an image and to the motion of the viewer's line of sight, and perform data conversion processing in the optimal mode for each of areas according to the determined mode. Therefore, data reduction processing is enabled independently of the motion of the viewer's line of sight and with extremely small imago quality degradation.

According to an embodiments of the present invention, it is configured to detect an object motion amount (block motion amount [Vs]) and a line-of-sight motion amount [Ve] in each of blocks forming moving image data, determine a sampling point phase change amount [Vp] on the basis of the detected object motion amount and line-of-sight motion amount, and execute spatial decimation processing by applying the determined sampling point phase change amount [Vp]. Therefore, when the viewer views the object by following its motion, the super-resolution effect can be induced, and even when the viewer does not view the object by following its motion, change in the arrangement of pixels forming the image can be minimized, whereby data conversion is realised in which image quality degradation is suppressed.

Furthermore, according to an embodiment of the present invention, it is configured, in spatial decimation processing with a decimation amount M, to select a plurality of optimal sampling point phase change amount candidates for obtaining image quality ratings which are equal to or greater than a preset reference rating with respect to the motion velocity of a block for processing under a motion-following viewing condition, using mapping data between the object motion velocity (or motion amount) and the image quality rating, which is generated on the basis of decimated data obtained by decimation processing with sampling point phase change amounts ranging from 0 to M−1, and to further select an optimal sampling point phase change amount for a non-motion-following viewing condition, from among the candidates. Therefore, data conversion is realized which enables presentation of high-quality images corresponding to various motion amounts of a block for processing and various line-of-sight motions of a viewer.

BRIEF DESCRIPTION OF THE DRAWINGS

FIG. 7 is a diagram explaining a state in which an object is not moving and a state in which an object is moving in a horizontal direction at a velocity v=1 pixel/frame;

FIG. 8 is a diagram showing an image quality rating curve as a graph showing a tendency of the results of a subjective image quality rating test in function of the motion amount of an object;

FIG. 9 is a diagram explaining correspondence between the setting of virtual motion velocities and an imago quality rating curve in sampling point moving type decimation processing;

FIG. 10 is a diagram explaining correspondence between the setting of a virtual motion velocity and an image quality rating curve in sampling point moving type decimation processing;

FIG. 11 is a diagram explaining an example in which a decimation processing mode is determined on the basis of motion amount information from a motion amount detecting section;

DETAIL DESCRIPTION OF EMBODIMENTS

Configurations of a moving image converting apparatus, a moving image converting method, and/or a computer program, according to embodiments of the present invention will be described below with reference to the drawings. The description is given according to the following items:

(1) Basic configuration, of moving imago converting apparatus utilizing super-resolution effect; and (2) Configuration of moving image converting apparatus for executing improved decimation processing.

(1) Basic Configuration of Moving Image Converting Apparatus Utilizing Super-Resolution Effect First, a description will be given of the basic configuration of a moving image converting apparatus utilizing a super-resolution effect, which serves as the base of the present invention. This basic eon figuration is disclosed in detail in Japanese Patent Application Publication No. 2006-5904 filed earlier by the present applicant. This is a configuration that has realized data compression by dividing an image into small areas and adaptively performing pixel decimation or frame decimation according to the motion velocity of each of the areas.

Figure 1:
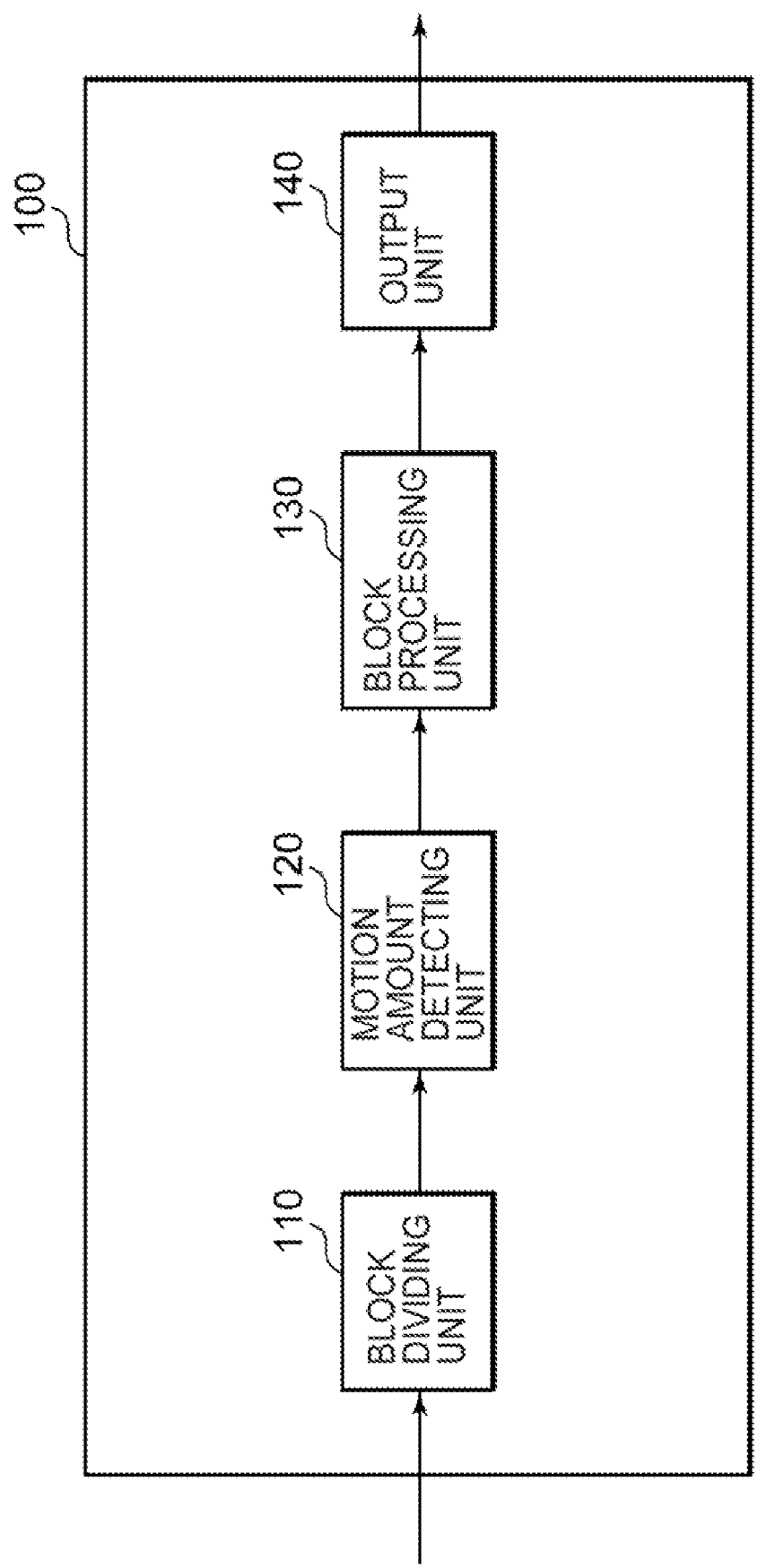
FIG. 1 is a diagram showing a basic configuration of a moving image converting apparatus for executing data conversion utilizing a super-resolution effect.

A configuration example of a moving image converting apparatus 10 disclosed in Japanese Patent Application Publication Mo. 2006-5904 is shown in FIG. 1. This moving imago converting apparatus 10 is configured to perform moving image conversion processing that utilizes the super-resolution effect, whereby data reduction can be performed in which a viewer does not perceive image quality degradation due to the data reduction.

It should be noted that the super-resolution effect means a visual effect occurring on the basis of a visual characteristic that a viewer perceives an image obtained by adding a plurality of images in a certain time. When a human perceives a stimulus, his vision has a function (called "sensory memory function") of memorizing the stimulus for a certain time after his exposure to the stimulus ends. There are many reports that the time lasts 10 ms to 200 ms. This function is also called "iconic memory", "visual duration" or the like, and is described, e.g., in "Visual Information Handbook" (pages 229-230) edited by Vision Society of Japan. Note further that the super-resolution effect is considered to be induced by a complicated relation between a temporal integration function and the sensory memory function in the human visual functions.

A configuration example of a moving image converting apparatus 100 described in Japanese Patent Application Publication No. 2006-590-5 is shown in FIG. 1. This moving image converting apparatus 100 is configured to per form moving image conversion processing utilizing the super-resolution effect, whereby data reduction can be performed in which a viewer does not perceive image quality degradation due to the data reduction.

It should be noted that the super-resolution effect is a visual effect occurring on the basis of a visual characteristic that a viewer perceives an image obtained by adding a plurality of images in a certain time. The vision of a human has a function (hereinafter called "temporal integration function") of perceiving light when the sum total of optical stimuli to which he is exposed equals a certain threshold. Namely, the perception of light depends on the sum total of temporally integrated light, independently of the distribution of the optical stimuli within, the exposed time. Furthermore, the stimulus (threshold) by which light is perceived decreases with increasing exposed time, and increases with decreasing exposed time. Details of the temporal integration function are described, e.g., in "visual Information Handbook" (pages 229-230) edited by Vision Society of Japan.

The moving image converting apparatus 100 shown in FIG. 1 is configured to per form moving image conversion processing utilising the super-resolution effect induced by the temporal integration function, whereby data is compressed for reduction such that a viewer will not perceive image quality degradation.

The configuration of the moving image converting apparatus 100 of FIG. 1 will be described. A block dividing unit 110 divides each of frames of an inputted moving image into blocks, for supply to a motion amount detecting unit 120. The motion amount detecting unit 120 detects a motion amount for each of the blocks supplied thereto from the block dividing unit 110, and transmits the blocks and their motion amounts to a block processing unit 130. The block processing unit 130 performs moving image conversion processing on the blocks supplied thereto from the motion amount detecting unit 120 according to their motion amounts, to reduce their data amounts. The block processing unit 130 supplies data on the thus data-reduced blocks, for supply to an output unit 140. The output unit 140 outputs the data on the data-reduced blocks supplied thereto from the block processing unit 130, collectively as, e.g., stream data.

Figure 2:
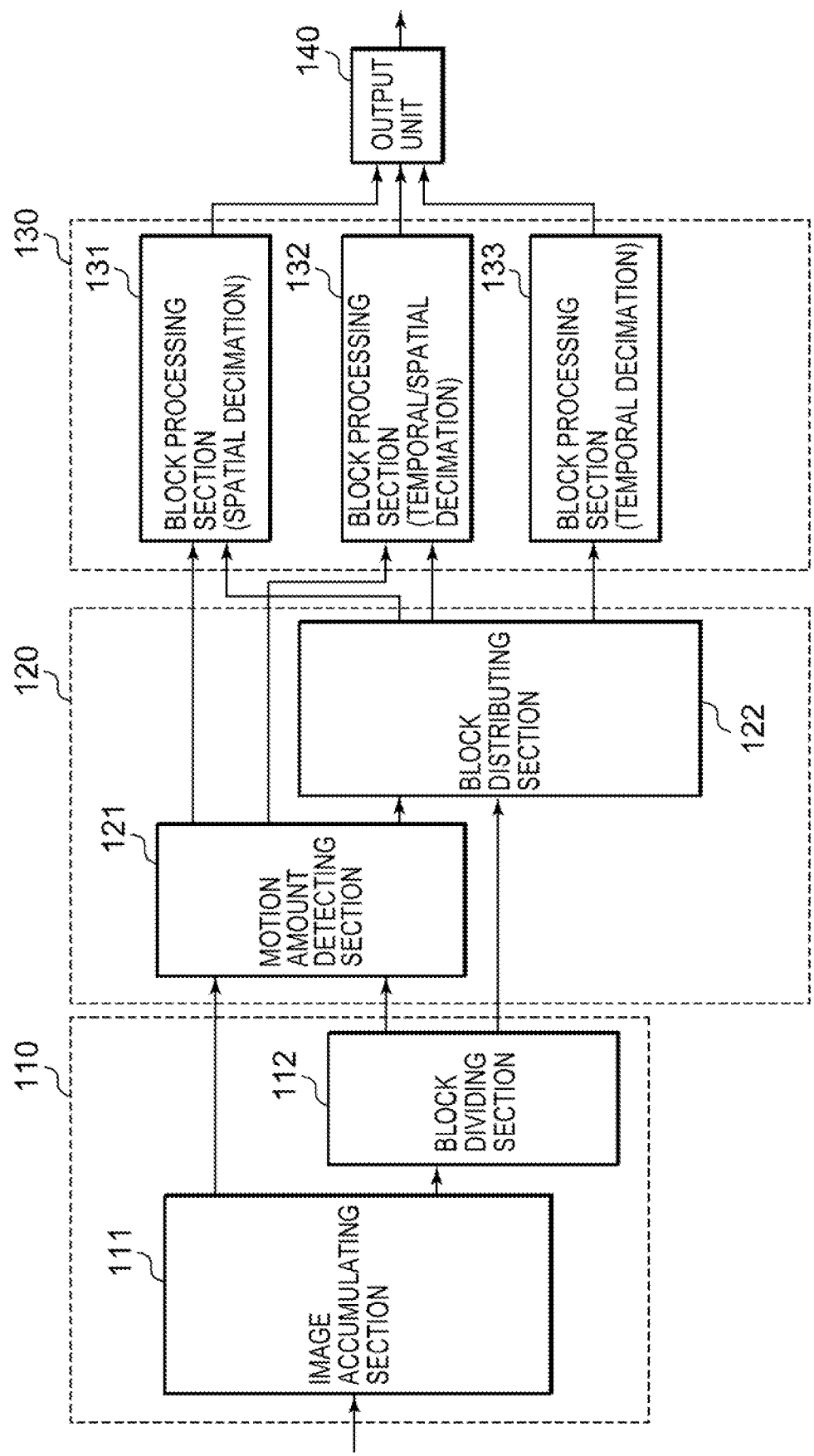
FIG. 2 is a diagram showing a detailed configuration of the moving image converting apparatus for executing data conversion utilizing the super-resolution effect.

Referring next to FIG. 2, details of the various units of the apparatus will be described. First, the block dividing unit 110 will be described. Frames of a moving image supplied to the moving image converting apparatus 100 are inputted to an image accumulating section 111 of the block dividing unit 110. The image accumulating section 111 accumulates the inputted frames. The image accumulating section 111 supplies N accumulated frames (N is a positive integer) at a time to the block dividing section 112, and supplies a frame (hereinafter called "Mth frame") being an Mth frame stored in a sequence of the N frames, to a motion amount detecting section 121 of the motion amount detecting unit 120. For example, N=4.

The block dividing section 112 divides each of the N frames (successive R frames) supplied thereto from the image accumulating section 111 into blocks each having a certain size (e.g., 8×8 or 16×16), for output to a block distributing section 122 of the motion amount detecting unit 120. The block dividing section 112 also supplies blocks corresponding to a frame (hereinafter called "Pth frame") being a Pth frame in a sequence of the N frames accumulated by the image accumulating section 111, to the motion amount detecting section 121 of the motion amount detecting unit 120. The Pth frame is a frame different from the Mth frame.

Next, the motion amount detecting unit 120 will be described. The motion amount detecting section 121 of the motion amount detecting unit 120 detects a motion vector of each of the blocks in the Pth frame supplied thereto from the block dividing section 112 of the block dividing unit 110 by performing, e.g., inter-frame block matching processing through referencing the Mth frame supplied thereto from the image accumulating section 111, and supplies the detected motion vectors to the block distributing section 122, and block processing sections 131 and 132. A motion vector represents a horizontal (X-axis) motion amount and a vertical (Y-axis) motion amount between frames. For example, if a referenced frame M=2 and a supplied frame P=3, the motion vector represents the horizontal (X-axis) and vertical (Y-axis) motion amounts with respect to a single frame. It should be noted that the detection of motion vectors may be performed not only by block matching but also by other methods.

The block distributing section 122 of the motion amount detecting unit 120 is supplied with blocks in units of N blocks (a total of N blocks each staying at the same position in the corresponding one of the N frames), from the block dividing section 112, and is supplied with the motion amounts of a block corresponding to the Pth frame among these N blocks, from the motion amount detecting section 121. The block distributing section 122 supplies the N blocks to one of the block processing sections 131 to 133 (hereinafter simply called "block processing unit 130" unless otherwise required to be individually distinguished) which performs processing corresponding to their motion amounts.

Specifically, the block distributing section 122 outputs the N blocks supplied thereto from the block dividing section 112, to the block processing section 131, if a larger one of the horizontal (X-axis) and vertical (Y-axis) motion amounts with respect to a single frame is 2 pixels/frame or more. Also, the block distributing section 122 outputs the N blocks to the block processing section 132, if the larger one of the horizontal (X-axis) and vertical (Y-axis) motion amounts with respect to a single frame is less than 2 pixels/frame and is 1 pixel/frame or more. If their motion amount takes other values, the block distributing section 122 supplies the N blocks to the block processing section 133.

Namely, the block distributing section 122 outputs the blocks for processing according to (a) to (c) mentioned below, Namely, (a) Motion amount≧2 pixels/frame: Block processing section 131 (spatial decimation processing)
(b) 2 pixels/frame>motion amount≧1 pixel/frame: Block processing section 132 (temporal/spatial decimation processing)
(c) 1 pixel/frame>motion amount: Block processing section 133 (temporal decimation processing)

If the motion amount≧2 pixels/frame, spatial decimation processing is executed by the block processing section 131. If 2 pixels/frame>the motion amount≧1 pixel/frame, temporal/spatial decimation processing is executed by the block processing section 132. If 1 pixel/frame>the motion amount, temporal decimation processing is executed by the block processing section 133.

Thus, the block distributing section 122 performs processing of determining a frame rate and a space resolution optimal for conversion on the basis of the motion amounts supplied thereto from the motion amount detecting section 121, and distributing block images to the block processing sections 131 to 133 which performs image data conversion processing according to the frame rate and the space resolution. It should be noted that the above conditions for determining a distribution destination are merely an example. The distribution destination may be determined on other conditions as well.

Next, the block processing unit 130 will be described. The block processing unit 130 includes the three block processing sections 131 to 133 in this example.

The block processing section 131 performs the processing (spatial decimation processing) of decimating a specific number of pixels according to a larger one of the horizontal and vertical motion amounts supplied thereto from the motion amount detecting section 121, on a total of N blocks (N blocks in each of which the horizontal or vertical motion amount is 2 pixels/frame or more) each staying at the same position in the corresponding one of the successive N frames, supplied thereto from the block distributing section 122 of the motion amount detecting unit 120. Namely, the block processing section 131 executes spatial decimation processing on N blocks each having a motion amount≧2 pixels/frame.

Figure 3:
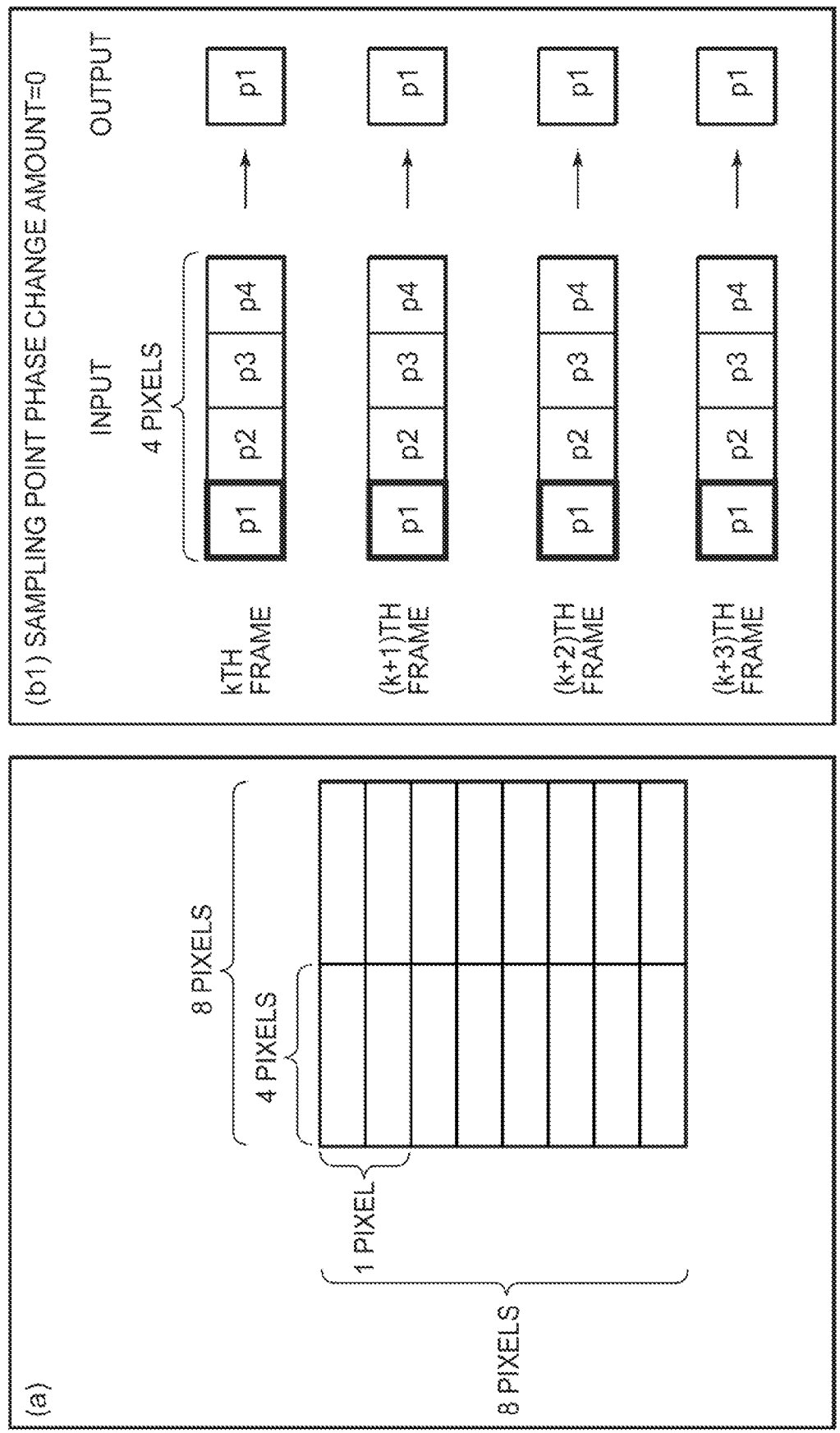
FIG. 3 is a diagram explaining processing by a block processing unit in the moving image converting apparatus.

If the horizontal motion amount with respect to a single frame is 2 pixels/frame or more, the block processing section 131 divides, e.g., 8×8 pixels within a block into a set of groups with a unit of 1×4 pixels as shown in FIG. 3 (a).

Furthermore, the block processing section 131 performs pixel decimation processing (pixel decimation for 4 pixels) (decimation with a decimation amount of 4) in which the pixel values p1 to p4 of 1×4 pixels in each group are replaced with one of them in one of modes shown in FIGS. 3 (b1), 4 (b2) and 5 (b3).

Decimation processing shown in FIG. 3 (b1) is processing in which the value of a pixel staying at the same pixel position in each of all the successive N frames (k to k+3) is set as a pixel value representing the 4 pixels, i.e., as a representative pixel value or a sampling point (sampling point p1 in an example of FIG. 3 (b1)).

Figure 4:
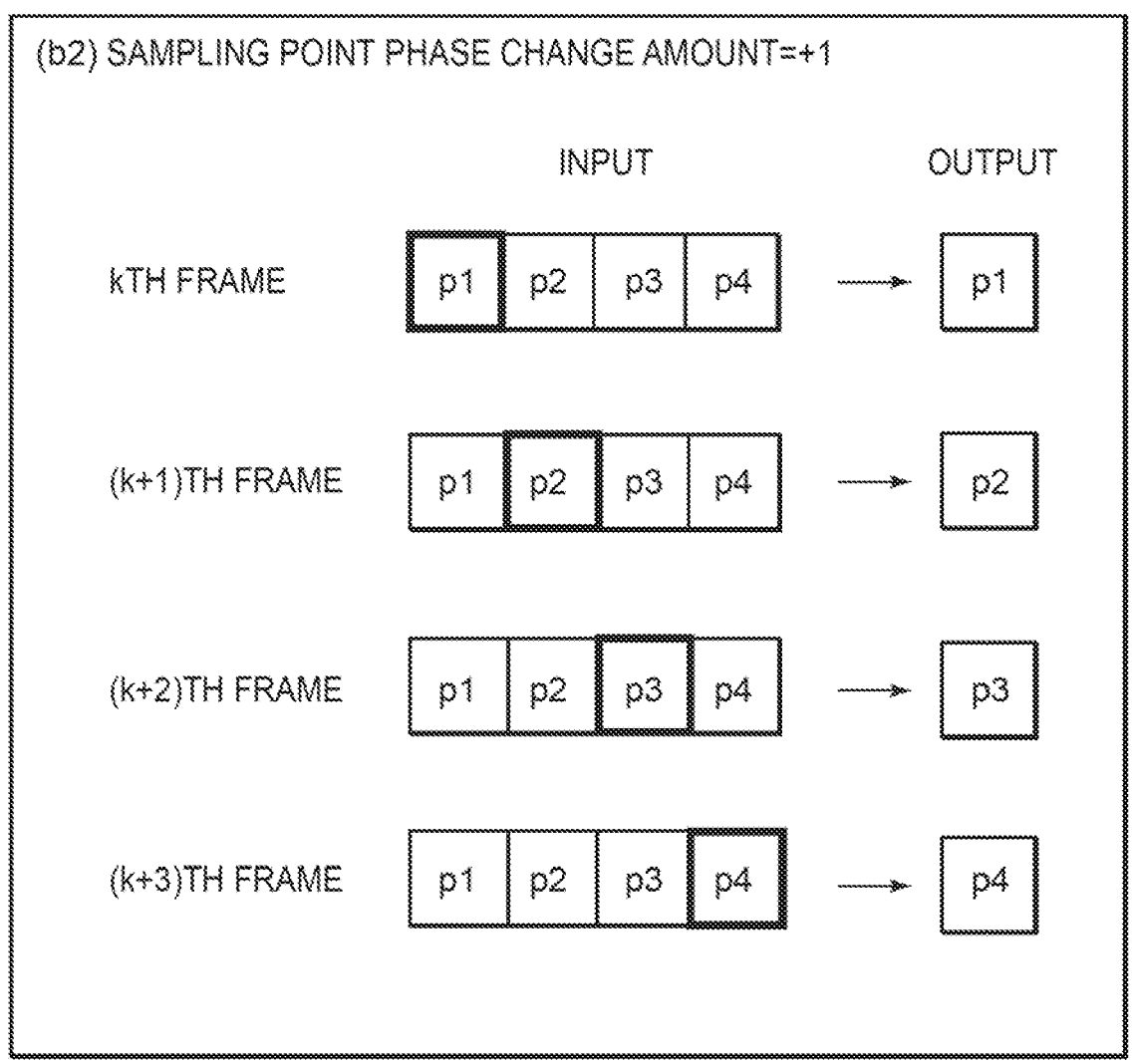
FIG. 4 is a diagram explaining the processing by the block processing unit in the moving image converting apparatus.
Figure 5:
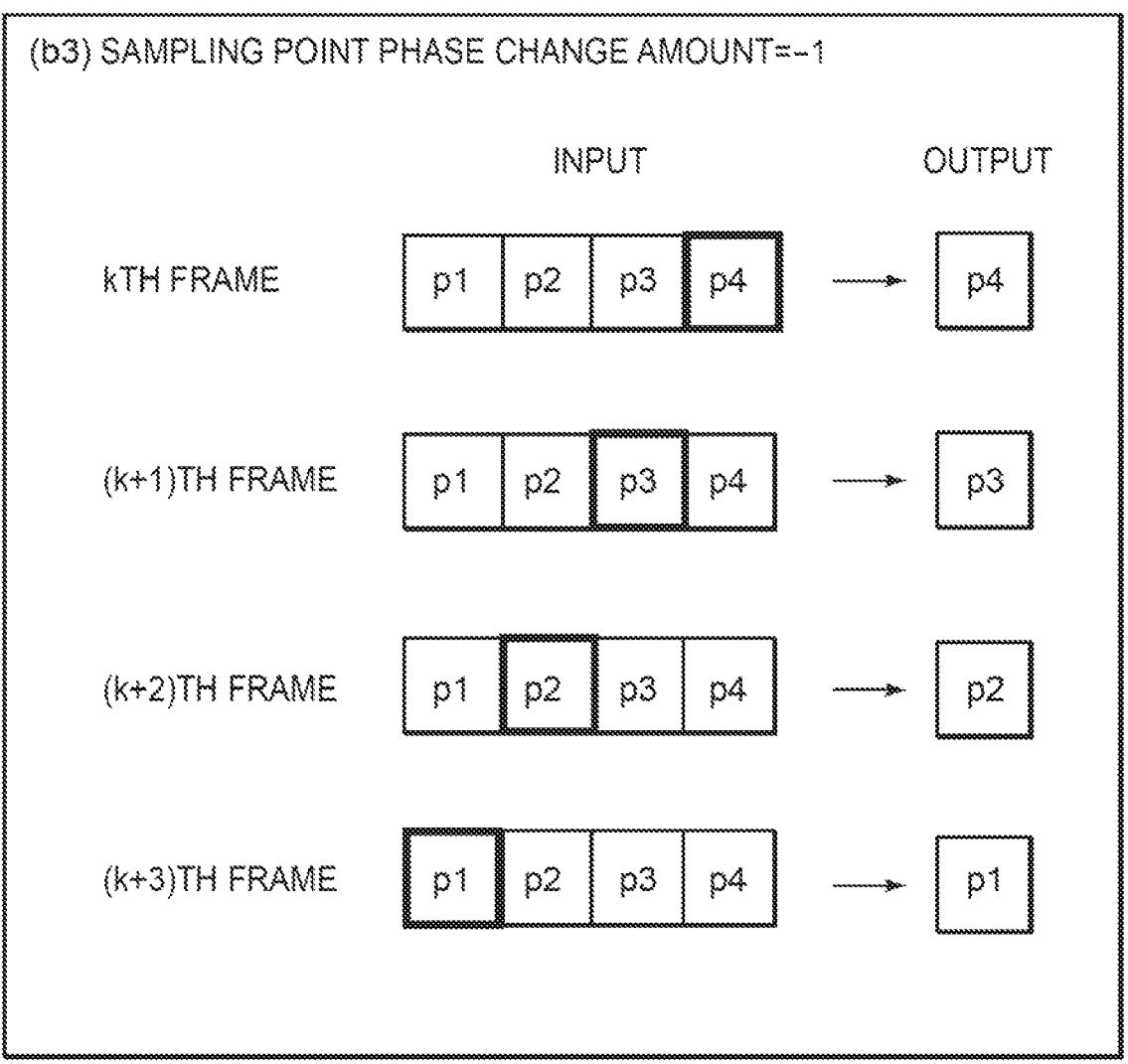
FIG. 5 is a diagram explaining the processing by the block processing unit in the moving image converting apparatus.

In decimation processing shown in FIGS. 4 and 5, a pixel at the same pixel position in each of the successive N frame (k to k+3) is not set as a sampling point, but a pixel at a different pixel position is set as a sampling point for each of the frames, and thus the pixel value at the different pixel position in each frame is set as the pixel value representing the 4 pixels for each frame.

The decimation processing shown in FIG. 4 is processing in which as to the pixel values p1 to p4 of the 4 horizontally extending pixels each staying at the same position in the corresponding one of in the 4 frames being the kth to (k+3)th frames, the pixel position as a sampling point is set as follows:

kth frame: sampling point=p1;
(k+1)th frame: sampling point=p2;
(k+2)th frame: sampling point=p3; and
(k+3)th frame: sampling point=p4, by moving the pixel position to right by 1 pixel as forwarding the frame.

The decimation processing shown in FIG. 5 is processing in which as to the pixel values p1 to p4 of the 4 horizontally extending pixels each staying at the same position in the corresponding one of in the 4 frames being kth to (k+3)th frames, the pixel position as a sampling point is set as follows:

kth frame: sampling point=p4;
(k+1)th frame: sampling point=p3;
(k+2)th frame: sampling point=p2; and
(k+3)th frame: sampling point=p1, by moving the pixel position to left by 1 pixel as forwarding the frame.

Thus, the decimation processing shown in FIGS. 4 and 5 are the processing in which the value of a pixel not staying at the same position but staying at a different position is set as a pixel value representing every 4 pixels of each frame, in the successive N frames (k to k+3).

The block processing section 131 selects one of the three decimation processing modes shown in FIGS. 3 to 5 for execution, according to the motion amount, information supplied thereto from the motion amount detecting section 121 of the motion amount detecting unit 120.

Figure 6:
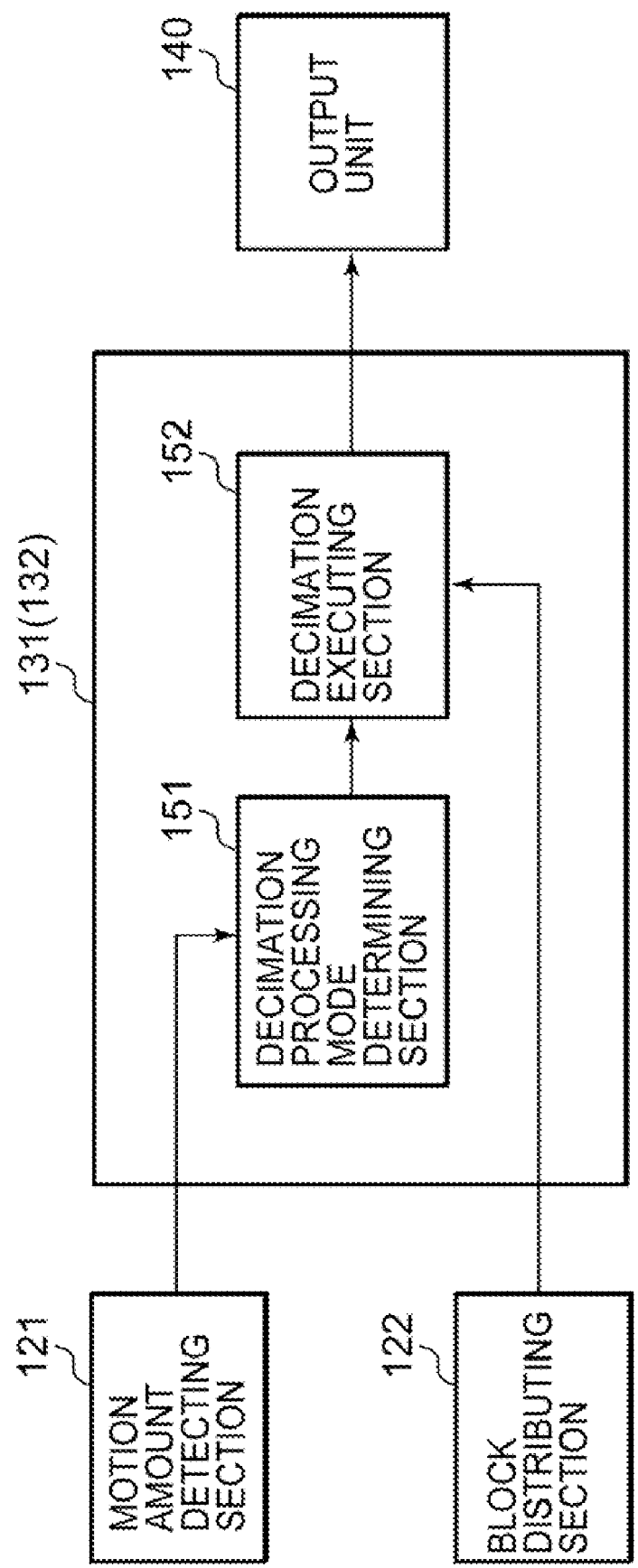
FIG. 6 is a diagram explaining a detailed configuration of a block processing section in the moving image converting apparatus.

A detailed configuration of the block processing section 131 is shown in FIG. 6. The block, processing section 131 has a decimation processing mode determining section 151 and a decimation executing section 152. The decimation processing mode determining section 151 receives as input the motion amount information from the motion amount detecting section 121. It should be noted that as mentioned earlier, the blocks inputted to the block processing section 131 have motion amounts≧2 pixels/frame, and thus the motion amount information inputted to the decimation processing mode determining section 151 of the block processing section 131 is information about motion amounts being 2 pixels/frame or more.

The decimation processing mode determining section 151 determines one of the modes described with reference to FIGS. 3, 4 and 5 above according to which the decimation processing is executed, on the basis of the motion amount values. Details of the determination will be described later. The decimation executing section 152 executes the decimation processing in one of the modes of the FIGS. 3, 4 and 5 according to the determination made by the decimation processing mode determining section 151.

Thus, the moving image converting apparatus 100 shown in FIG. 1 performs processing of converting an inputted moving image into a moving image (compressed data) whose data amount is reduced. In doing so, this apparatus 100 performs moving image conversion processing utilising the super-resolution effect that occurs on the basis of a predetermined visual characteristic, whereby the apparatus 100 prevents a viewer from perceiving image quality degradation due to data reduction.

The super-resolution effect is, as described earlier, a visual effect realized by the visual characteristic that a viewer perceives an image obtained by adding a plurality of images within a certain time, and is considered to be inducted by a complicated relation between the temporal integration function and the sensory memory function in the human visual functions. The moving image converting apparatus 100 shown in FIG. 1 has a configuration of performing the moving image conversion processing utilizing the super-resolution effect induced by the temporal integration function.

Explanations as to the human visual characteristics and the principle of the super-resolution effect are given in detail in Japanese Patent Application Publication No. 2005-193268. How the super-resolution effect is induced, which is described in Japanese Patent Application Publication No. 2005-198268, will be described below.

In order for the super-resolution effect to occur when pixel decimation processing with a decimation amount m (pixels) is performed, all the first to (m−1) th-order reflection components resulting from the decimation need to be cancelled out. A condition for canceling out k (=1, 2, . . . , m−1)-th-order reflection components is to satisfy the following mathematical expressions (Eqs. 1 and 2).

[Math 1]

$$\sum_i \cos(2\pi k \phi_i) = 0 \quad \text{(Eq. 1)}$$

$$\sum_i \sin(2\pi k \phi_i) = 0 \quad \text{(Eq. 2)}$$

In the above equations, $\phi_t$ is the shifting amount of a sampling position in pixel decimation, and is a value defined by the following mathematical expression (Eq. 3) using a time t (=0, 1T, 2T, . . . ), a motion velocity v of a signal, and a time interval (inverse of a frame rate) T.

[Math 2]

$$\phi_i = -\frac{v}{m}\frac{t}{T} \quad \text{(Eq. 3)}$$

In the above equation, a case where the sampling position is shifted to right is set as being positive (this condition is different from what is set in Japanese Patent Application Publication No. 2005-193268).

If the above mathematical expressions (Eqs. 1 and 2) are satisfied under the decimation amount m and a motion amount v of a small area, the super-resolution effect occurs, so that the viewer is hard to perceive image quality degradation.

Next, reasons why the three types of spatial decimation processing (b1) to (b3) shown in FIGS. 3 to 5 are used will be described. In the moving image converting apparatus 100 described with reference to FIGS. 1 to 6, the motion velocity condition of a small area with respect to a single frame for performing pixel, decimation processing whose decimation amount is 4 is sot to 2 pixels/frame or more in the horizontal or vertical direction. Here, let a configuration be considered in which only the processing shown in FIG. 3 is usable spatial decimation processing. In such a configuration, if, e.g., the motion velocity is 4 pixels per frame, i.e., if a motion amount v of a small area is 4 pixels/frame, and assuming that the decimation amount m=4, the shifting amount $\phi_t$ of a sampling position in the above mathematical expression (Eq. 3) can take only an integer equal to or greater than 0.

In ether words, in this case, the above mathematical expression (Eq. 1) is not satisfied for any k, and thus the super-resolution effect does not occur. Similarly, under settings, such as a case where the decimation amount m=2 and the small area motion amount v=1 pixel/frame, and a case where the decimation amount m=4 and the small area motion amount v=2 pixels/frame, the above mathematical expression (Eq. 1) is not satisfied for any k, and thus the super-resolution effect is not obtained, causing a noticeable degradation in the image quality, Namely, the moving image converting apparatus 100 described with reference to FIGS. 1 to 6 is configured to obtain the super-resolution effect by jointly using the three types of spatial decimation processing (b1) to (b3) shown in FIGS. 3 to 5, without depending on the motion velocity of an object.

An advantage obtained by performing decimation processing for shifting sampling point positions according to frames such as shown in FIG. 4 or 5 will be described. It should be noted that the decimation processing for shifting sampling point positions according to frames will hereinafter be called "sampling point moving type decimation processing" or "decimation position shifting processing" whenever appropriate. Note also that even in the "sampling point moving type decimation processing", there could be various variations other than the two modes: decimation position shifting processing for setting sampling point positions by shifting them to right as forwarding the frame such as shown in FIG. 4, and decimation position shifting processing for setting sampling point positions by shifting them to left as forwarding the frame such as shown in FIG. 5. Thus, different types of decimation position shifting processing are distinguished according to a change amount per frame of a sampling point coordinate. This change amount is called "sampling point phase change amount".

In the decimation position shifting processing, processing in which the sampling point phase change amount is [0] corresponds to the decimation processing of FIG. 3 (b1);

processing in which the sampling point phase change amount is [+1] corresponds to the decimation processing of FIG. 4 (b2); and processing in which the sampling point phase change amount is [−1] corresponds to the decimation processing of FIG. 5 (b3). A + or − sign is added to a sampling point phase change amount in order to distinguish directions. For example, [+] is given to indicate right and down directions, whereas [−] is given to indicate left and up directions.

The decimation position shifting processing amounts to adding the shifting amount $\phi_t$ of a sampling point indicated in the mathematical expression (Eq. 3) described in the basic configuration of the moving image converting apparatus, by 1/m per frame (to shift to right (FIG. 4)) or subtracting the shifting amount $\phi_t$ of a sampling point by 1/m (to shift to left (FIG. 5)). "m" is the decimation amount (m pixels).

A shifting amount $\phi'_t$ of a new sampling point obtained if the decimation position shifting processing has been performed is given by the following mathematical expression (Eq. 4).

[Math 3]

$$\phi'_t = \phi_t \pm \frac{1}{m}\frac{t}{T}$$
$$= -\frac{v}{m}\frac{t}{T} \pm \frac{1}{m}\frac{t}{T}$$
$$= \frac{-(v \mp 1)}{m}\frac{t}{T}$$

(Eq. 4)

From the above mathematical expression (Eq. 4), it is seen that shifting a sampling point position in a direction of motion of an object is equivalent to decreasing the motion velocity of the object, and that shifting the sampling point position oppositely to the direction of motion of the object is equivalent to increasing the motion velocity of the object, in terms of a signal processing theory. Of course, this does not mean that the motion velocity of the object is changed on an actual video. A specific processing example will be described below with reference to FIG. 7.

FIG. 7 shows a state (A) in which an object (5 pixels from p1 to p5 in a kth frame) 201 is not moving between 4 frames (frames k to k+3) and a state (B) in which an object is moving horizontally at a velocity v=1 pixel/frame.

Since the block processing section 131 of the moving image converting apparatus 100 shown in FIGS. 1 and 2 receives as input blocks, each having a horizontal motion amount with respect to a single frame which is 2 pixels/frame or more, the block processing section 131 does not receive frame data such as those in the states (A) and (B) shown in FIG. 7 as input. However, on data having a horizontal motion amount with respect to a single frame being 2 pixels/frame or more, the block processing section 131 performs one of the decimation processing modes shown in FIGS. 3, 4 and 5 according to the motion amount. Namely, the block processing section 131 performs and does not perform "decimation position shifting processing", depending on the motion amount.

Referring to FIG. 7, processing for performing or not performing "decimation position shifting processing" will be described. For example, in the state (A) in which the object is not moving, the block processing section 131 is supposed to have executed the sampling point fixed type decimation processing shown in FIG. 3B, whereas in the state (B) in which the object is moving horizontally at a velocity v=1 pixel/frame, the block processing section 131 is supposed to have executed "decimation position shifting processing" for moving the sampling point for each frame shown in FIG. 4, i.e., the sampling point moving type decimation processing.

In the state in which the object is not moving as shown in FIG. 7 (A), it is assumed that decimation processing whose decimation amount=4, i.e., pixel decimation processing for 4 pixels is performed. And if the sampling point fixed type decimation processing described with reference to FIG. 3 is executed, output values for every 4 pixels are pixels p1 and p5 in all the frames, which are the position-fixed pixel values. Meanwhile, in the state in which the object is moving in the horizontal direction at a velocity v=1 pixel/frame as shown in FIG. 7 (B), it is assumed that the "decimation position shifting processing" for moving the sampling point for each frame described with reference to FIG. 4 is performed. Next, output values corresponding to every 4 pixels for each frame are as follows, as shown in FIG. 7(B):

kth frame: p1, p5;
(k+1)th frame: p2, p6;
(k+2)th frame: p3, p7; and
(k+3)th frame: p4, p8.

As a result, in the object moving at v=1 pixel/frame of FIG. 7 (B) and in the object not moving of FIG. 7 (A), their output values for each frame equal. Namely, it is seen that the output obtained by performing the "decimation position shifting processing" for moving the sampling point for each frame described with reference to FIG. 4 on the moving image containing the object moving at the motion amount, v=1 pixel/frame equals the output obtained by performing the processing of FIG. 3, i.e., the fixed sampling point-applied decimation processing on the object of FIG. 7 (A) whose motion velocity v−1=0 pixel/frame. Namely, it is verified that performing the processing of FIG. 4 on a moving object amounts to performing the processing of FIG. 3 on an object whose motion velocity is decreased by 1 pixel/frame.

Eventually, the motion velocity of an object can be virtually increased or decreased by decimation position shifting processing.

Next, let it be verified specifically what velocity an object is moving at when the super-resolution effect does not occur. FIG. 8 shows good/poor quality data as to reconstructed image data obtained by performing the sampling point fixed type decimation processing of FIG. 3 (decimation processing for 4 pixels) on moving image data containing objects having various motion velocities v as motion amounts per frame, to obtain a converted (compressed) image, and then by reconstructing (expanding) the converted (compressed) image. The abscissa indicates the motion velocity v (pixel(s)/frame) as a motion amount per frame of an object, and the ordinate indicates image quality ratings, Namely, FIG. 8 is a graph indicating a tendency observed in the results of a subjective rating test carried out on the image quality of an object that is caused to move to right by the motion amount indicated on the abscissa. A curve shown in the graph is an image quality rating curve 205. A reference rating denoted T in FIG. 3 is set as an image quality judgment criterion, and if rated T or above, the image is considered good.

The sampling point fixed type decimation processing (decimation processing for 4 pixels) described with reference to FIG. 3 is performed on various objects whose motion velocities range from P (pixels/frame) to Q (pixels/frame) as motion amounts per frame, to obtain areas A of FIG. 8 as areas rated T (reference rating) or above. Areas B other than the areas A are rated below T.

In the areas rated T or above, i.e., in the areas A of FIG. 8, the motion velocities of the objects as motion amounts per frame fall under a range a-b, a range c-d, and a range e or over, and at these motion amounts, even if the sampling point fixed type decimation processing described with reference to FIG. 3 is applied, the images are good, from which it is judged that decimation not impairing the super-resolution effect is realized. Meanwhile, in the areas B, i.e., if the motion velocities of the objects as motion amounts per frame are out of the range a-b, the range c-d, and the range e or over, the images are rated below T, from which it is considered that the super-resolution effect does not occur or occurs but only insufficiently in these areas.

On the basis of these rating results, if the motion velocities of the objects correspond to the velocities of the areas B of FIG. 8, the motion velocities of the objects are conceptually increased or decreased by decimation position shifting processing. Namely, decimation position shifting processing such as shown in, e.g., FIG. 4 or 5 is executed. As a result, as described with reference to FIG. 7, output similar to that of the objects moving at the velocities in the areas A of FIG. 8 is obtained, and thus images having a good quality with the super-resolution effect can be obtained.

Areas B1, B2 shown in FIG. 9 are part of the areas B shown in FIG. 8. Namely, they are image quality areas rated below T, i.e., areas having object motion velocities v that would not induce the super-resolution, effect or that would induce the effect but only insufficiently. When objects are moving at velocities of the areas B1, B2, processing of virtually accelerating the objects (+Δv1, +Δv2), i.e., processing of shifting the decimation positions in directions opposite to the directions of motion of the objects (e.g., the processing of moving the sampling point position to left as forwarding the frame as shown in FIG. 5 if the objects are moving to right) is performed, whereby advantages are obtained which are similar to moving the area B1 of FIG. 9 to an area C1 of FIG. 9 and moving the area B2 of FIG. 9 to an area C2 of FIG. 9. As a result, the motion velocities v as virtual motion amounts per frame of the objects can be set to the image quality areas (C1, C2 of FIG. 9) rated T or above. Namely, by executing the decimation processing for moving the sampling point position to left as forwarding the frame as shown in FIG. 5, image conversion (compression) with less image quality degradation can be realized.

Similarly, when an object is moving at a velocity of an area B3 of FIG. 10, processing of virtually decelerating (−Δv3) the object, i.e., processing of shifting the decimation position in the same direction as the direction of motion of the object (e.g., the processing of FIG. 4 if the object is moving to right) is performed, whereby the area B3 of FIG. 10 is moved to an area C3 of FIG. 10. As a result, the motion velocity of the object as a virtual motion amount per frame can be set to the image quality area (C3 of FIG. 10) rated T or above. Namely, by executing the decimation processing for moving the sampling point position to right as forwarding the frame as shown in FIG. 4, image conversion (compression) with less image quality degradation can be realized.

It should be noted that the image quality rating curves shown in FIGS. 8 to 10 are set merely on the basis of the results of the single subjective rating test. Since various other image quality rating methods are applicable, other configurations based on the results of such other methods may also be adopted to determine a decimation processing mode.

The block processing section 131 shown in FIG. 2, which executes processing on block data whose motion amount is 2 pixels/frame or more, determines, in its decimation processing mode determining section 151 shown in FIG. 6, on the basis of the motion amount information from the motion amount detecting section, execution of one of the following decimation processing modes:

(a) Sampling point fixed decimation processing (see FIG. 3);

(b) Decimation processing for shifting the sampling point position to right as forwarding the frame (see FIG. 4); and (c) Decimation processing for shifting the sampling point position to left as forwarding the frame (see FIG. 5), and executes, in its decimation executing section 152 shown in FIG. 6, decimation processing having the determined processing mode.

In determining decimation processing mode in the decimation processing mode determining section 151 shown in FIG. 6, a determination is made on the basis of the image quality rating curves shown in, e.g., FIGS. 8 to 10. Namely, in a motion velocity area where image quality ratings T and above can be maintained, in the image quality rating curves, it executes (a) the sampling point, fixed type decimation processing (see FIG. 3), whereas in a motion velocity area where image quality ratings is below T in the image quality rating curves, it is configured to perform either (b) the decimation processing for shifting the sampling point position to right as forwarding the frame (see FIG. 4) or (c) the decimation processing for shifting the sampling point position to left as forwarding the frame (see FIG. 5). By executing one of the above decimation processing, a virtual motion velocity is set to the motion velocity area where image quality ratings T and above can be maintained in the image quality rating curves.

A determination example is shown in FIG. 11, in which how the decimation processing mode determining section 151 shown in FIG. 6 determines a decimation processing mode on the basis of the motion amount information from the motion amount detecting section. The determination example shown in FIG. 11 is an example in which a processing mode is determined on the basis of the image quality rating curves shown in FIGS. 8 to 10.

In cases (a) and (b) of FIG. 11, either the motion velocity: 2 pixels/frame≦motion amount<c pixels/frame; or the motion velocity: f pixels/frame≦motion amount<e pixels/frame, and the motion direction: right.

In these cases, the decimation processing (see FIG. 5) for shifting the sampling point position to left as forwarding the frame, i.e., decimation processing with the sampling point phase change amount=[+n] is executed. This is virtually accelerating processing, and thus corresponds to the processing for moving the area B1 to the area C1 or from the area B2 to the area C2, of FIG. 9.

In cases (c) and (d) of FIG. 11, either the motion velocity: 2 pixels/frame≦motion amount<c pixels/frame; or the motion velocity: f pixels/frame≦motion amount<e pixels/frame, and the motion direction: left.

In these cases, the decimation processing (see FIG. 4) for shifting the sampling point position to right as forwarding the frame, i.e., decimation processing with the sampling point phase change amount=[−n] is executed. This is also virtually accelerating processing, and thus corresponds to the processing for moving the area B1 to the area C1 or from the area B2 to the area C2, of FIG. 9.

In a case (e) of FIG. 11, the motion velocity: d pixels/frame≦motion amount<f pixels/frame, and the motion direction: right.

In this case, the decimation processing (see FIG. 4) for shifting the sampling point position to right as forwarding the frame, i.e., decimation processing with the sampling point phase change amount=[+n] is executed. This is virtually decelerating processing, and thus corresponds to the processing for moving the area B3 to the area C3 of FIG. 10.

In a case (f) of FIG. 11, the motion velocity; d pixels/frame≦motion amount<f pixels/frame, and the motion direction: left.

In this case, the decimation processing (see FIG. 5) for shifting the sampling point position to left as forwarding the frame, i.e., decimation processing with the sampling point phase change amount=[=n] is executed. This is also virtually decelerating processing, and thus corresponds to the processing for moving the area B3 to the area C3 of FIG. 10.

In a case (g) of FIG. 11, either the motion velocity: c pixels/frame≦motion amount<d pixels/frame; or the motion velocity: e pixels/frame≦motion amount, and the motion direction: left or right.

In this case, the sampling point fixed type decimation processing (see FIG. 3), not the decimation processing for shifting the sampling point position as forwarding the frame, i.e., decimation processing with the sampling point phase change amount=[0] is executed. This processing is equivalent to processing on a block having an object whose motion amount corresponds to the area A of FIG. 8.

Figure 12:
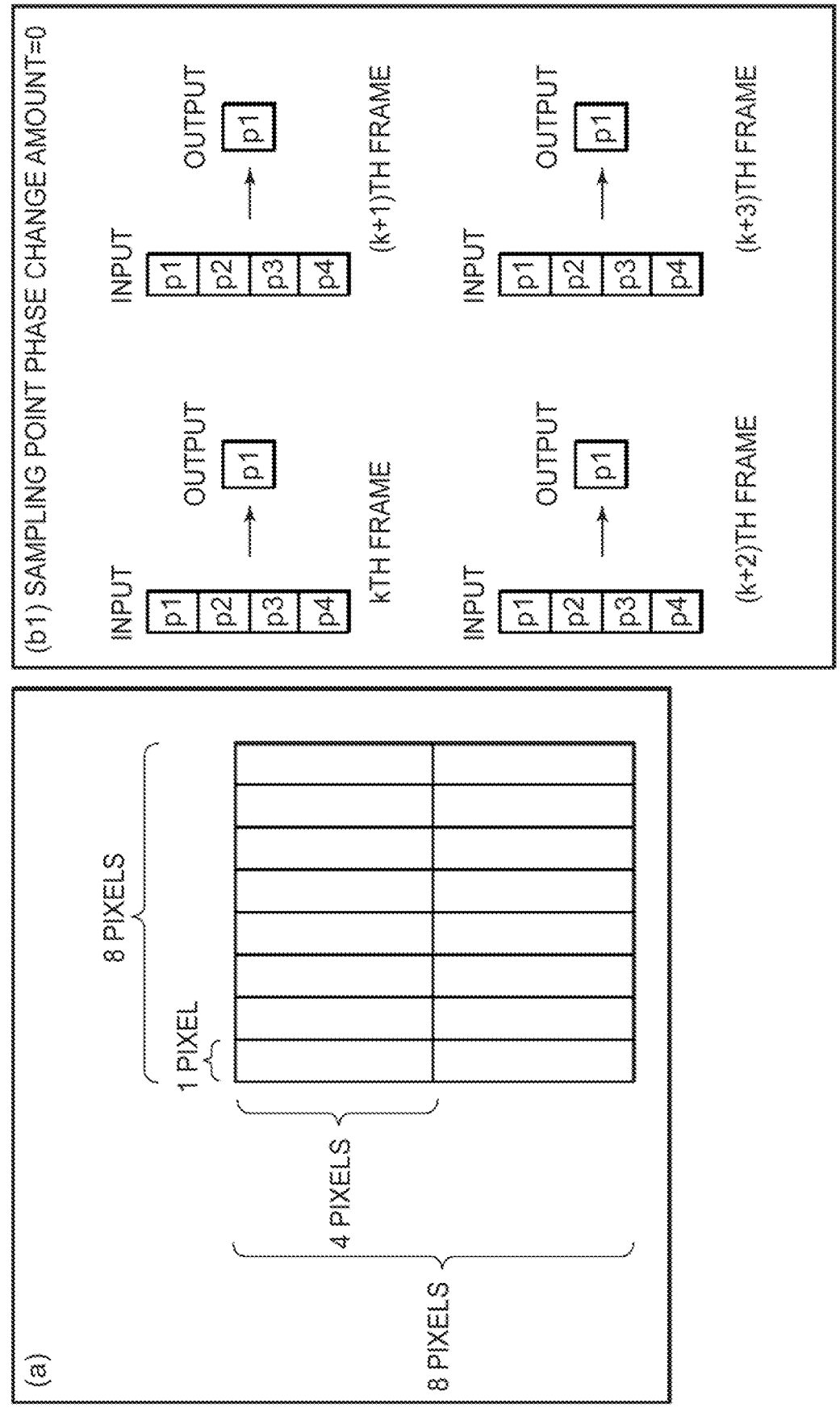
FIG. 12 is a diagram explaining an example of decimation processing in which sampling points are fixed [sampling point phase change amount=[0]]
Figure 13:
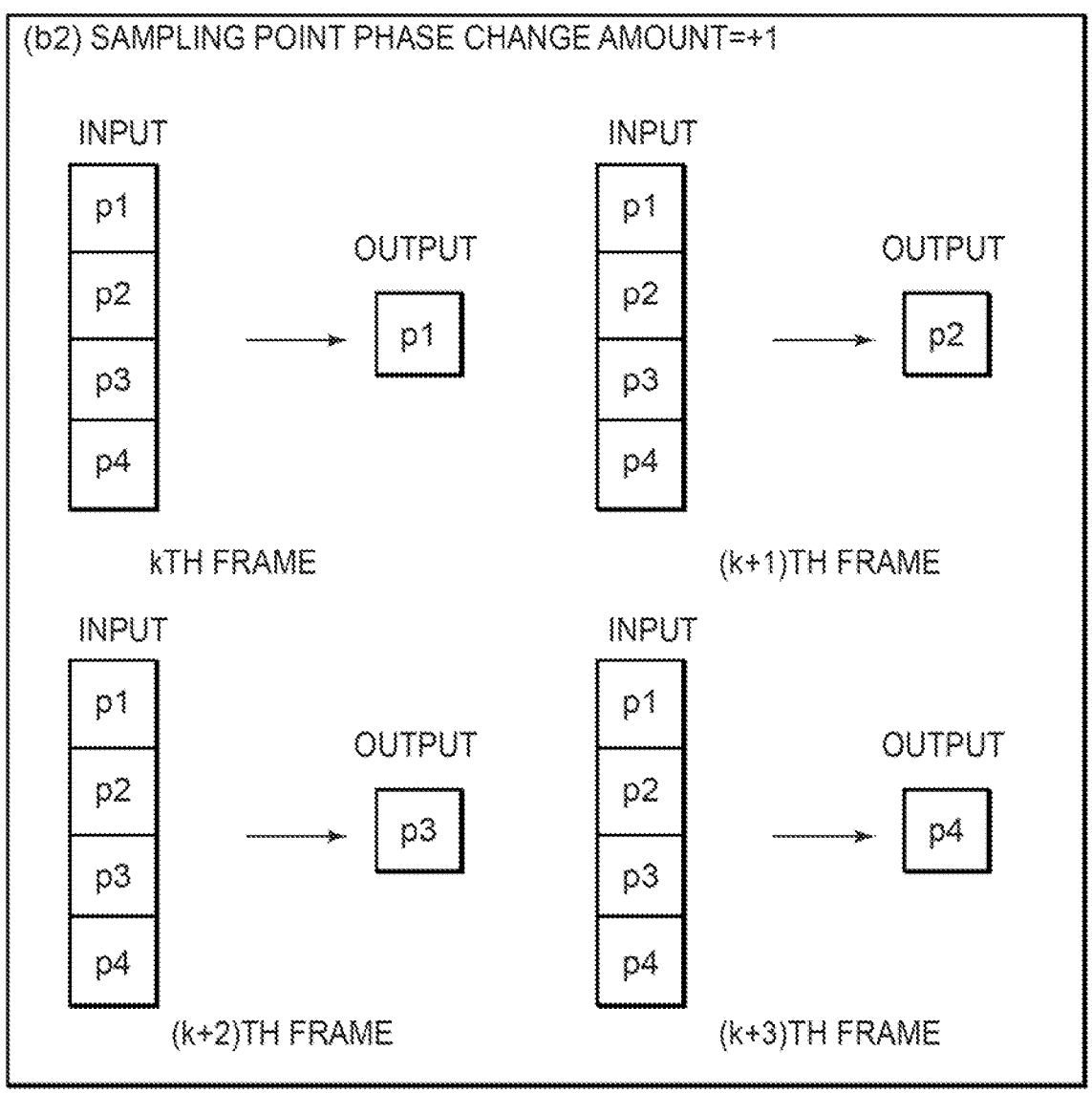
FIG. 13 is a diagram explaining an example of decimation processing for shifting a sampling point position down as forwarding the frame [sampling point phase change amount= [+n]]
Figure 14:
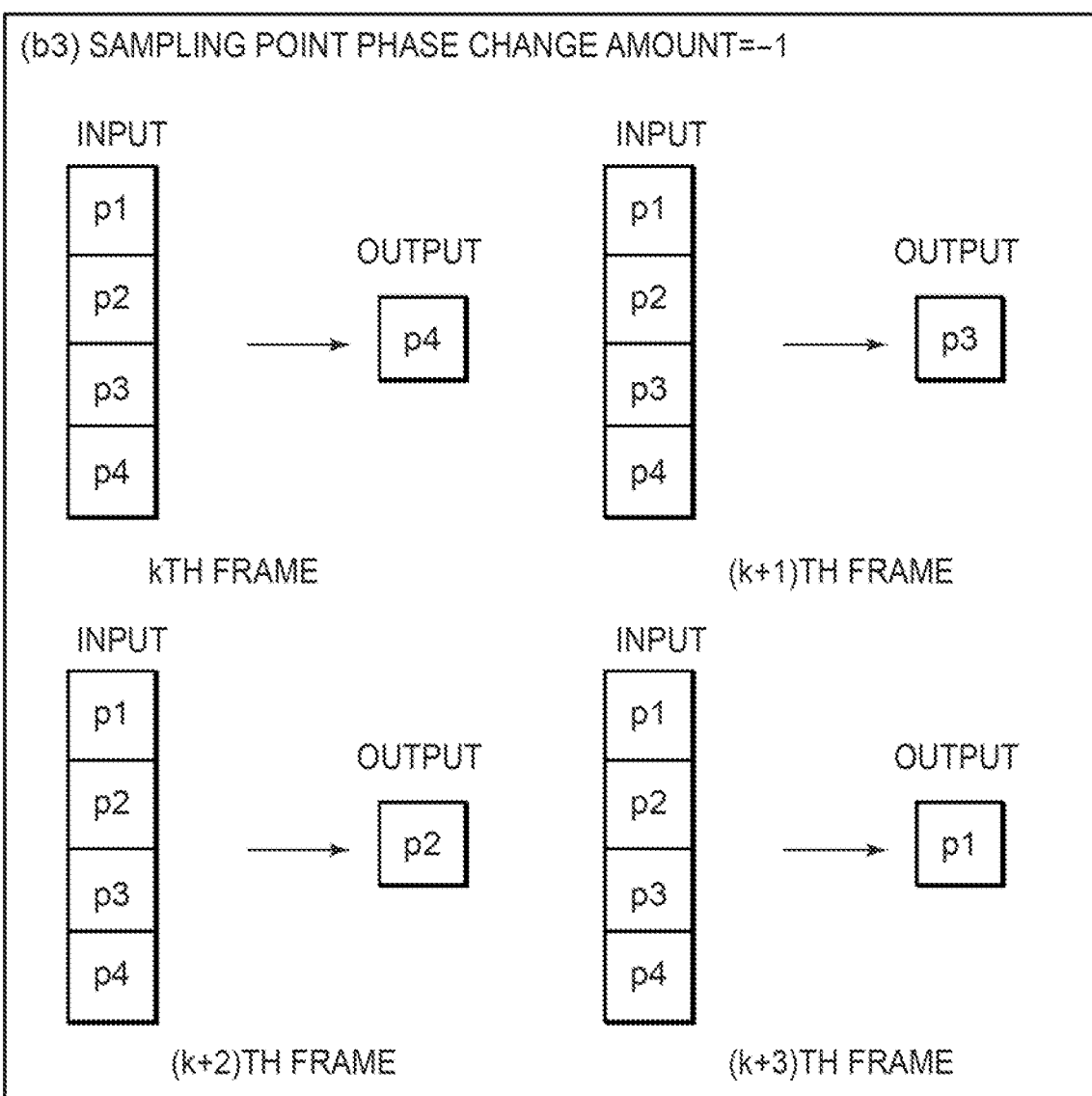
FIG. 14 is a diagram explaining an example of decimation processing for shifting a sampling point position up as forwarding the frame [sampling point phase change amount=[−n]]

The above-mentioned examples deal with processing on a block having a horizontal motion amount. Similar processing is executed on a block having a vertical motion amount. Namely, the block processing section 131 shown in FIG. 2 determines, in its decimation processing mode determining section 151 shown in FIG. 6, on the basis of the motion amount information from the motion amount detecting unit, execution of one of the following decimation processing modes:

(a) Sampling point fixed decimation processing (see FIG. 12 (b1));

(b) Decimation processing for shifting the sampling point position down as forwarding the frame (see FIG. 13 (b2)) [Sampling point phase change amount=[+n]]; and (c) Decimation processing for shifting the sampling point position up as forwarding the frame (see FIG. 14 (b3)) [Sampling point phase change amount=[−n]], and executes, in its decimation executing section 152 shown in FIG. 6, decimation processing having the determined processing mode.

The block processing section 131 thus executes these different modes of decimation processing according to the motion velocity v as a motion amount per frame of an object contained in each of blocks for processing, for output to the output unit 140. Since the block processing section 131 performs, given that the decimation amount is 4, spatial decimation processing on each of 4 supplied blocks (1 pixel is selected for every 4 adjacent pixels), the data amount of each block is reduced to ¼, and hence the data amount of all the 4 blocks is reduced to ¼. The block processing section 131 supplies data representing the 4 blocks whose data amount has been reduced to ¼, to the output unit 140.

Next, before describing the block processing section 132, the operation of the block processing section 133 will be described specifically.

The block processing section 133 performs processing (temporal decimation processing) for decimating a specific number of frames on a total of N blocks (N blocks in each of which both the horizontal and vertical motion amounts are less than 1 pixel/frame) each staying at the same position in the corresponding one of successive N frames, supplied thereto from the block distributing section 122 of the motion amount detecting unit 120.

Figure 15:
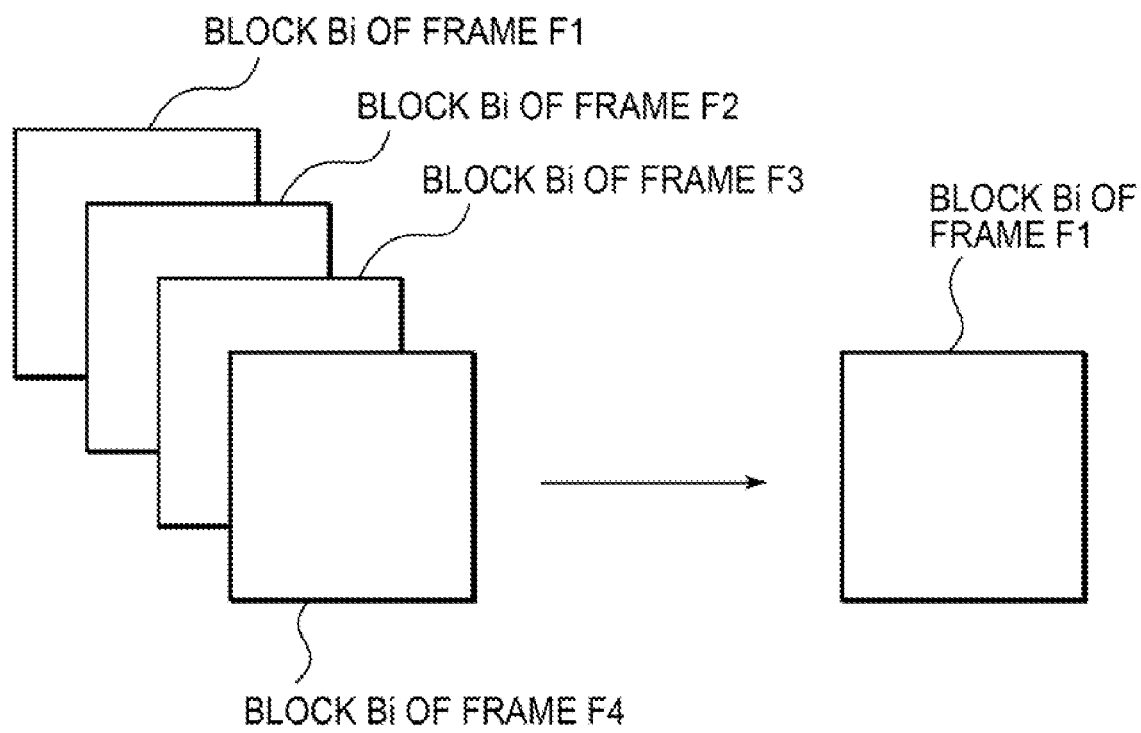
FIG. 15 is a diagram explaining an example of temporal decimation processing.

Specifically, as shown in FIG. 15, the block processing section 133 decimates a specific number of frames (frame decimation for 4 frames) for replacing 4 blocks Bi each staying at the same position in the corresponding one of successive 4 frames F1 to F4, with 1 block (the block Bi of the frame F1 in this example).

The block processing section 133 supplies data (1 block) representing the 4 blocks whose data amount has been reduced to ¼ through such temporal, decimation processing, to the output unit 140. While the case where N=4 has been described as an example here, similar processing is performed even if N is set to other values.

Next, the operation of the block processing section 132 will be described. The block processing section 132 performs both pixel decimation processing (spatial decimation processing) and frame decimation processing (temporal decimation processing) on a total of N blocks (N blocks in each of which the horizontal and vertical motion amounts are 1 pixel/frame or more and less than 2 pixels/frame) each staying at the same position in the corresponding one of successive N frames, supplied thereto from the block distributing section 122 of the motion amount detecting unit 120.

The motion velocity v= 1 to 2 pixels/frame as a motion amount per frame of each of the blocks supplied to the block processing section 132 satisfies the mathematical expressions (Eq. 1) and (Eq. 2), i.e., satisfies the condition for obtaining the super-resolution effect. However, if sampling point, fixed type decimation processing similar to that described with reference to FIG. 3 above is executed, it is known that image quality degradation may be perceived in some cases.

To overcome this situation, the block processing section 132 executes decimation processing using the decimation amount m=2, not 4, and further appropriately selects one of sampling point fixed type decimation processing and sampling point moving type decimation processing similar to the decimation processing by the block processing section 131, according to the motion velocity of an object, for execution.

Figure 16:
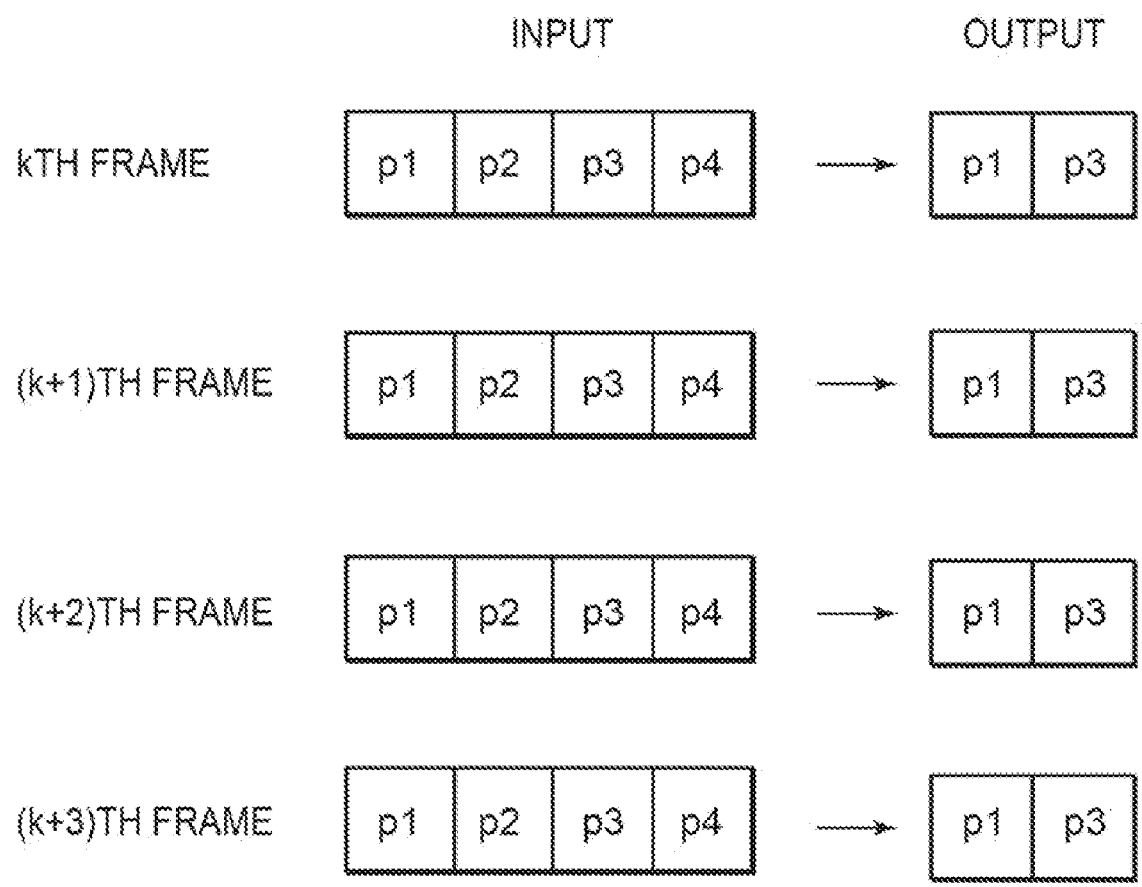
FIG. 16 is a diagram explaining how sampling point fixed type decimation processing and sampling point moving type decimation processing are performed with a decimation amount m=2.
Figure 17:
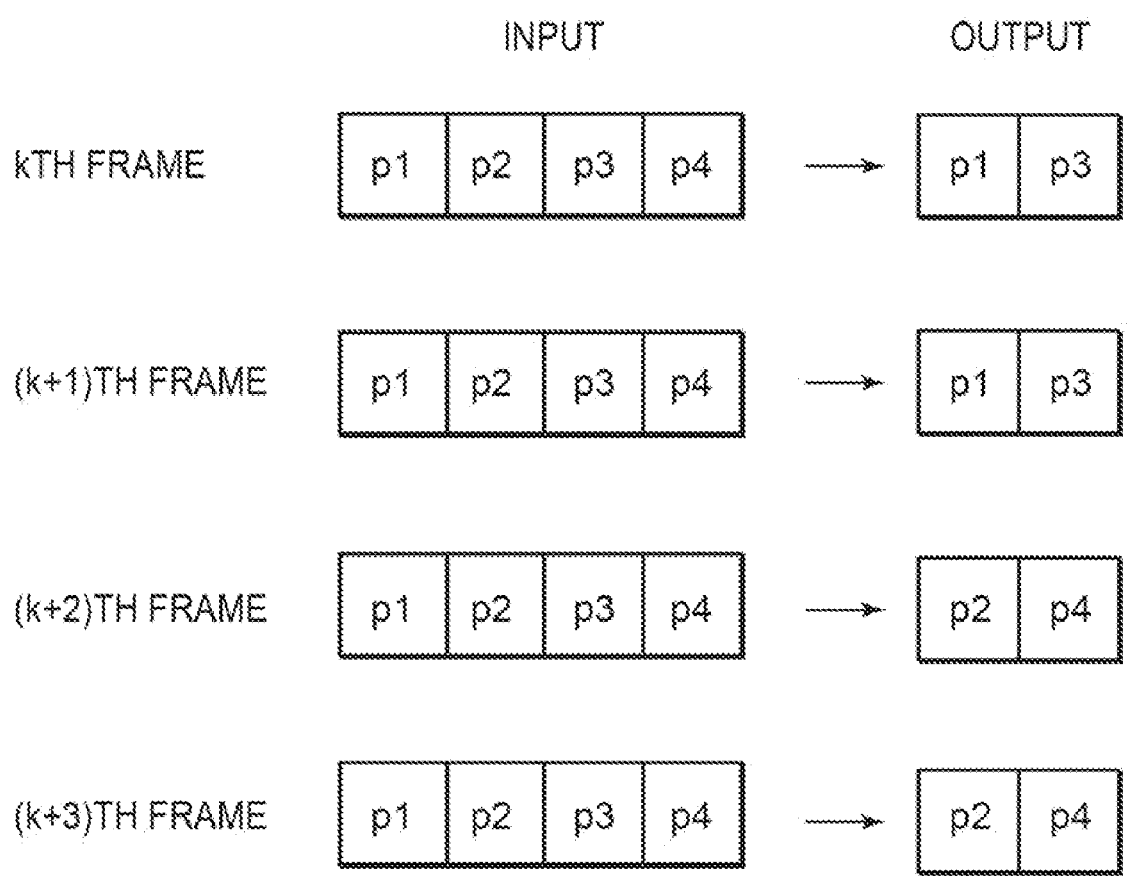
FIG. 17 is a diagram explaining how sampling point fixed type decimation processing and sampling point moving type decimation processing are per formed with the decimation amount m=2.
Figure 18:
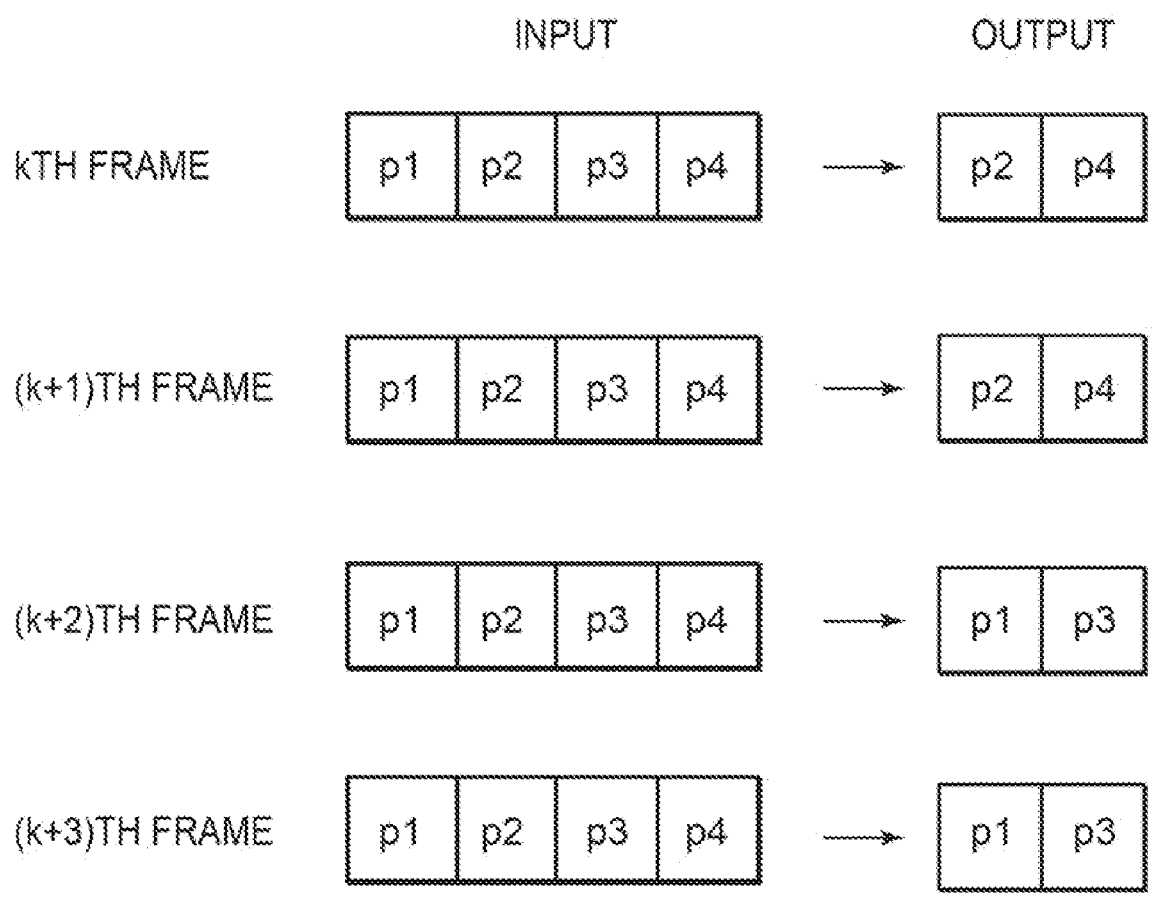
FIG. 18 is a diagram explaining how sampling point fixed type decimation processing and sampling point moving type decimation processing are performed with the decimation amount m=2.

Referring to FIGS. 16 to 21, how sampling point fixed type decimation processing and sampling point moving type decimation processing are per formed with the decimation amount m=2 will be described. FIGS. 16 to 18 show examples in which the block processing section 132 performs decimation processing with the motion velocity v=1 to 2 pixels/frame as a horizontal motion amount per frame.

FIG. 16 shows sampling point fixed type decimation processing, i.e., decimation processing in which the sampling point phase change amount=[0] being the change amount per frame of a sampling point coordinate. This is an example of pixel decimation (pixel decimation for 2 pixels) in which the pixel values p1 to p4 of each of frames (k to k+3) are replaced with any 2 (p1, p3 in this example) of them, i.e., decimation processing with the decimation amount m=2.

FIG. 17 shows sampling point moving type decimation processing, i.e., decimation processing in which the pixel values p1 to p4 of each of frames (k to k+3) are replaced with the pixel values p1, p3 for the preceding frames (k, k+1) and with the pixel values p2, p4 for the succeeding frames (k+2, k+3). This processing example corresponds to decimation processing in which the sampling point phase change amount being the change amount per frame of a sampling point coordinate=[0.5].

FIG. 18 also shows sampling point moving type decimation processing, i.e., decimation processing in which the pixel values p1 to p4 of each of frames (k to k+3) are replaced with the pixel values p2, p4 for the preceding frames (k, k+1) and with the pixel values p1, p3 for the succeeding frames (k+2, k+3). This processing example corresponds to decimation processing in which the sampling point phase change amount being the change amount per frame of a sampling point coordinate=[−0.5].

Figure 19:
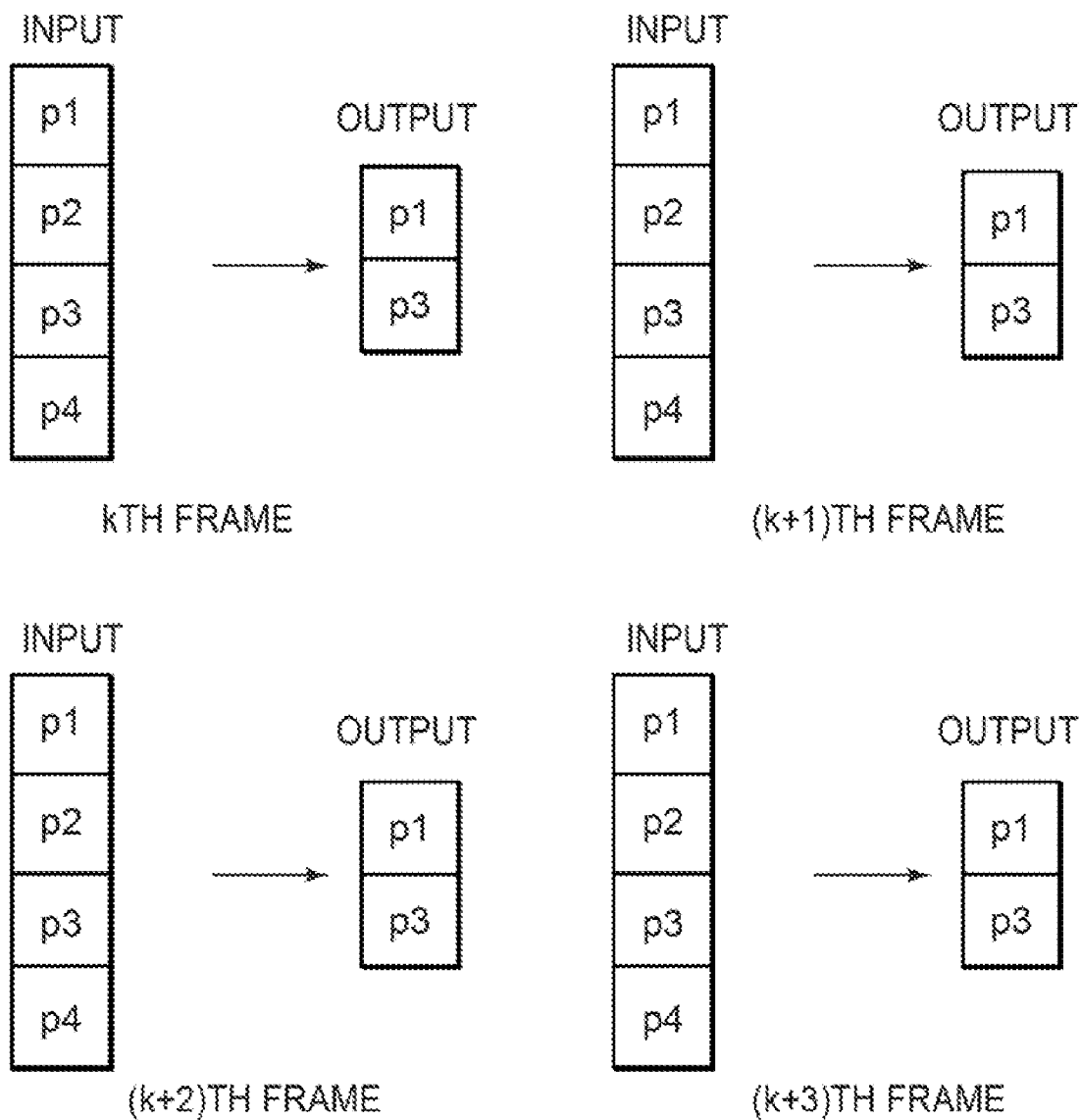
FIG. 19 is a diagram explaining how sampling point fixed type decimation processing and sampling point moving type decimation processing are per formed with the decimation amount m=2.
Figure 20:
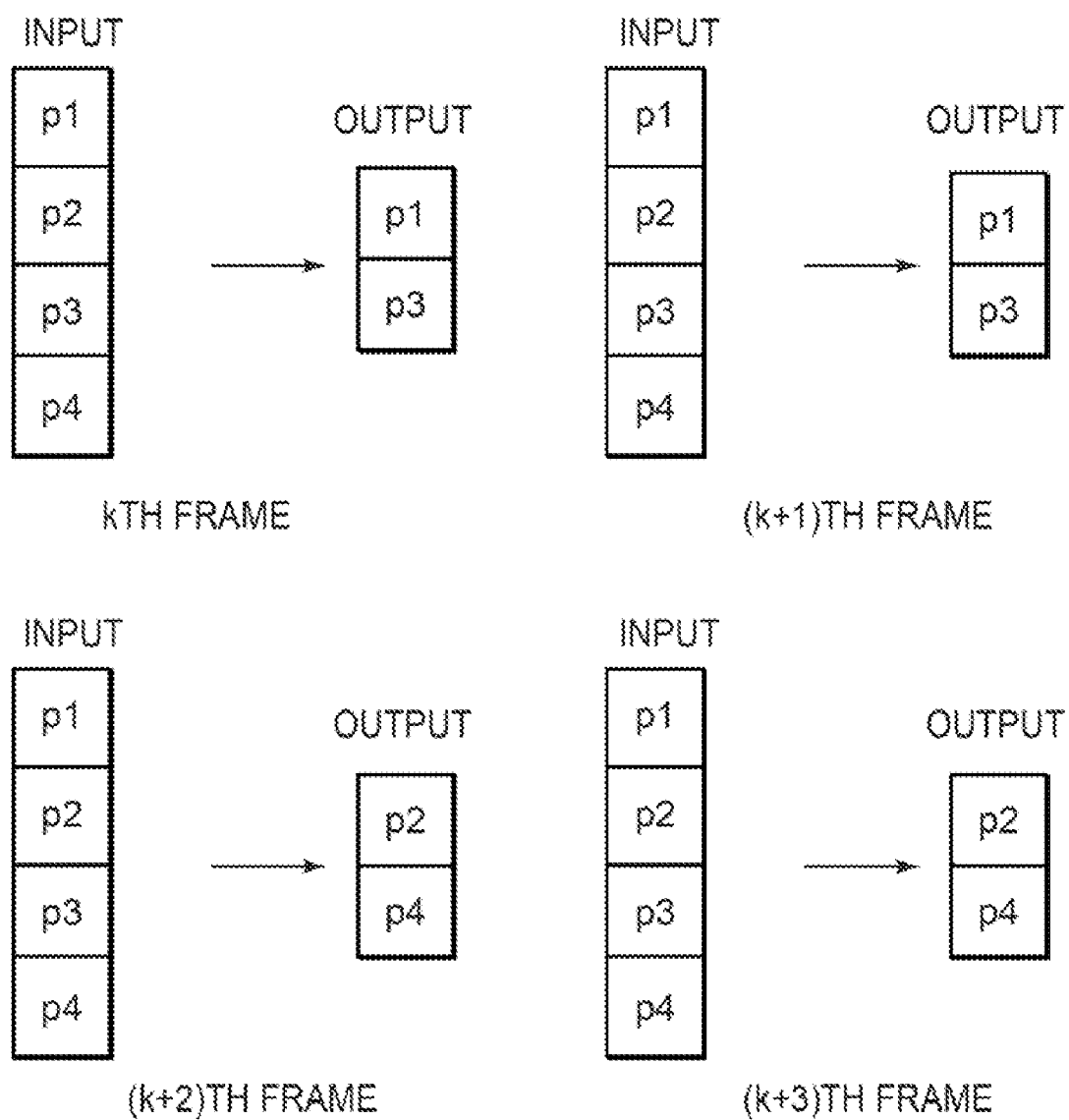
FIG. 20 is a diagram explaining how sampling point fixed type decimation processing and sampling point moving type decimation processing are performed with the decimation amount m=2.
Figure 21:
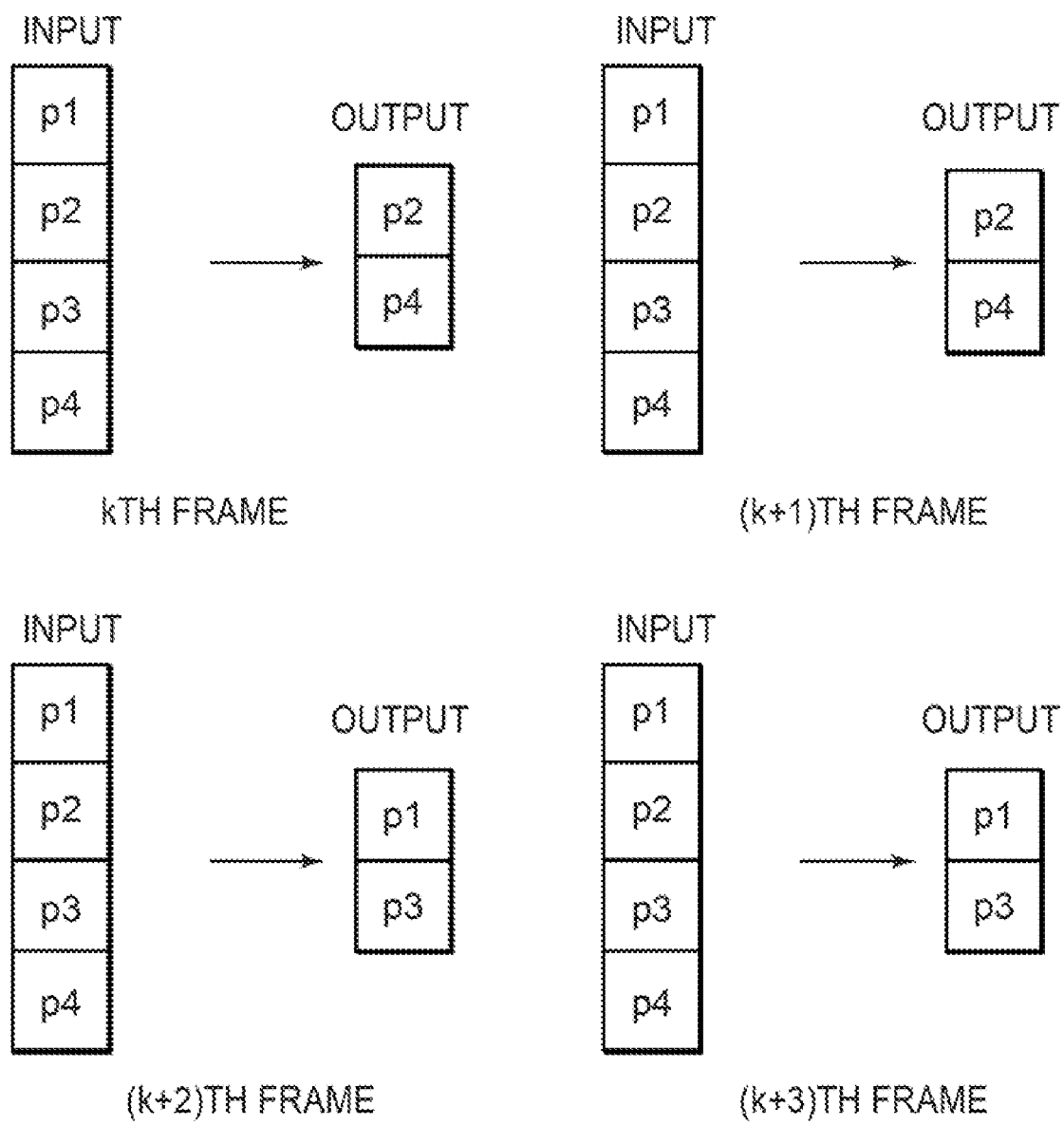
FIG. 21 is a diagram explaining how sampling point fixed type decimation processing and sampling point moving type decimation processing are performed with the decimation amount m=2.

FIGS. 19 to 21 show examples in which the block processing section 132 performs decimation processing with the motion velocity v=1 to 2 pixels/frame as a vertical motion amount per frame.

FIG. 19 shows sampling point fixed type decimation processing, i.e., decimation processing in which the sampling point phase change amount=[0] being the change amount per frame of a sampling point coordinate. This is an example of pixel decimation (pixel decimation for 2 pixels) in which the pixel values p1 to p4 of each of frames (k to k+3) are replaced with any 2 (p1, p3 in this example) of them, i.e., decimation processing with the decimation amount m=2.

FIG. 20 shows sampling point moving type decimation processing, i.e., decimation, processing in which the pixel values p1 to p4 of each of frames (k to k+3) are replaced with the pixel values p1, p3 for the preceding frames (k, k+1) and with the pixel values p2, p4 for the succeeding frames (k+2, k+3). This processing example corresponds to decimation processing in which the sampling point phase change amount being the change amount per frame of a sampling point coordinate=[0.5].

FIG. 21 also shows sampling point moving type decimation processing, i.e., decimation processing in which the pixel values p1 to p4 of each of frames (k to k+3) are replaced with the pixel values p2, p4 for the preceding frames (k, k+1) and with the pixel values p1, p3 for the succeeding frames (k+2, k+3). This processing example corresponds to decimation processing in which the sampling point phase change amount being the change amount per frame of a sampling point coordinate=[−0.5].

The block processing section 132 also has the earlier described configuration of FIG. 6, similarly to the block processing section 131. Namely, the block processing section 132 has a decimation processing mode determining section 151 and a decimation executing section 152. The decimation processing mode determining section 151 receives as input motion amount information from the motion amount detecting section 121. It should be noted that as described earlier, blocks inputted to the block processing section 132 are those whose motion velocity v=1 to 2 pixels/frame as a motion amount per frame, and thus the motion amount information inputted to the decimation processing mode determining section 151 of the block processing section 132 is motion amount information being motion velocities v=1 to 2 pixels/frame.

The decimation processing mode determining section 151 determines which one of the decimation processing modes of FIGS. 16 to 21 it will use for execution, on the basis of a motion amount value, and the decimation executing section 152 executes decimation processing according to one of the modes of FIGS. 16 to 21 determined by the decimation processing mode determining section 151.

Figure 22:
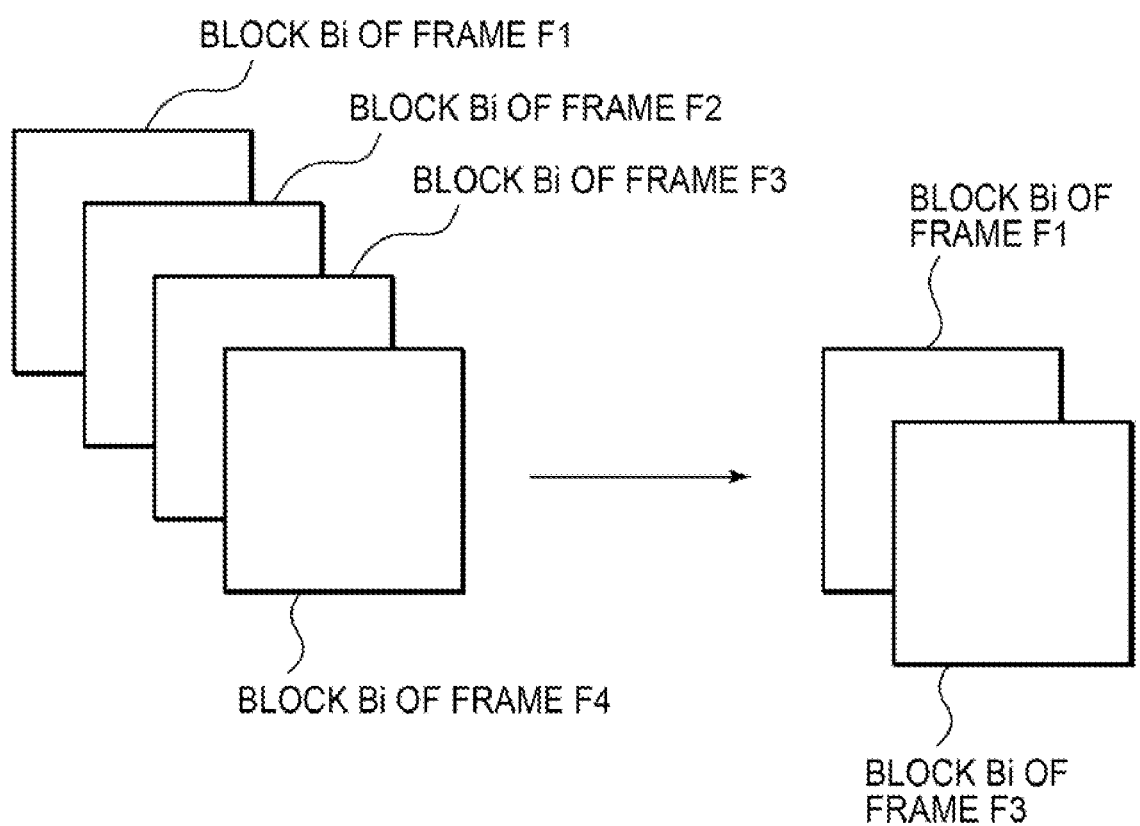
FIG. 22 is a diagram explaining an example of temporal decimation processing (4 frames→2 frames)

The block processing section 132 thus executes different decimation processing according to the motion velocity v as a motion amount per frame of an object contained in each of blocks for processing, for output to the output unit 140 (see FIGS. 1 and 2). Since the block processing section 132 executes not only spatial decimation processing with the decimation amount 2, but also performs temporal decimation processing shown in FIG. 22 (4 frames→2 frames), the data amount of each of the blocks is reduced to ¼, and the data amount of all the 4 blocks is reduced to ¼. The block processing section 132 supplies data representing the 4 blocks whose data amount is reduced to ¼, to the output unit 140.

Next, the output unit 140 will be described. The output unit 140 outputs information indicating data representing N blocks whose data amount is reduced and now each of these blocks is processed, the N blocks being those supplied thereto from the block processing sections 131 to 133 of the block processing unit 130. The information about the processing content includes information about a processing method, whether it is spatial decimation, temporal decimation, or spatial/temporal decimation, information about whether decimation position shifting processing is performed if the spatial decimation is performed, information about what type of decimation position shifting processing is performed if the decimation position shifting processing is performed, information about the frame rate and space resolution of an original image, and the like. Other information may also be contained.

As described above, the moving image converting apparatus 100 described with reference to FIGS. 1 to 22 performs spatial decimation processing with different decimation phase change amounts according to the motion velocity of an object, whereby it is configured such that data can be reduced by compression by which image quality degradation is suppressed.

Specifically, data compression (reduction) is implemented by performing spatial decimation processing with different decimation phase change amounts according to the motion amount of a moving object in an image. With this decimation processing, it is intended to provide an advantage that a viewer is prevented from perceiving image quality degradation due to the pixel decimation. Namely, when compressed (decimated) data is reconstructed for playback, the viewer views a moving object in the image by following its motion, whereby a super-resolution phenomenon based on the decimation processing corresponding to the velocity of the moving object occurs, and this super-resolution phenomenon prevents the viewer from perceiving image quality degradation due to the pixel decimation.

It should be noted that "viewing by following (or tracking) the motion" or "that the viewer's line of sight follows (tracks) an object" means that the motion velocity V (pixel (s)/frame) of the object takes the same value or almost the same value as the velocity Vo (pixel(s)/frame) of the viewer's line of sight. The velocity of the viewer's line of sight is the change amount, associated with the forwarding of the frame, of a coordinate position in an image at which the viewer gazes.

Figure 23:
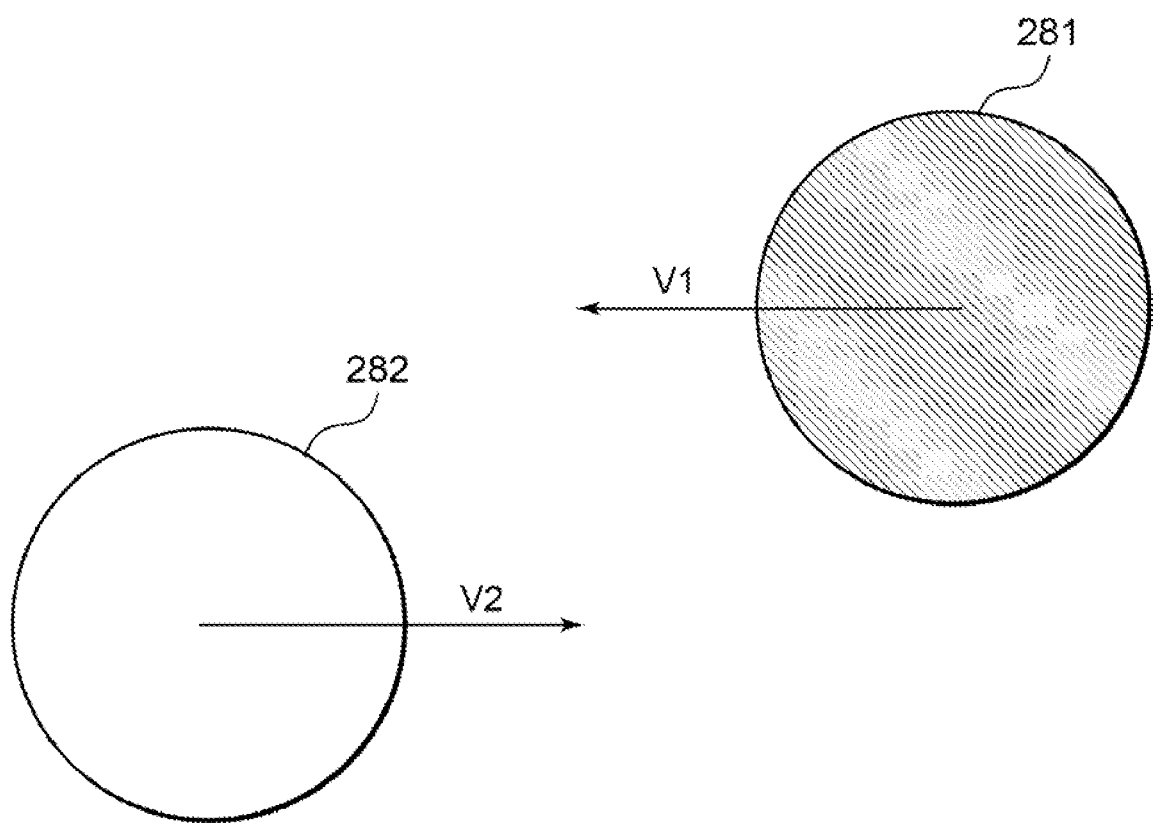
FIG. 23 is a diagram explaining an example in which there are a plurality of objects having a plurality of different motion velocities and motion directions.

However, in some cases there may be a plurality of different objects having a plurality of different motion velocities and directions in an image. For example, as shown in FIG. 23, if is supposed that there are a plurality of objects 281 and 232 in an image, and that these objects are moving differently as indicated by arrows. In this case, when a viewer attentively views the object 281 by following its motion, the line of sight of the viewer is not following the motion of the other object 282. Namely, the viewer does not always views the moving objects by following their motions in all situations.

If each of the velocities V1 and V2 of the two objects shown in FIG. 23 is sufficiently high, the above-described moving image converting apparatus 100 performs spatial pixel decimation processing for reducing the number of pixels to ¼. Since one of the conditions for preventing a viewer from perceiving image quality degradation is that the viewer views an object by following its motion, when the viewer views the object 282 by following its motion in the situation shown in FIG. 23, the viewer does not perceive image quality degradation as to the object 282, but is very likely to perceive image quality degradation as to the object 281 on which the viewer's line of sight is not fixed. A configuration being a solution to this problem will be described below.

(2) Configuration of Moving Image Converting Apparatus for Executing Improved Decimation Processing A moving image converting apparatus will be described below, which solves the problem imposed by the above-described moving image converting apparatus 100, by executing improved decimation processing whereby data reduction (compression processing) is realised in which image quality degradation is suppressed when a viewer does not view an object by following its motion in a spatially decimated area.

Figure 24:
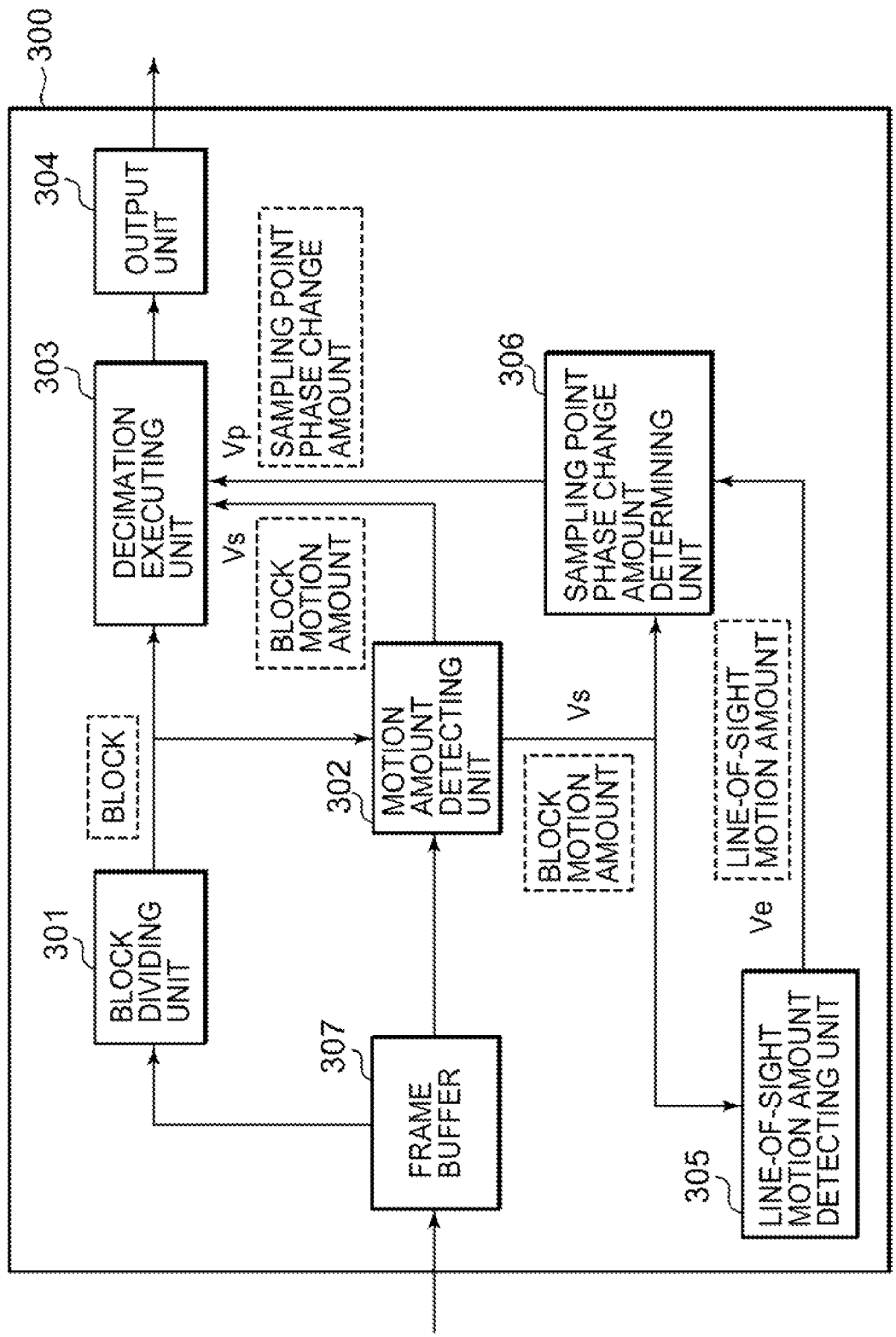
FIG. 24 is a diagram explaining a configuration example of a moving image converting apparatus according to an embodiment of the present invention.

Referring to FIG. 24, the configuration of a moving image converting apparatus 300 for executing improved decimation processing will be described. The moving image converting apparatus 300 shown in FIG. 24 enables, similarly to the moving image converting apparatus 100 described with reference to FIG. 1 above, data reduction that prevents a viewer from perceiving image quality degradation due to the data reduction, by utilizing the super-resolution effect based on the human visual characteristic. Also, the moving image converting apparatus 300 realizes data reduction (data compression) that can minimize image quality degradation perceived by the viewer even when the viewer does not view an object by following its motion.

The configuration of the moving image converting apparatus 300 of FIG. 24 will be described. Data on frames forming inputted moving image data is temporarily accumulated in at frame buffer 307. The accumulated frames are outputted to a block dividing unit 301 and a motion amount detecting unit 302. The block dividing unit 301 divides each, of the inputted frames into blocks each having a preset size, and outputs the resultant block data to the motion amount detecting unit 302 and a decimation executing unit 303. The motion amount detecting unit 302, using the frames supplied thereto from, the frame buffer 307 and the blocks supplied thereto from the block dividing unit 301, detects a motion amount [Vs] for each of the blocks, for output to the decimation executing unit 303 and a sampling point phase change amount determining unit 306.

The sampling point phase change amount determining unit 306 references the block motion amount [Vs] corresponding to each of the blocks supplied thereto from the motion amount detecting unit 302 and a line-of-sight motion amount supplied thereto from a line-of-sight motion amount detecting unit 305, to determine an optimal sampling point phase change amount [Vp] for spatial pixel decimation processing, for output to the decimation executing unit 303.

The decimation executing unit 303 performs spatial pixel decimation processing on the blocks supplied thereto from, the block dividing unit on the basis of their block motion amounts [Vs] supplied thereto from the motion, amount detecting unit 302 and their sampling point phase change amounts [Vp] for the spatial decimation processing supplied thereto from the sampling point phase change amount determining unit 306, and outputs the result to an output unit 304. The output unit 304 outputs data on the data-reduced blocks, which is supplied thereto from the decimation executing unit 303, collectively as, e.g., stream data.

Next, details of processing by each of the units of the moving image converting apparatus 300 for executing the improved decimation processing will be described.

First, the frame buffer 307 will be described. The frame buffer 307 accumulates frame data forming inputted moving image data. The number of frames accumulated in the frame buffer 307 depends on a frame image applied to motion amount detection processing by the motion amount detecting unit 302.

For example, in the motion amount detection processing by the motion amount detecting unit 302, if a current, frame F and a past frame F−k (k is a positive integer) are used to detect the motion amount of the current frame F, the frame buffer 307 is configured to accumulate at least the past frame F−k upon input of the frame F.

Furthermore, in the motion amount detection processing by the motion amount detecting unit 302, if the current frame F and a future frame F+k are used to detect the motion amount of the current frame F, the frame buffer 307 is configured to maintain a state in which the current frame F is held therein until the frame F+k is inputted.

Still furthermore, in the motion amount detection processing by the motion amount detecting unit 302, if the past frame F−k and the future frame F+k are used to detect the motion amount of the frame F, the frame buffer 307 is configured to accumulate at least frames F−k through F+k.

A processing example will be described below as an embodiment, in which the motion amount detecting unit 302 is configured to reference a past frame F−1 when detecting the motion amount of a frame F. Namely, a processing example in which the motion amount of the frame F is detected on the basis of two successive frames will be described. The frame buffer 307 accumulates frames necessary for the motion amount detecting unit 302 to detect the motion amount, and outputs a current frame F to the block dividing unit 301. Also, the frame buffer 307 outputs a frame F−1 necessary for the detection of the motion amount to the motion amount detecting unit 302. It should be noted that there may be various frame settings applicable to the motion amount detection processing by the motion amount detecting unit 302 as mentioned above, and the present invention may be applicable to all of such settings.

Next, processing by the block dividing unit 301 will be described. The block dividing unit 301 divides each of the inputted moving image frames into blocks, each having a preset size, such as 8 pixels×8 pixels, or A pixels×4 pixels, for supply to the motion amount detecting unit 302 and the decimation executing unit 303.

The motion amount detecting unit 302 detects the motion amount, of each of the blocks in the frame F supplied thereto from the block dividing unit 301. Namely, by performing block matching using the frame (frame F−1) supplied thereto from the frame buffer 307 as a referenced frame, block-based motion amounts (in this case, motion amounts (pixel(s)/frame) with respect to a single frame are detected. The motion amount detecting unit 302 supplies the detected block motion amount [Vs] for each block to the sampling point phase change amount determining unit 306 and the line-of-sight motion amount detecting unit 305.

It should be noted that the referencing frame applied to the motion amount detection executed by the motion amount detecting unit 302 is not limited to the past frame F−1, but may be a past frame F−k before the past frame F−1 or a future frame F+k, as mentioned above. Also, a motion amount detecting method other than the block matching method may be used. A motion amount detected by the motion amount detecting unit 302 is represented as a component of a motion vector corresponding to each of the blocks. The motion vector represents the horizontal (X-axis) and vertical (Y-axis) motion amounts between frames.

Next, the line-of-sight motion amount detecting unit 305 will be described. The line-of-sight motion amount detecting unit 305 detects a predicted amount of the motion of a viewer's line of sight corresponding to each of the blocks forming a frame. In the moving image converting apparatus 300 of the present invention, the line-of-sight motion amount detecting unit 305 detects a predicted line-of-sight motion amount, on the basis of the motion amount corresponding to each block forming the frame. The line-of-sight motion amount detecting unit 305 outputs the predicted line-of-sight motion amount to the sampling point phase change amount determining unit as a line-of-sight motion amount [Ve].

Namely, the motion amount detecting unit 302 detects
a block-based block motion amount [Vs], and the line-of-sight motion amount detecting unit 305 detects
a block-based line-of-sight motion amount [Ve].

In the apparatus described with reference to FIGS. 1 to 22 above, a configuration has been considered in which the super-resolution effect is induced, under the assumption that the line-of-sight motion amount, equals the motion amount of a block detected by the motion, amount detecting section.

However, in below-described processing according to a configuration of the present invention,
the block motion amount [Vs] of a block detected by the motion amount detecting unit 302 and
the block-based line-of-sight motion amount [Ve] detected by the line-of-sight motion amount detecting unit 305 are not necessarily equal. Namely, the line-of-sight motion amount detecting unit 305 does not assume that a viewer views a block by following its motion, but predicts a line-of-sight motion most likely to be made when the viewer is viewing the vicinity of the block, and calculates this predicted value as a line-of-sight motion amount [Ve].

If the viewer perfectly views, by following its motion, an object contained in a block, high-definition playback based on the super-resolution effect, can be implemented by the apparatus described with reference to FIGS. 1 to 22. However, if the viewer is not viewing the object by following its motion, a difference occurs between the block motion amount and the predicted block-based line-of-sight motion amount, causing the viewer to perceive image quality degradation. In the processing of the present invention, it is configured such that the viewer does not sense a degradation in the image quality even when this difference occurs.

The line-of-sight motion amount detecting unit 305 detects a line-of-sight motion amount [Ve] for each block. For example, the line-of-sight motion amount [Ve] for a certain block B is the motion velocity of a viewer's gazing point under the assumption that the line of sight passes on or near the block B, and thus this motion does not necessarily need to coincide with the actual line-of-sight motion. Also, the line-of-sight motion amount [Ve] in the present invention is calculated as a motion amount independent of the motion amount [Vs] of the block B, in principle. Namely, the line-of-sight motion amount detecting unit 305 determines the line-of-sight motion amount [Ve] as an independent value irrelevant to whether the viewer is viewing the block B by following its motion or not. Namely, the line-of-sight motion amount detecting unit 305 predicts a line-of-sight motion most likely to be made when the viewer is viewing the vicinity of the block B including the block B, for calculation as a line-of-sight motion amount [Ve]. Examples of methods for detecting a line-of-sight motion amount [Ve] for a certain block will be described below.

Figure 25:
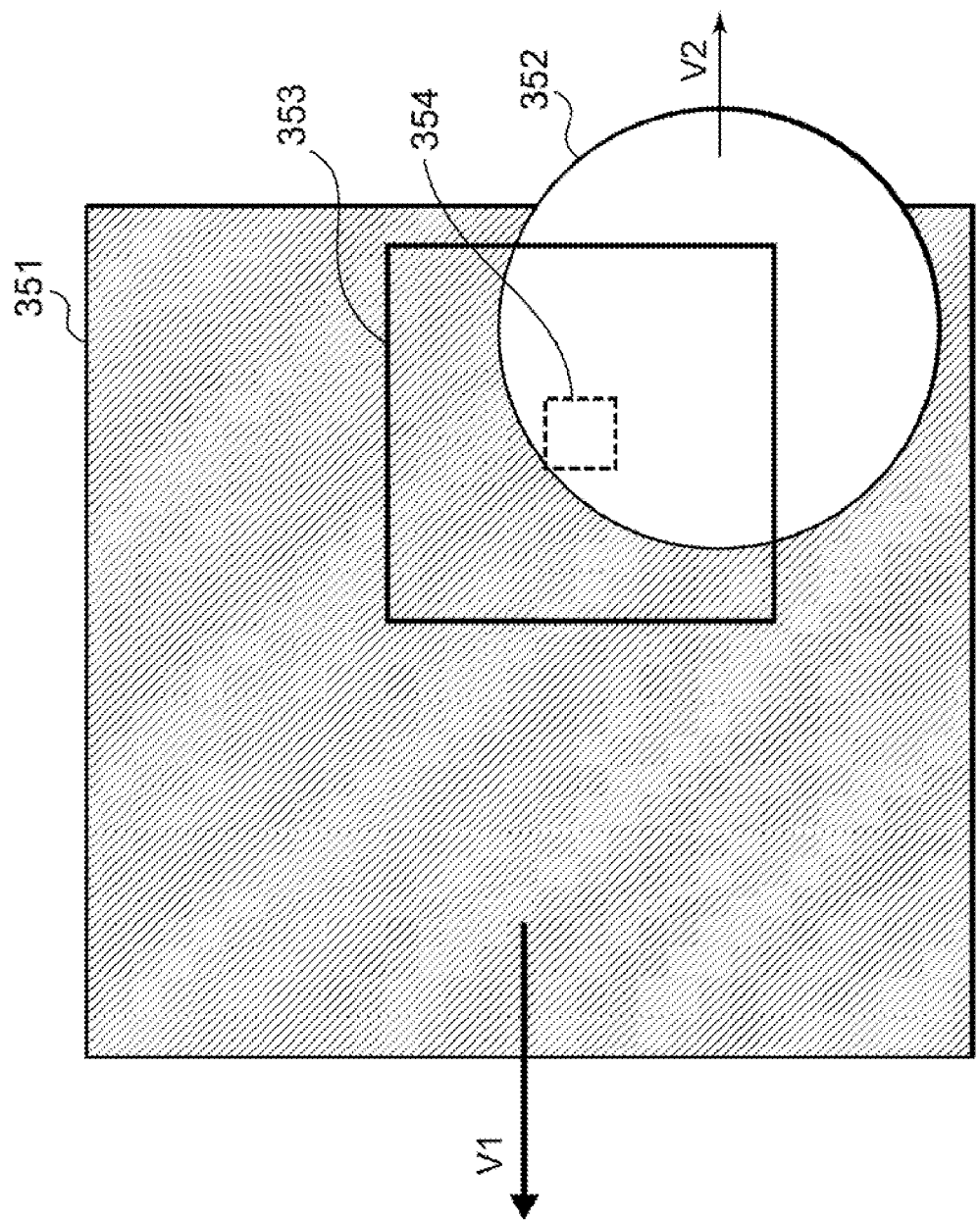
FIG. 25 is a diagram explaining an example of a method of detecting a line-of-sight motion amount [Ve] corresponding to a block.
Figure 26:
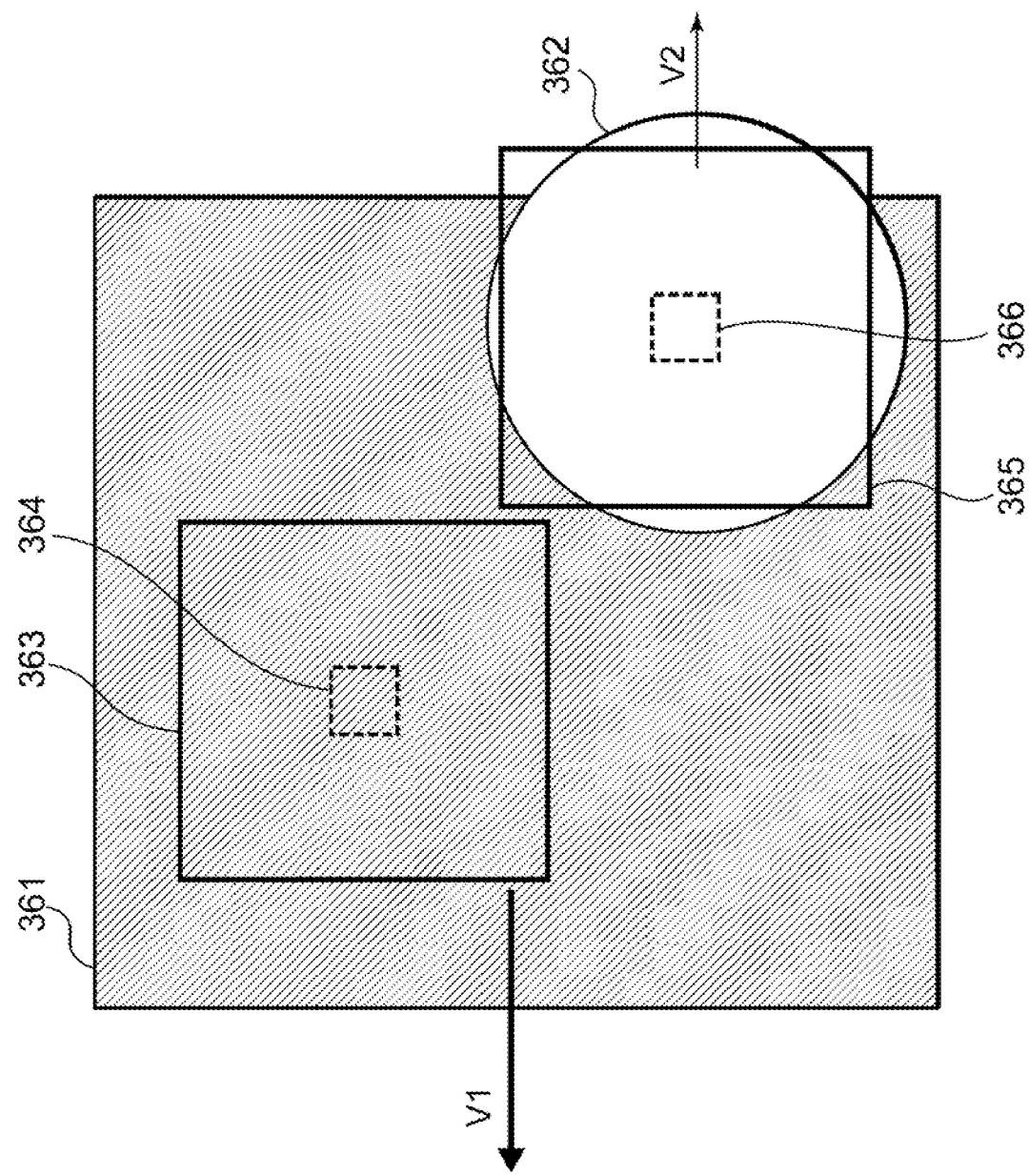
FIG. 26 is a diagram explaining an example of a method of detecting a line-of-sight motion amount [Ve] corresponding to a block.

Referring to FIGS. 25 and 26, examples of methods for detecting a line-of-sight motion amount [Ve] corresponding to a block will be described. FIG. 25 shows a state in which horizontally moving two objects 351 and 352 are passing each other. The object 351 is moving to left at a velocity V1 as indicated by the thick arrow, whereas the object 352 is moving to right at a velocity V2 as indicated by the slender arrow. Let a rectangle 354 (block 354) indicated by the broken line be a block consisting of, e.g., 4×4 pixels for which a line-of-sight motion amount [Ve] is to be detected. Since the block 354 is completely contained in the object 352, the motion amount corresponding to the block 354 is calculated as V2 by the motion amount detecting unit 302.

Here, the line-of-sight motion amount detecting unit 305 predicts the line-of-sight motion amount [Ve] corresponding to the block 354. The line-of-sight motion amount [Ve] is calculated by predicting a line-of-sight motion most likely to be made when a viewer does not view that block by following its motion, in principle. Therefore, the motion amount [Vs] of the block 354 is not necessarily equal to V2.

The line-of-sight motion amount detecting unit 305 sets a block expansion area 353 having the block 354 at the center as an area for calculation of the line-of-sight motion amount [Ve], and counts occurrences of block motion amounts [Vs] of all blocks contained in the block expansion area 353. The line-of-sight motion amount detecting unit 305 sets, as a line-of-sight motion amount, a motion amount which is different from V2 being the motion amount of the block 354 and which has the highest occurrence, among the motion amount values of the blocks contained in the block expansion area 353.

In an example shown in FIG. 25, the motion amount having the highest occurrence is V1 among the motion amounts of all the blocks contained in the block expansion, area 353. Since V1 is different from V2, V1 is set as the line-of-sight motion amount corresponding to the block 354, i.e., the line-of-sight motion amount Ve=V1. The line-of-sight motion amount, detecting unit 305 performs the above-mentioned operation on all the blocks, to determine the line-of-sight motion amount corresponding to each block.

Referring to FIG. 26, another example of processing by the line-of-sight motion amount detecting unit 305 will be described. In FIG. 26, the motions of objects 361, 362 are similar to those of the objects 351, 352 of FIG. 25. To perform line-of-sight motion amount detection processing for a block 364 in this configuration, a block expansion area 363 is set. In this configuration, the motion amounts of all blocks contained in the block expansion area 363 are similar to the motion amount of the center block 364.

In such a case, V1 is assigned as the line-of-sight motion amount corresponding to the block 364; i.e., Ve=V1. Similarly, in a block expansion area 365 in which the motion amounts of almost all blocks are similar to the motion amount of a center block 366, V2 is assigned as the line-of-sight motion amount corresponding to the block 366; i.e., the line-of-sight motion amount Ve=V2. In order to judge whether the majority of the motion amounts of blocks in a block expansion area is similar to the motion amount of a center block, the line-of-sight motion amount detecting unit 305 executes, e.g., below-described processing.

The line-of-sight motion amount detecting unit 305 holds a preset threshold R, and judges, when the number of blocks Nc having the same (or almost the same) motion amount as that of a center block exceeds the threshold R, that the majority of the motion amounts of blocks in a block expansion area is similar to the motion amount of the center block, thus setting a value equal to the motion amounts of the blocks as the line-of-sight motion amount.

The above line-of-sight motion amount determining processing is based on a guess that a viewer is apt to gaze an object occupying the largest area within a specific range of view around a block. It should be noted that a block expansion area may have any shape and size, as long as it contains a block for line-of-sight motion amount determination and has a size larger than a center block. If the center block has a size of 4×4 pixels, the block expansion area may be of a size about ten times that of the center block in both length and width, e.g., a square whose side is 30 to 50 pixels long.

Thus, the moving image converting apparatus of the present invention calculates the block motion amount [Vs]

in its motion amount detecting unit 302, and the block-based line-of-sight motion amount [Ve] in its line-of-sight motion amount detecting unit 305, and executes decimation processing based on these values to perform data compression (reduction).

It should be noted that the above processing by the line-of-sight motion amount detecting unit 305 is based on the processing of predicting the viewer's line-of-sight motion amount on the basis of the moving image data. The method, for detecting the line-of-sight motion amount is not limited to the one described above, but may include various other methods.

Figure 27:
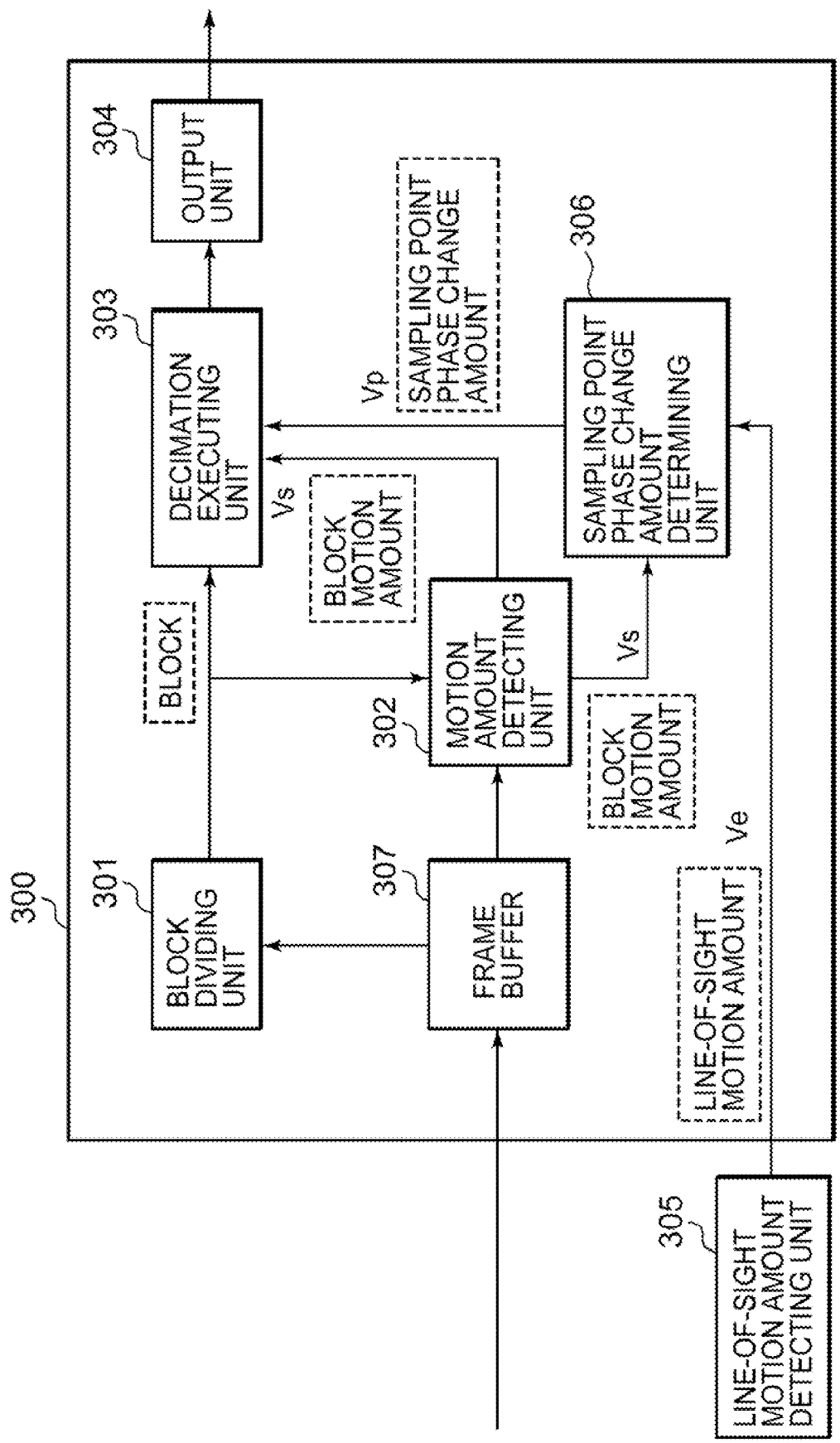
FIG. 27 is a diagram explaining a configuration example of a moving image converting apparatus according to an embodiment of the present invention.

For example, the motion of an eyeball of a viewer who is actually viewing a moving image is imaged using an externally arranged sensor or the like, to calculate an actual line-of-sight motion amount from the eyeball motion. In such a case, the actual line-of-sight motion amount, may be set for all blocks as their block-based line-of-sight motion amount. For such a configuration, the line-of-sight motion amount detecting unit 305 is disposed outside the moving image converting apparatus 300, as shown in FIG. 27, and thus the line-of-sight motion amount detecting unit 305 does not need a supply of block-based motion amounts from the motion amount detecting unit 302.

It may thus be configured such that the block-based line-of-sight motion amount is set as attribute information corresponding to a block of moving image data on the basis of the motion of an eyeball of a viewer who is actually viewing the image, to perform data compression (reduction) according to the attribute information.

Next, details of processing executed by the sampling point phase change amount determining unit 306 will be described. The sampling point phase change amount determining unit 306 receives as input information items being a line-of-sight motion amount [Ve] corresponding to each block supplied thereto from the line-of-sight motion amount detecting unit 305 and a block motion amount [Vs] corresponding to each block supplied thereto from the motion amount detecting unit 302, both units shown in FIG. 24 or 27, determines a sampling point phase change amount [Vp] on the basis of these inputted information items, and outputs the determined sampling point phase change amount [Vp] to the decimation executing unit 303. The decimation executing unit 303 executes decimation processing based on the sampling point phase change amount [Vp] supplied thereto from the sampling point phase change amount determining unit 306 in spatial pixel decimation to be performed on each block.

The processing of determining the sampling point phase change amount [Vp] in the sampling point phase change amount determining unit 306 includes the following two steps.

(First Step Processing) Candidate Determination Processing for Determining Sampling Point Phase Change Amount [Vp] Candidates Based on Image Quality Rating Characteristics (Second Step Processing) Final Determination Processing for Determining a Sampling Point Phase Change Amount [Vp] Optimal for a Line-of-Sight Velocity Details of these steps will be described below.

(First Step Processing) Candidate Determination Processing for Determining Sampling Point Phase Change Amount [Vp] Candidates Based on Image Quality Rating Characteristics This first step processing is processing similar to the decimation processing mode determining scheme adopted by the moving image converting apparatus 100 described in Japanese Patent Application Publication No. 2006-5904 filed earlier by the present applicant, and is performed on the basis of image quality rating curves shown in, e.g., FIGS. 28 to 31 and 32.

Figure 28:
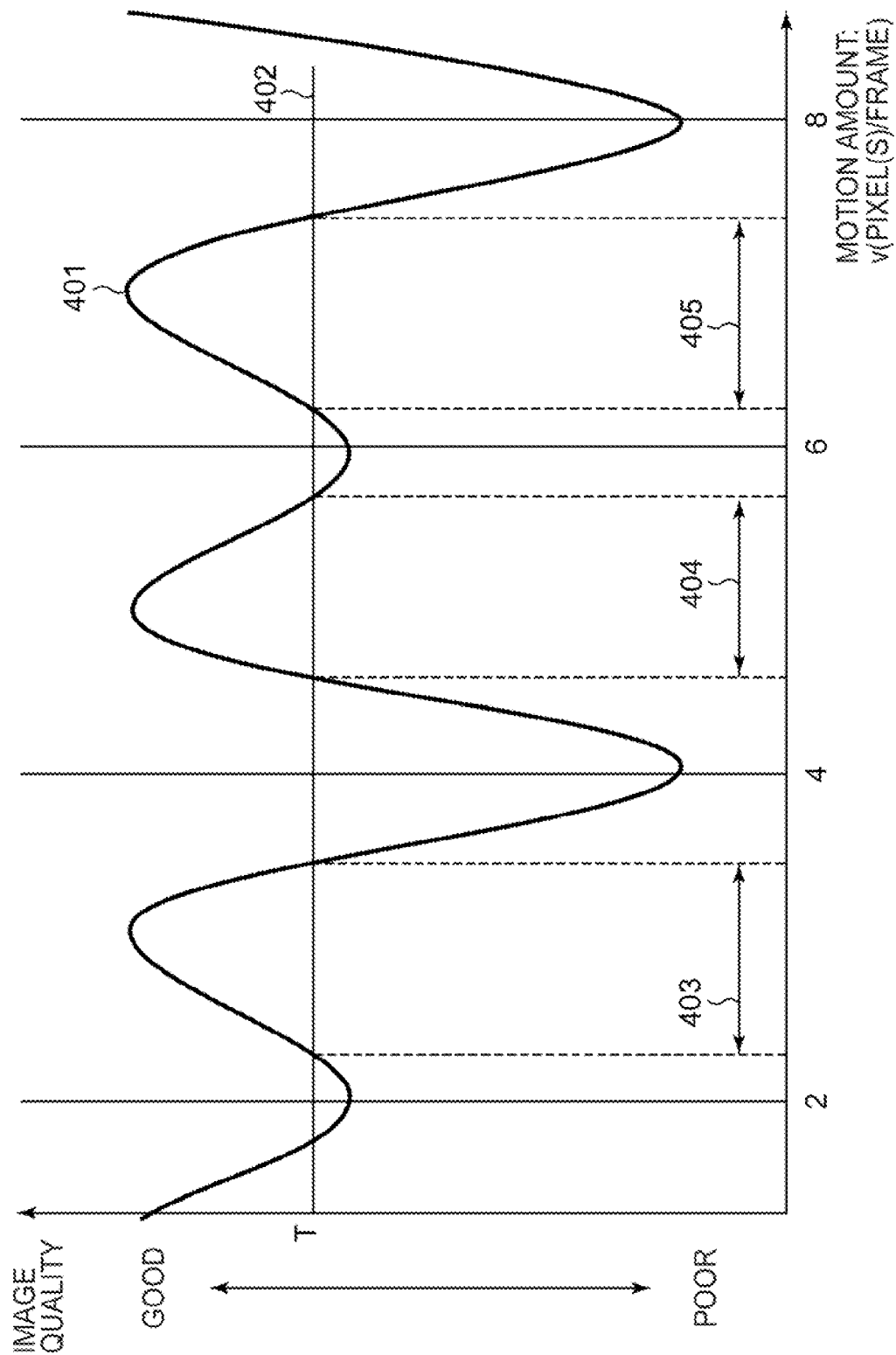
FIG. 28 is a diagram showing an image quality rating curve obtained when converted image data generated by spatial decimation with a sampling point phase change amount=0 is reconstructed and played back, and further viewed by following the motion.

A graph shown in FIG. 28, in which the abscissa indicates the value of the motion amount of an object, is a graph recording image quality ratings obtained when converted image data resulting from spatial pixel decimation processing with the sampling point phase change amount =0 is reconstructed and played back, and further viewed by following the motion. This graph is similar to that shown in FIG. 8. A tendency observed in the results of a subjective rating test obtained when an object is moved to right at motion amounts indicated on the abscissa is shown as an image quality rating curve 401 (similar to the curve 205 in FIG. 8). The ordinate indicates image quality ratings (the higher the rating, the better the image quality).

A reference rating denoted T in FIG. 28 is set, and velocity areas rated T or above are shown as high-image-quality motion amount areas 403 to 405. It is seen from FIG. 28 that a good image quality can be obtained even by the decimation processing with the sampling point phase change amount =0, when the object is moving at the velocities of these areas 403 to 405.

Figure 29:
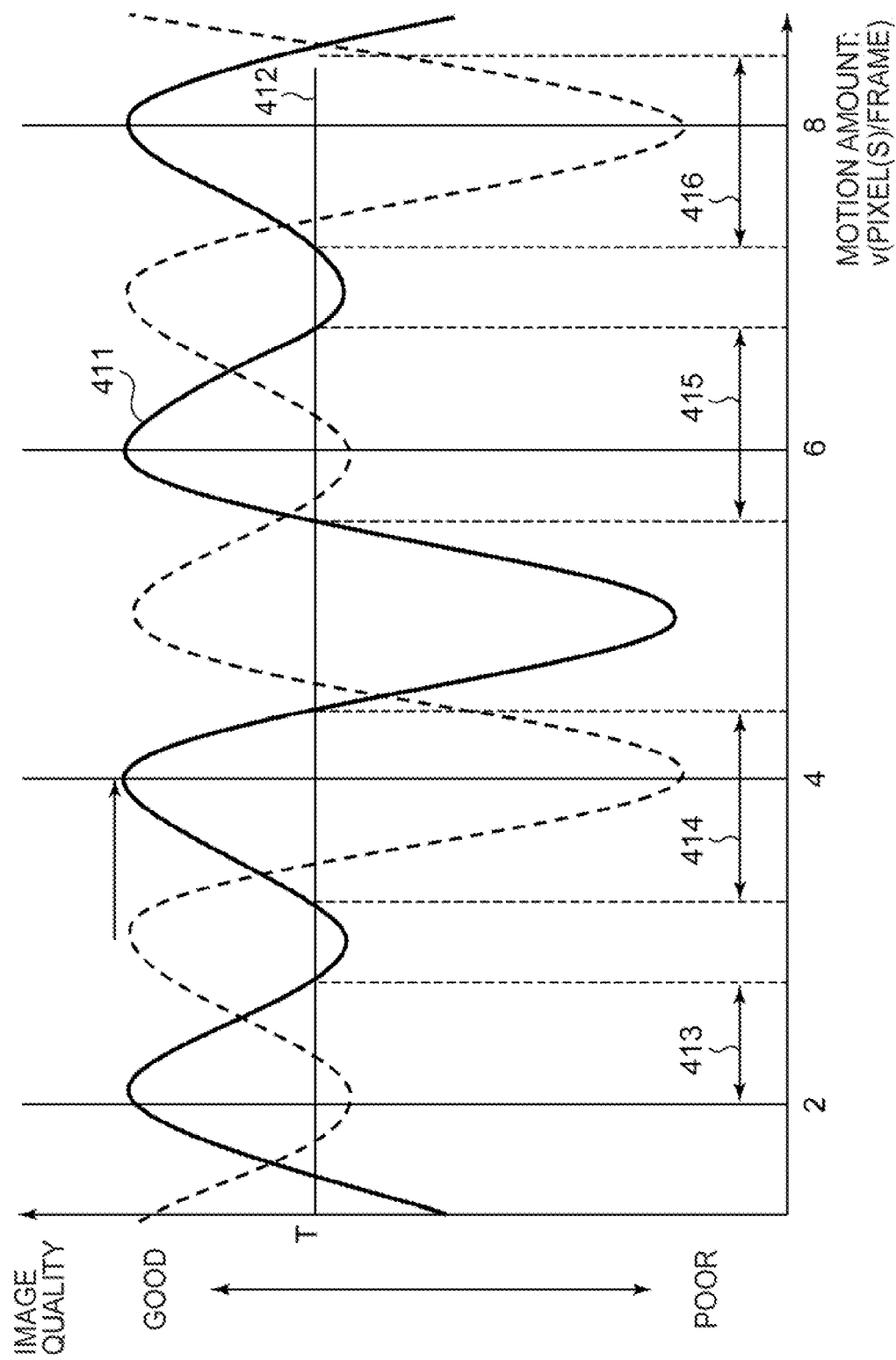
FIG. 29 is a diagram showing an image quality rating curve with a sampling point phase change amount=+1.
Figure 30:
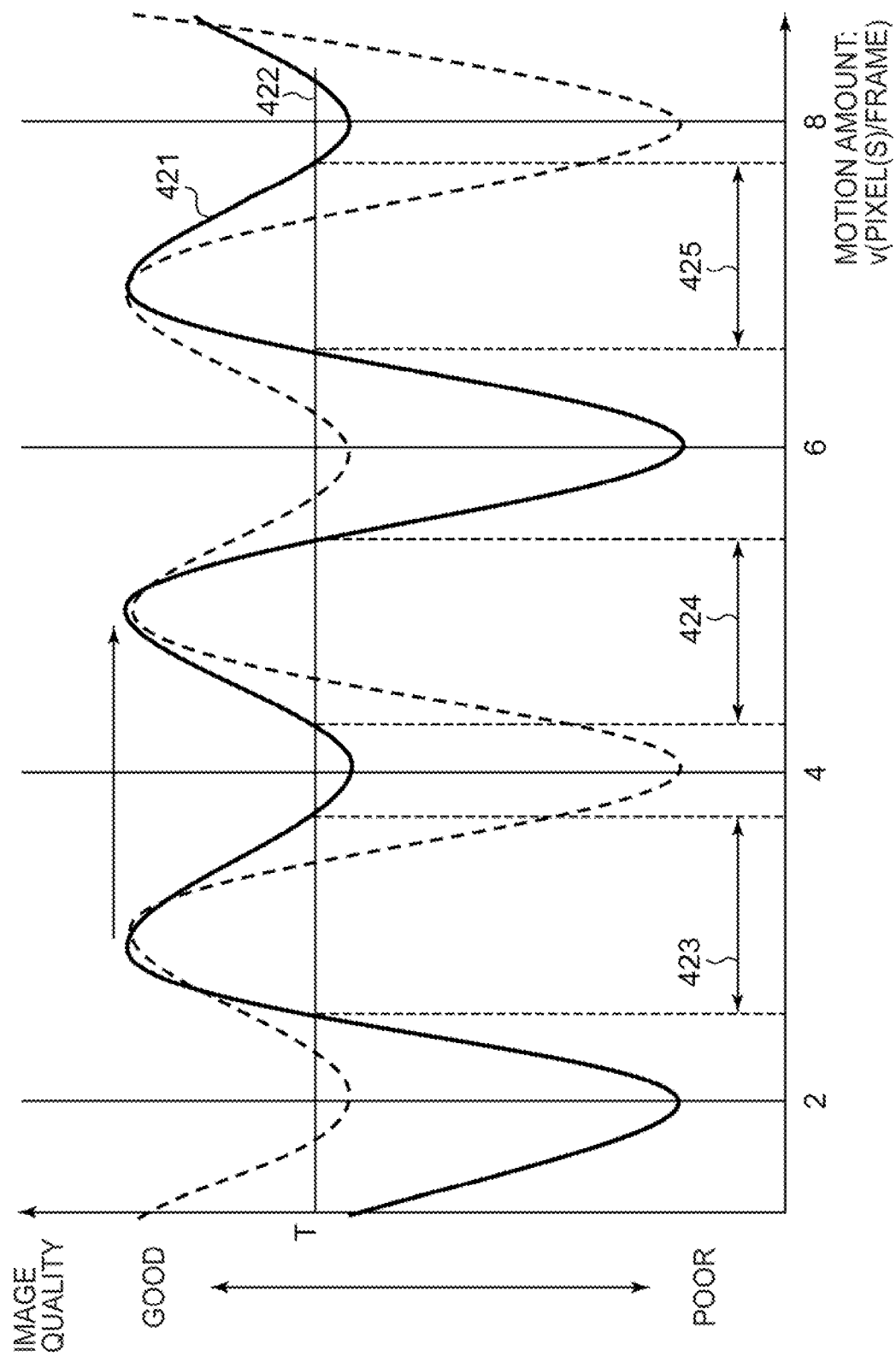
FIG. 30 is a diagram showing an image quality rating curve with a sampling point phase change amount=+2.
Figure 31:
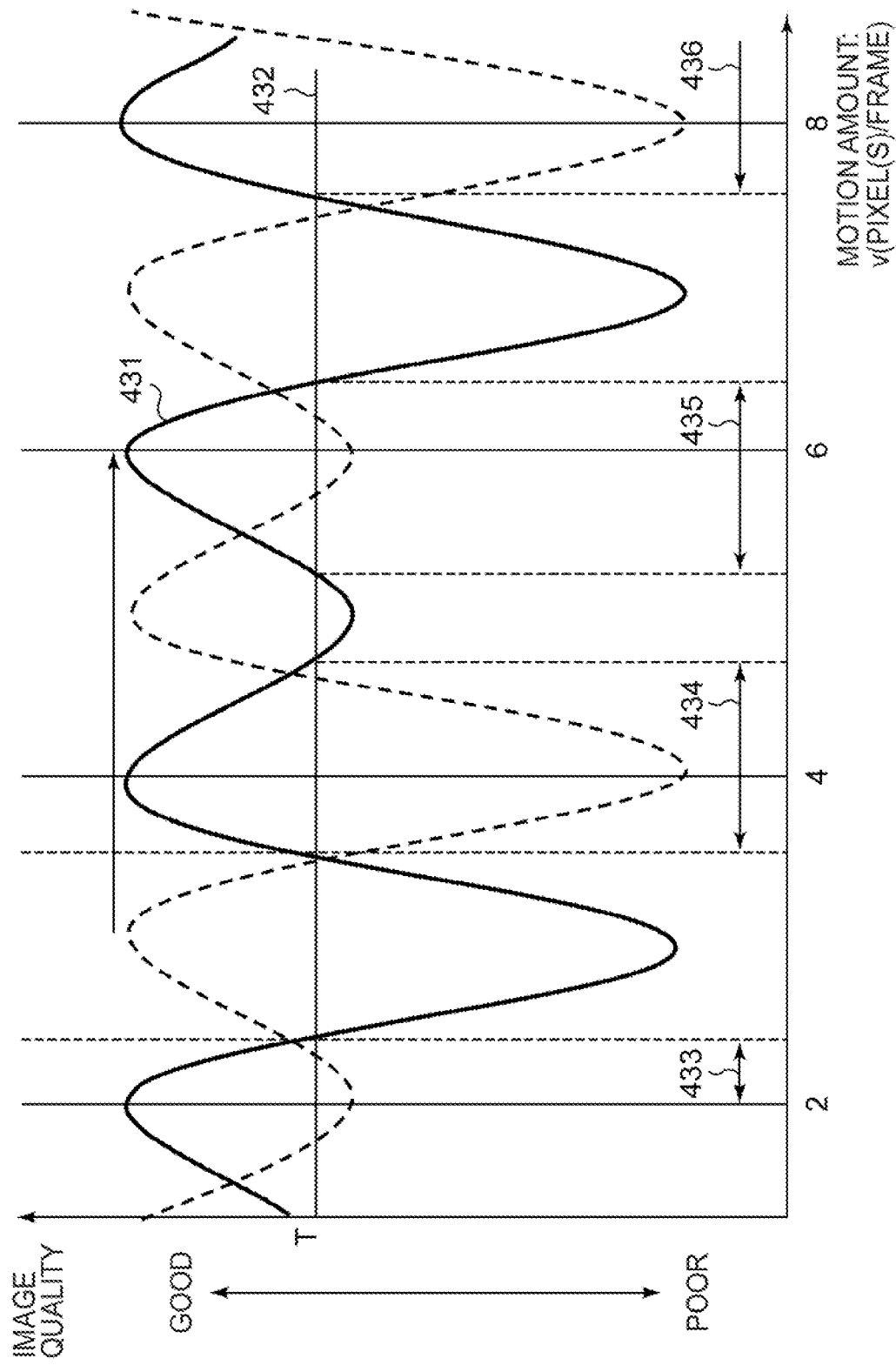
FIG. 31 is a diagram showing an image quality rating curve with a sampling point phase change amount=+3.

FIGS. 29 to 31 show image quality rating curves obtained by shifting the curve 401 of FIG. 28 to right, and respectively correspond to:

a case where the sampling point phase change amount =+1;

a case where the sampling point phase change amount =+2; and a case where the sampling point phase change amount =+3.

A description will be given below of why the image quality rating curves for different sampling point phase change amounts can be obtained by shifting the curve 401 of FIG. 28 to right.

As already shown in (Eq. 4), the decimation position shifting processing (processing with the sampling point phase change amount≠0) amounts to adding the sampling point shifting amount $\phi_t$ indicated in (Eq. 3) by 1/m per frame (for shifting to right) or subtracting the sampling point shifting amount $\phi_t$ by 1/m per frame (for shifting to left). It should be noted that m is the decimation amount (m pixel(s)). Furthermore, Typically, decimation processing with a sampling point phase change amount=P amounts to adding the sampling point shifting amount $\phi_t$ indicated in (Eq. 3) by 1/m per frame. A new sampling point shifting amount $\phi'_t$ resulting from pixel decimation processing performed under the sampling point phase change amount=P is given by the following mathematical expression (Eq. 5).

[Math 4]

$$\phi'_t = \phi_i + \frac{P}{m}\frac{t}{T} \quad \text{(Eq. 5)}$$
$$= -\frac{v}{m}\frac{t}{T} + \frac{P}{m}\frac{t}{T}$$
$$= \frac{-(v-P)}{m}\frac{t}{T}$$

Eventually, it is seen from (Eq. 5) that performing the decimation processing with the sampling point phase change amount =P amounts to conceptually decreasing the motion velocity v of an object. This indicates that, e.g., for P=1, an image quality rating at v=V1 can be obtained from an image quality rating at v=V1−1 for P=0. Hence, it is seen that an image quality rating curve (a curve 411 of FIG. 29) for P=1 can be obtained by shifting the curve 401 (curve indicated by the broken line in FIG. 29) of FIG. 28 to right by one pixel. Velocity areas rated T (reference rating) or above are shown as high-image-quality motion amount areas 413 to 416.

Similarly, since an image quality rating at v=Vp for the sampling point phase change amount P=0 can be obtained from: an image quality rating at a velocity v=Vp−P for the sampling point phase change amount =0, an image quality rating curve 421 for P=2 of FIG. 30 can be obtained by shifting the curve 401 (curve indicated by the broken line in FIG. 30) to right by 2 pixels. Velocity areas rated T or above are shown as high-image-quality motion amount areas 423 to 425.

Furthermore, it is seen that an image quality rating curve 431 for P=3 of FIG. 31 can be obtained by stifling the curve 401 (curve indicated by the broken line in FIG. 31) to right by 3 pixels. Velocity areas rated T or above are shown as high-image-quality motion amount areas 433 to 436.

It should be noted that image quality rating curves other than for the sampling point phase change amount P=0 are obtained by simulation in the above way. However, graphs for all sampling point phase change amounts may be obtained by actual tests or the like, similarly to the case where P=0.

Figure 32:
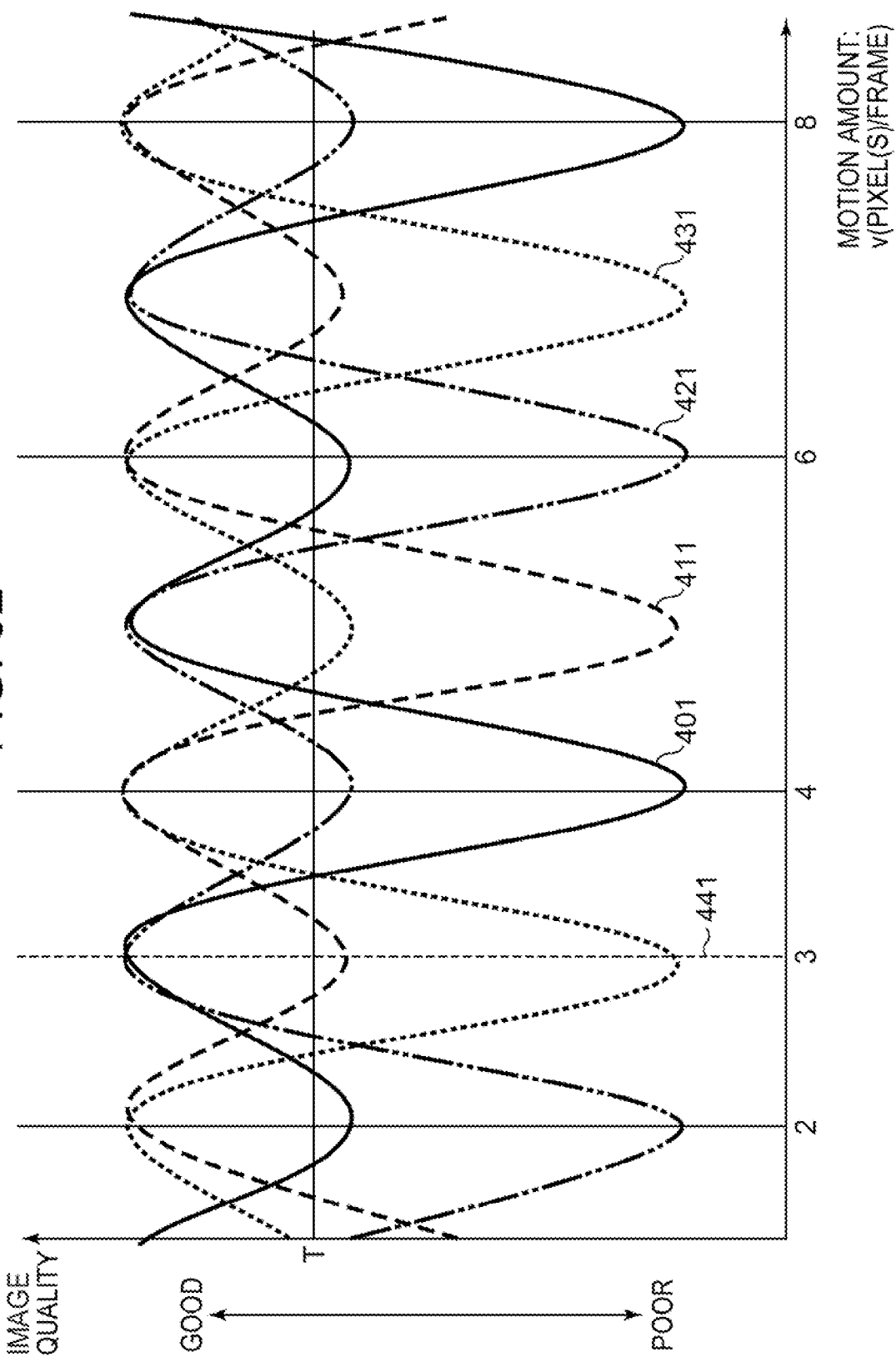
FIG. 32 is a diagram showing all the image quality rating curves of FIGS. 28 to 31.

FIG. 32 is a diagram showing all the image quality rating curves 401, 411, 421, 431 of FIGS. 28 to 31. As can be understood form FIG. 32, there are a plurality of sampling point phase change amounts with which image quality ratings are above the threshold T (a good image quality can be obtained), for all the velocities.

For example, at a position in FIG. 32 (on a broken line 441) where the motion amount v=3 pixels/frame, the curves 401 and 421 are above the threshold T. Namely, it is seen that if v=3, decimation processing with the sampling point phase change amount P=0 or 2 can provide high-quality images in which a viewer finds no image quality degradation.

Thus, in the first step processing, the sampling point phase change amount determining unit 306 determines a plurality of sampling point phase change amount [Vp] candidates that can provide a good image quality (above the threshold T) for each of the block motion amounts [Vs] corresponding to blocks supplied thereto from the motion amount detecting unit 302, on the basis of the image quality rating curves corresponding to sampling point phase change amounts.

In the above examples, the graphs were obtained by shifting the converted image data to right. Since the image quality rating curves shown in FIGS. 26 to 32 do not depend on the motion directions (horizontal/vertical) of the image data, sampling point phase change amount candidates for pixel decimation processing in the vertical direction can also be determined by using FIGS. 28 to 32.

Furthermore, the graphs shown in FIGS. 29 to 31 are examples obtained by shifting the converted image data to right. In decimation for selecting, e.g., 1 pixel from 4 pixels, the following result is obtained:

sampling point phase change amount =+3 equals sampling point phase change amount =−1;

sampling point phase change amount =+2 equals sampling point phase change amount =−2; and sampling point phase change amount=+1 equals sampling point phase change amount =−3.

Thus, in decimation for selecting 1 pixel from 4 pixels, graphs for the sampling point phase change amount =0 to 3 can cover all sampling point phase change amounts.

Furthermore, the above examples deal with the image quality rating characteristics for the decimation amount M=4. However, for other decimation amounts, similar means can be used to generate their image quality rating characteristics. Namely, first, converted image data is generated with the sampling point phase change amount =0. Next, the converted image is displayed by changing its motion velocity, to rate its quality. Thereafter, the obtained image quality rating curve is shifted, whereby rating curves corresponding to all sampling point phase change amounts for the decimation amount M can be obtained. However, the rating curves corresponding to all sampling point phase change amounts may alternatively be obtained by testing. Namely, for sampling point phase change amounts other than 0, rating curves can be obtained by actually generating converted image data, and then displaying the image by changing its velocity.

It should be noted that depending on the value of the decimation amount M, a plurality of sampling point phase change amounts that can provide image quality ratings above the threshold T may not be selected for a certain velocity in all cases. Namely, in a case, there may be only one sampling point phase change amount that can provide image quality ratings above T, for a certain velocity. In such a case, such only one sampling point phase change amount is selected as a candidate.

Thus, the sampling point phase change amount determining unit 306 determines, in its first step processing, a plurality of sampling point, phase change amount [Vp] candidates that can provide a good image quality (rated above T (threshold)) for each of the block motion amounts [Vs] corresponding to blocks supplied thereto from the motion amount detecting unit 302, by applying the image quality rating curves corresponding to sampling point phase change amounts.

Namely, the unit 306 determines a plurality of sampling point phase change amount [Vp] candidates that can provide a good image quality (rated above X) on the basis of the block motion amount [Vs].

(Second Step Processing) Final Determination Processing for Determining a Sampling Point Phase Change Amount [Vp] Optimal for a Line-of-Sight Velocity Next, the sampling point phase change amount determining unit 306 performs the second step processing. Namely, the unit 306 determines a sampling point phase change amount. [Vp] optimal for a line-of-sight motion amount [Ve] supplied thereto from the line-of-sight motion amount detecting unit 305, from among the above-described sampling point phase change amount candidates, i.e., sampling point phase change amount [Vp] candidates that can provide a good image quality (rated above T).

Namely, the unit 306 further determines a sampling point phase change amount [Vp] optimal for a line-of-sight motion amount [Ve] supplied thereto from the line-of-sight motion amount detecting unit 305, from among the sampling point phase change amount [Vp] candidates selected for a block motion amount. [Vs] and considered to provide a good image quality (rated above T) in the first step processing.

All the sampling point phase change amount candidates obtained in the first step processing can provide a good image quality if a viewer views an object by following its motion. Thus, in the second step processing, a final sampling point phase change amount determination is made, in which what video a viewer perceives when he does not view an object by following its motion, i.e., under a non-motion-following viewing condition, is considered.

A video perceived by a viewer when the viewer is not following its motion is determined by the following values:

a block motion amount [Vs] being the motion velocity of an object;

a sampling point phase change amount [Vp]; and a line-of-sight motion amount [Ve] being the motion velocity of the line of sight of the viewer.

Figure 33:
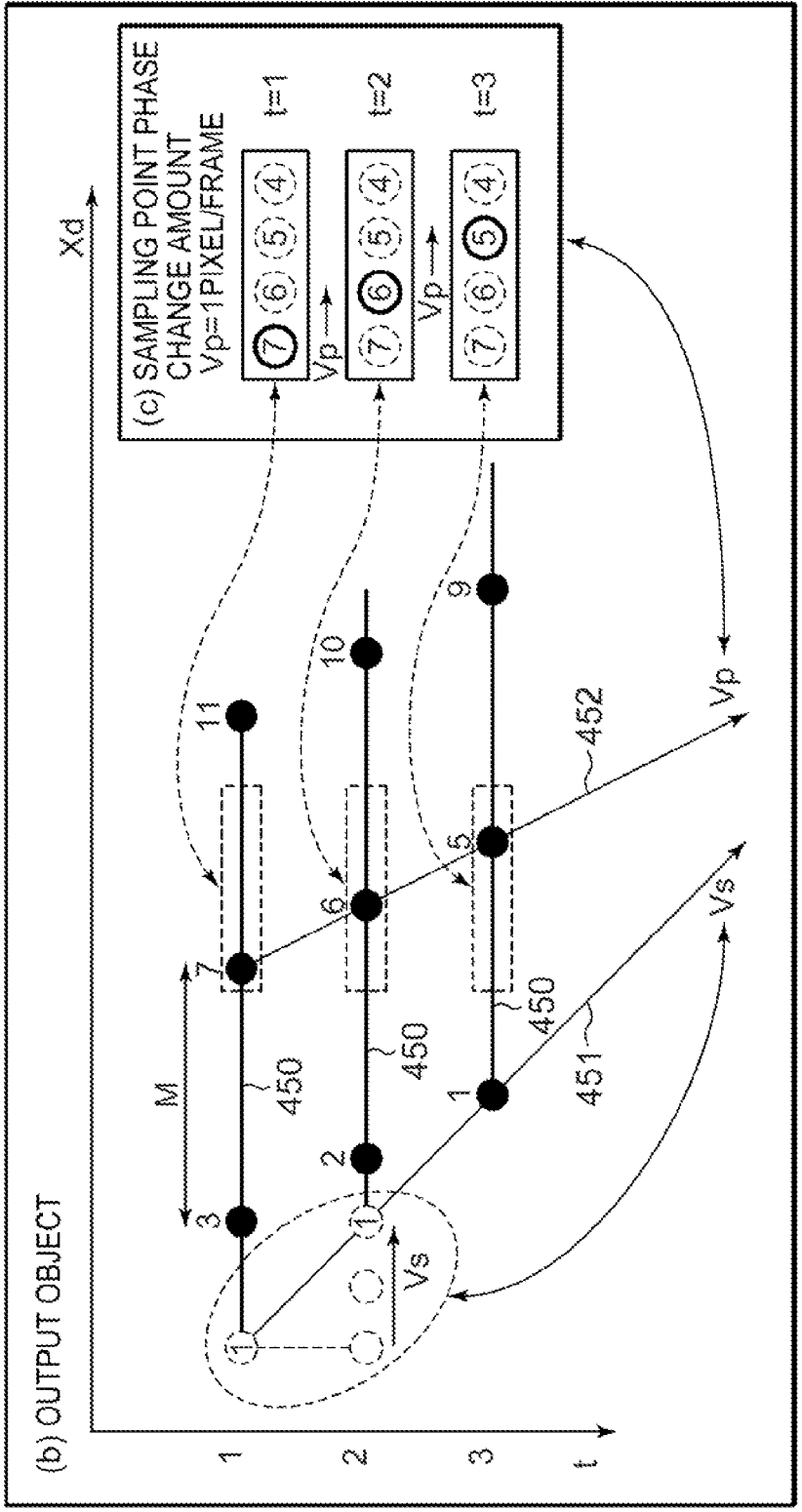
FIG. 33 is a diagram showing how a decimated object is displayed in a display coordinate system in which the ordinate indicates time t (frame) and the abscissa indicates a horizontal coordinate Xd.

FIG. 33 is a display coordinate system (how an image is displayed on a display), in which the ordinate indicates time t (frames) and the abscissa indicates a horizontal coordinate Xd in the display coordinate system, and shows how a decimated object is displayed.

An object 453 shown above in FIG. 33 (a) is a pre-decimating original object, in which pixels forming the object 453 is numbered from 1 to 11.

An output object 450 shown below in FIG. 33 (b) results from the decimation of the object 453 at times t=1, 2, 3.

At the time t1, sampling points 3, 7, 11 are outputted which were selected in the decimation processing for extracting 1 pixel from 4 pixels.

At the time t=2, sampling points 2, 6, 10 are outputted, and at the time t=3, sampling points 1, 5, 9 are outputted.

Thus, the output object 450 is a moving object, that moves to right as the time t elapses (t=1, 2, 3). The motion velocity of the output object 450 at this time is [Vs] which corresponds to the block motion amount. An arrow 451 indicated in the figure is a block motion amount corresponding arrow. It is indicated that the object motion velocity (=block motion amount [Vs]) is smaller when the block motion amount corresponding arrow 451 is nearer to the vertical, and is larger when the block motion amount corresponding arrow 451 is nearer to the horizontal. In an example shown in the figure, the object motion velocity (=block motion amount [Vs]) is approximately 2 pixels/frame. Namely, Vs=+2. It should be noted that the right direction is indicated as [+] and the left direction as [−] in this processing example.

The distance [M] between adjacent solid circles in the output image equals a decimation amount (sampling interval=M). A change from one solid circle position to another equals a sampling point phase change amount [Vp]. Similarly to the object velocity, a sampling point phase change amount arrow 452 represents the magnitude of the velocity (phase change amount). As shown in FIG. 33 (c), the sampling point phase change amount [Vp] corresponds to the motion amount per frame of a sampling point selected in decimation processing. In the example shown in the figure, the sampling points are selected by moving pixels to right one at a time as forwarding the frames at the times t=1, 2, 3. The sampling point phase change amount Vp in this case is Vp=+1. It should be noted that the right direction is indicated as [+] and the left direction as [−] in this processing example.

Figure 34:
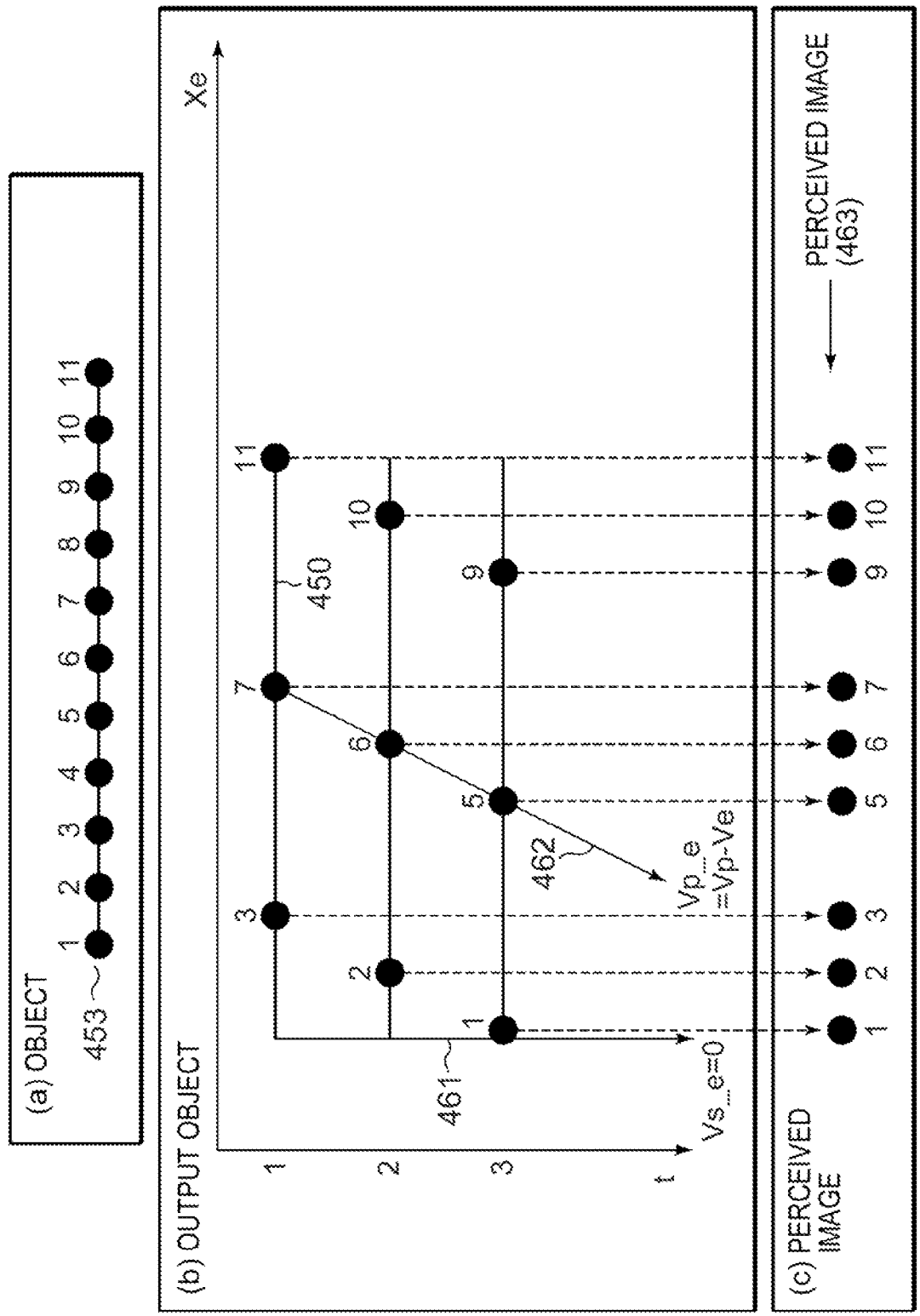
FIG. 34 is a diagram explaining a state of an image formed on the retina of a viewer when the viewer actually views a decimated image.
Figure 35:
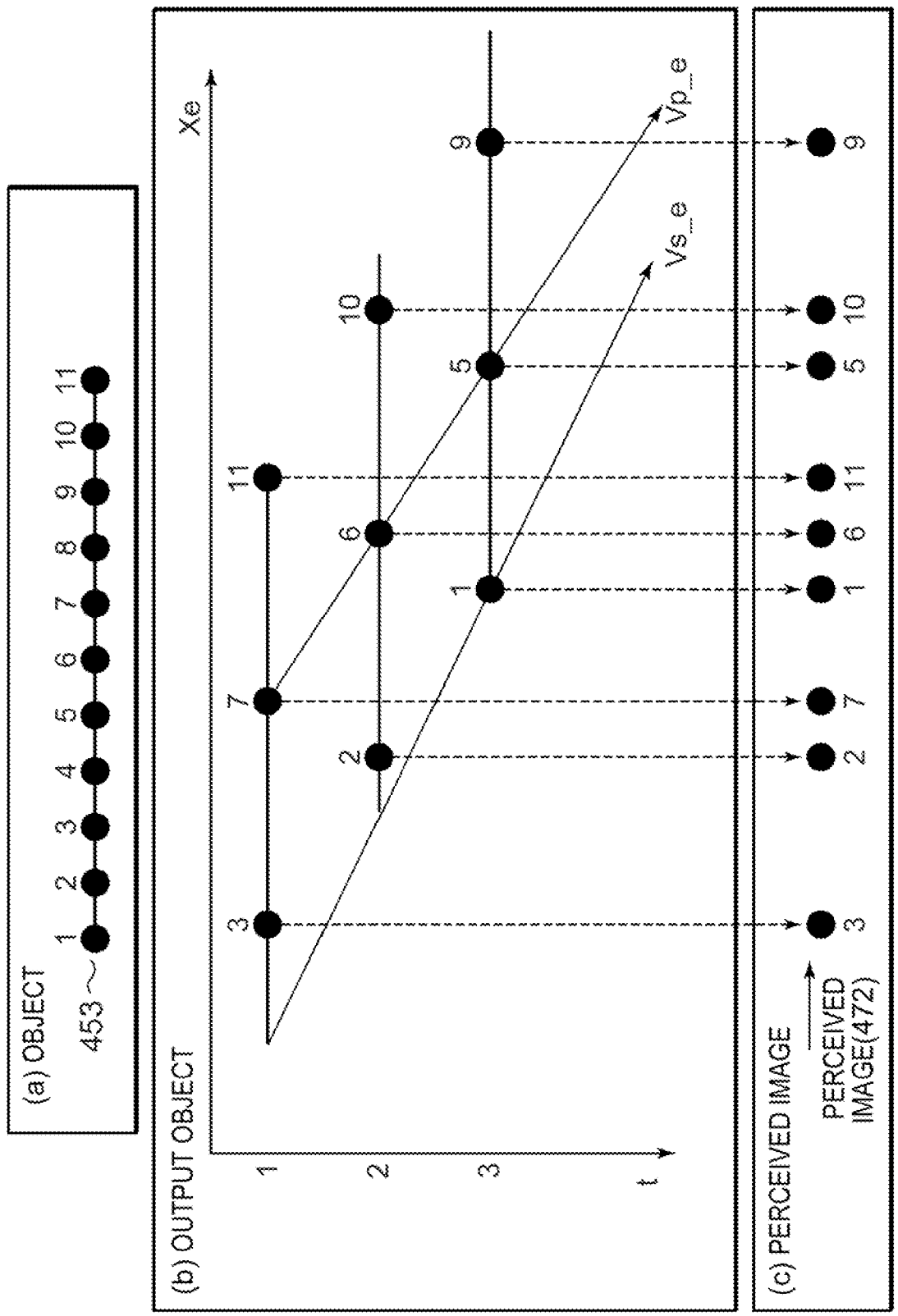
FIG. 35 is a diagram explaining a state of an image formed on the retina of a viewer when the viewer actually views a decimated image.

Referring next to FIGS. 34 and 35, a description will be given of how such a decimated image is imaged on the retina of a viewer when the viewer actually views it. FIGS. 34, 35 each show (a) an object;

(b) an output object; and (c) an image perceived by the viewer.

The (c) image perceived by the viewer shows a state of an image formed on the retina of the viewer when the viewer actually views the (b) output object.

The ordinate in the (b) output object indicates time t (frames), and the abscissa indicates a horizontal coordinate Xe, similarly to that in FIG. 33. The coordinate Xe corresponds to a horizontal coordinate Xe "on the retina" of the viewer, also in the (c) image perceived by the viewer.

FIG. 34 (c) shows a state of the image on the retina in a case where the viewer views the output object 450 by following its motion. An object motion velocity in a retina coordinate system [Vs_e] can be obtained by a difference between the object motion velocity (=block motion amount [Vs]) and the line-of-sight motion amount [Ve], i.e., $$Vs-Ve.$$

Since the line-of-sight motion amount [Ve] at the time the viewer is following the motion of the object equals the object motion velocity (=block motion amount [Vs]), the object motion velocity in the retina coordinate system [Vs_e] is given as $$Vs\_e = Vs - Ve = 0$$

(an arrow 461 shown in FIG. 34).

Furthermore, a sampling point phase change amount in the retina coordinate system [Vp_e] can he obtained by the following equation that uses the line-of-sight motion amount [Ve] and the sampling point phase change amount [Vp] (where M is the decimation amount).

For Vp>Ve, $$Vp\_e = (Vp - Ve) \bmod M, \text{ and}$$

for Vp<Ve, $$Vp\_e = M - \{(Ve - Vp) \bmod M\} \qquad \text{(Eq. 6)}$$

Details of the sampling point phase change amount in the retina coordinate system Vp_e will be described later. It should be noted that a symbol [_e] denotes the retina coordinate system.

FIG. 34 (c) shows a perceived image 463 as a state of the image on the retina when the viewer views the output object 450 by following its motion. The viewer perceives on his retina a video obtained by adding images of several frames, due to a visual integration effect.

The final video perceived by the viewer is a high-definition video in which the sampling interval is smaller than M due to the super-resolution effect, despite the fact that the displayed video is produced at rough sampling intervals M, and thus no image quality degradation occurs.

The perceived image 463 shown in FIG. 34 (*c*) as a state of the image on the retina in the case where the viewer views the output object 450 by following its motion is exactly the same as the object 453 shown in FIG. 34 (*a*) in terms of their pixel sequence, from which it is seen that the object is almost completely reconstructed in the perceived image.

FIG. 35 is a diagram explaining a state of an image on the retina, in a case where a viewer does not view a moving object by following its motion, but moves his line of sight in a direction opposite to the motion velocity of the object, i.e., when object motion velocity (=block motion amount [Vs])>0, and
line-of-sight motion amount Ve<0
and shows, similarly to FIG. 34,
(a) an object;
(b) an output object; and
(c) an image perceived by the viewer.

A perceived image 472 shown in FIG. 35 (*c*) represents a video which is actually perceived by the viewer, similarly to the perceived image 463 shown in FIG. 34 (*c*).

The perceived image 472 shown in FIG. 35 (*c*) is different from the object 453 shown in FIG. 35 (*b*) in terms of their pixel sequence. Specifically, on the left side of a pixel "5" of the perceived image 472 shown in FIG. 35 (*c*), there exist pixels "11", "6" and "7" which should be on the right side in its original image, exhibiting a great change in pixel configuration. When the viewer perceives an image such as the perceived image 472 shown in FIG. 35 (*c*), i.e., an image in which the original pixel arrangement greatly differs from the actual pixel, arrangement, more specifically, an image in which the pixel arrangement is inverted, the viewer recognises a noticeable image quality degradation.

Referring to the drawings, a description will be given of a phenomenon in which an image seen on the retina of a viewer is different from an actual object, i.e., the pixel arrangement of the image on the retina of the viewer differs from the actual pixel arrangement.

Figure 36:
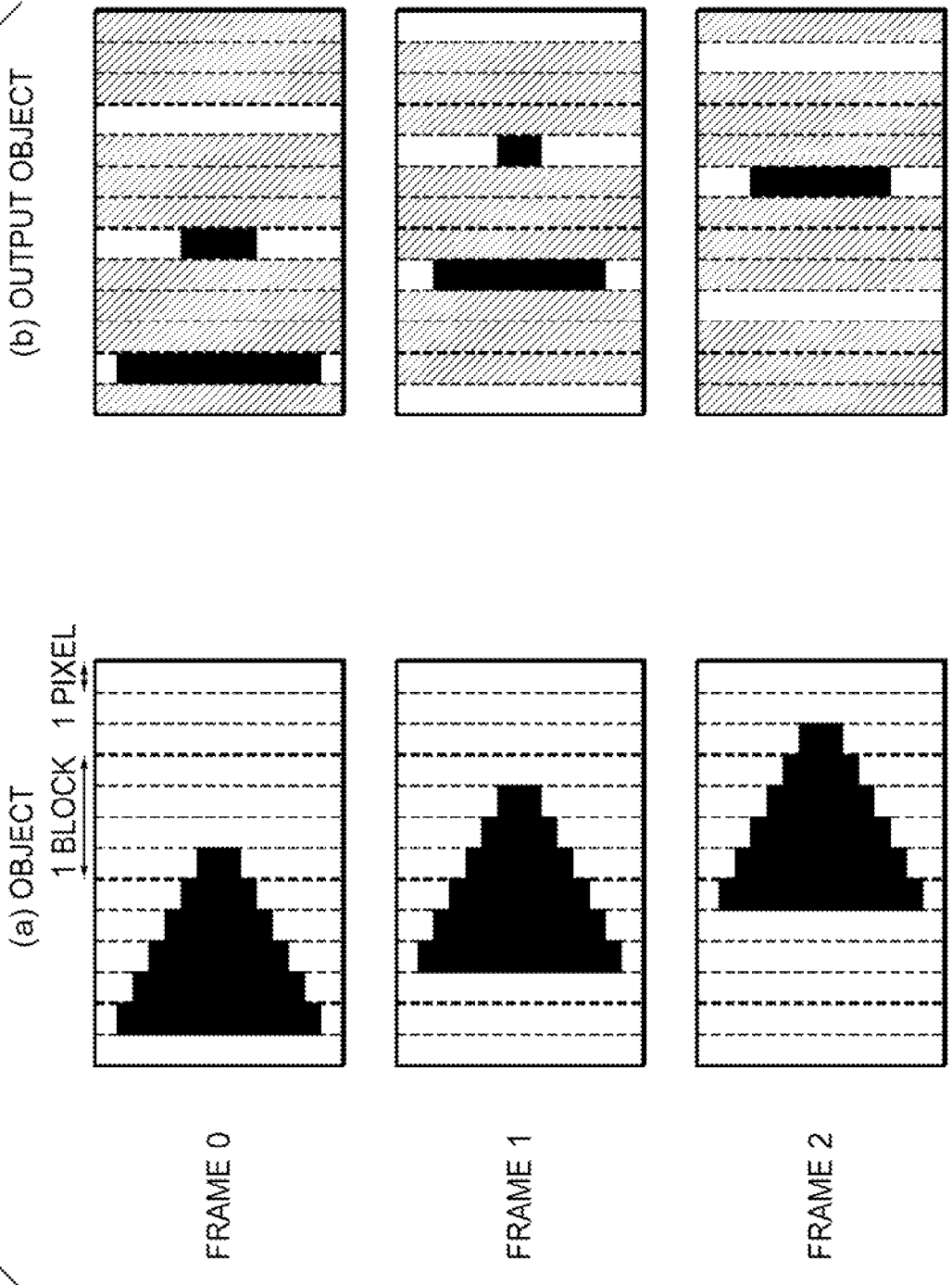
FIG. 36 is a diagram explaining a phenomenon in which the pixel arrangement of an image seen on the retina of a viewer differs from the actual arrangement.

FIG. 36 is a diagram showing a state in which a triangular object is moving to right at a velocity of 2 pixels/frame in successive frames 0, 1, 2 which form a moving image, and shows (a) the motion of the object; and (b) an output object in an output image resulting from ¼ decimation processing. The object is moving to right. It is supposed that the distance between adjacent broken lines equals 1 pixel, and that a block consists of 4×4 pixels. In the figure, only pixel division in the horizontal direction is indicated.

The object is moving to right at the velocity of 2 pixels/ frame. The (b) output object is an output image resulting from spatial decimation processing in the horizontal, direction with the sampling point phase change amount =3 (=−1). Shaded areas correspond to pixels removed by the decimation processing. The sampling point position in the frame 0 is the rightmost pixel of a block. Since the sampling point phase change amount =−1, it is set such that the sampling point is shifted to left by 1 pixel (shifted to right by 3 pixels) as forwarding the frame.

Figure 37:
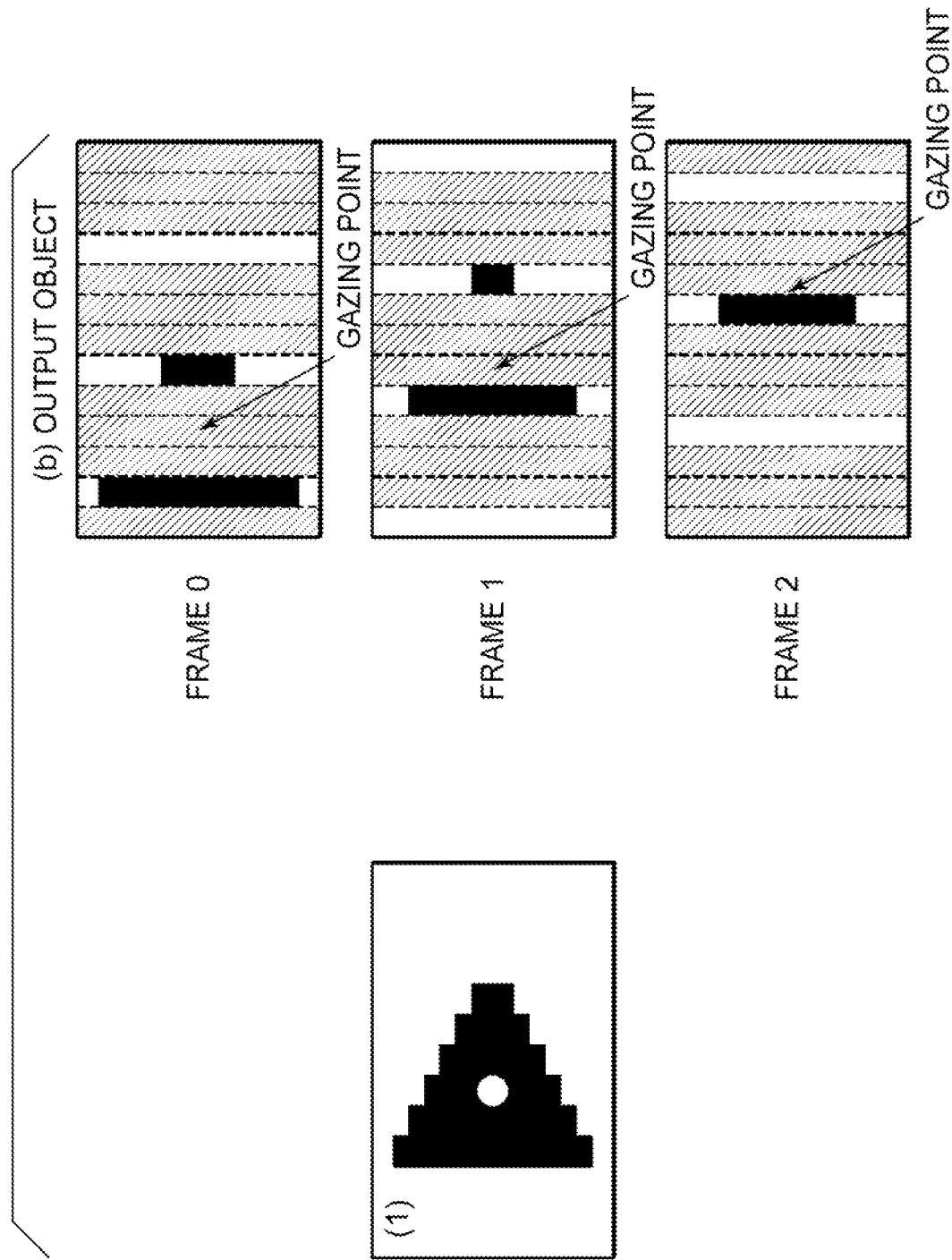
FIG. 37 is a diagram explaining the phenomenon in which the pixel arrangement of an image seen on the retina of a viewer differs from the actual arrangement.

At this time, the viewer views the (b) output object. FIG. 37 is a diagram explaining a case where a viewer views an object by following its motion. It is supposed that the viewer follows the motion of the object by gazing the center (open circle) of the object shown in FIG. 37 (1). In this case, the gazing point on (2) an output object of FIG. 37 moves to right at a velocity corresponding to the motion of the object, i.e., 2 pixels/frame.

Figure 38:
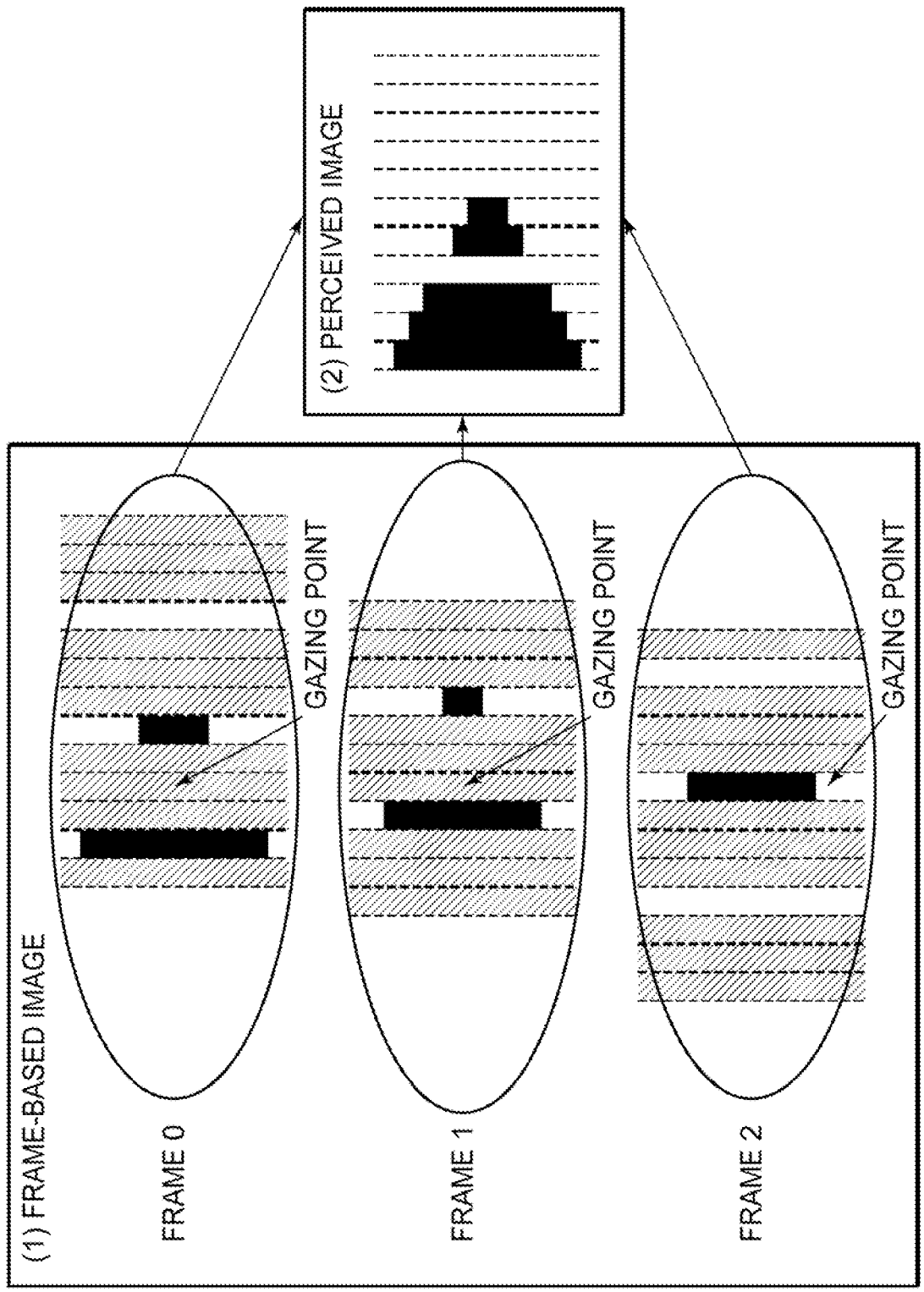
FIG. 38 is a diagram explaining the phenomenon in which the pixel arrangement of an image seen on the retina of a viewer differs from the actual arrangement.

Referring to FIG. 38, an image on the retina of the viewer at this time will be described. FIG. 38 (1) shows frame-based images on the retina of the viewer. The circumference of an ellipse indicates the whole part of the retina. FIG. 38 (2) shows an image perceived by the viewer. The viewer recognizes the image by integrating a plurality of frame images displayed for a short time interval due to the integration effect, and as a result, he recognizes such a perceived image as shown in FIG. 38 (2), which is a result obtained by integrating the images of the plurality of frames.

Since the viewer is viewing the object by following its motion, his gazing point is set to the center of the retina, on the frame-based retina of the viewer who is viewing the object shown in FIG. 33 (1). Since the plurality of frames displayed for a short time interval are recognized as integrated due to the visual integration effect, the 3 frame-based images shown in FIG. 38 (1) are directly integrated to produce the perceived image of FIG. 33 (2) on the right. The perceived image shown in FIG. 38 (2) is almost the same as the original object in shape. Namely, the image is recognized in which the pixel arrangement on the retina of the viewer does not differ from the actual pixel arrangement, and thus the viewer senses no image quality degradation.

Figure 39:
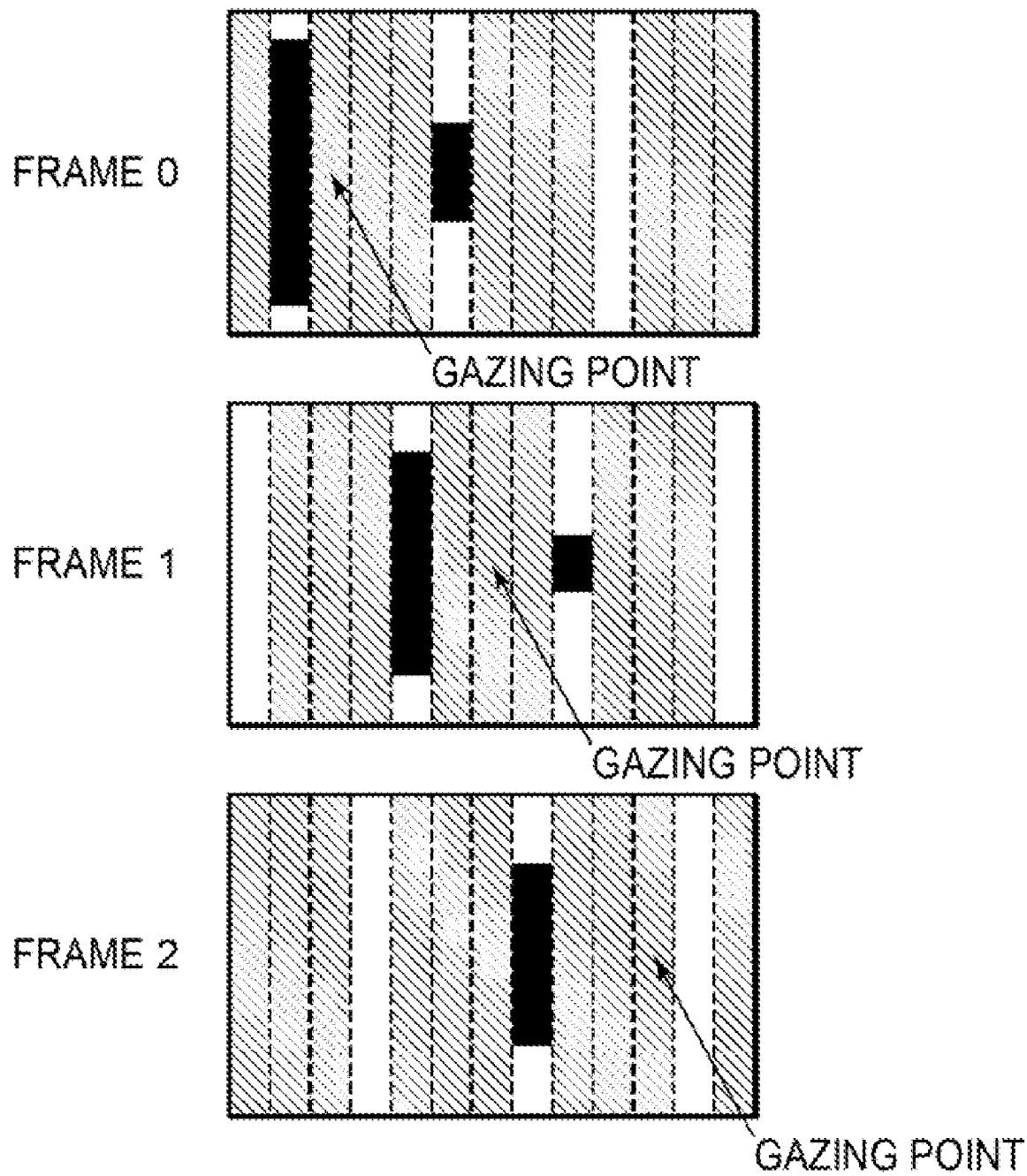
FIG. 39 is a diagram explaining the phenomenon in which the pixel arrangement of an image seen on the retina of the viewer differs from the actual arrangement.

Referring next to FIG. 39, 40, an example will be described in which the pixel arrangement seen on the retina of a viewer differs from the actual pixel arrangement.

FIG. 39 shows a case where the viewer does not view the object by following its motion and the line-of-sight motion amount [Ve] is larger than the object motion velocity (=block motion amount [Vs]). The object motion velocity (=block motion amount [Vs]) is 2 pixels/frame, and the line-of-sight motion amount [Ve] is 4 pixels/frame. In this case, the line of sight is moving to right at 4 pixels/frame, and thus it passes the object.

Figure 40:
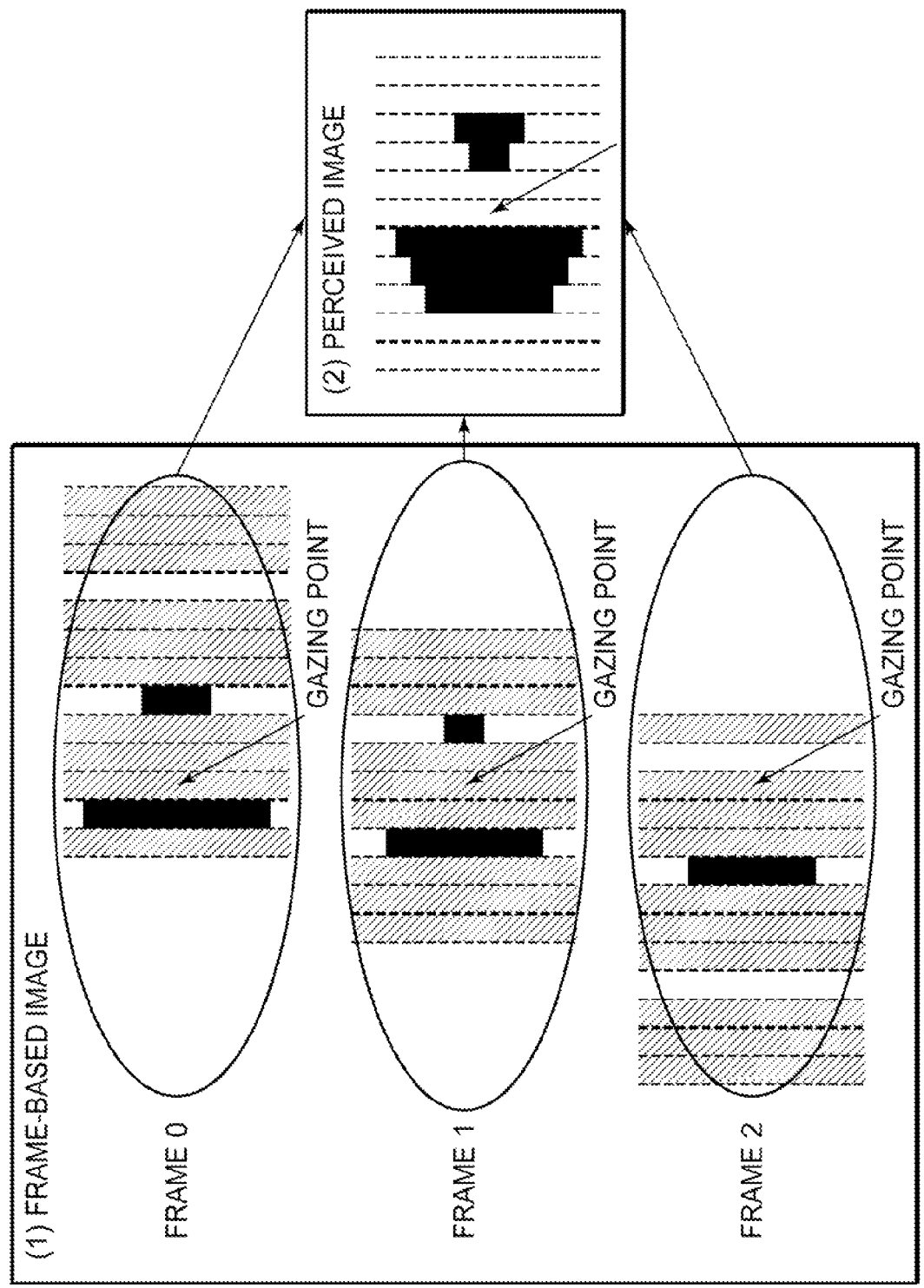
FIG. 40 is a diagram explaining the phenomenon in which the pixel arrangement of an image seen on the retina of the viewer differs from the actual arrangement.

Referring to FIG. 40, an image on the retina of the viewer at this time will be described. FIG. 40 (1) shows frame-based images on the retina of the viewer. The circumference of an ellipse indicates the whole part of the retina. FIG. 40 (2) shows an image perceived by the viewer. The viewer recognizes the image by integrating a plurality of frame images displayed for a short, time interval due to the integration effect, and as a result, he recognizes such a perceived image as shown in FIG. 40 (2), which is a result obtained by integrating the images of the plurality of frames.

Since the viewer is viewing the image at the line-of-sight motion amount [Ve] for moving to right at 4 pixels/frame, his gazing point moving to right at 4 pixels/frame is set to the center of the retina, on the frame-based retina of the viewer who is viewing the object shown in FIG. 40 (1). Since the plurality of frames displayed for a short time interval are recognised as integrated due to the visual integration effect, the 3 frame-based images shown in FIG. 40 (1) are directly integrated to produce the perceived image in FIG. 40 (2) on the right. The perceived image shown of FIG. 40 (2) is different from the original object in shape.

Namely, the pixel arrangement on the retina of the viewer differs from the actual pixel arrangement, which means that the viewer perceives an image in which the shape of the object cannot be recognised, causing him to sense image quality degradation.

Thus, when the viewer does not view the moving object by following its motion, inversion of the pixel arrangement may occur in an image perceived by the viewer in some cases.

Referring then to FIGS. 41 to 44, conditions for causing inversion of the pixel arrangement in an image perceived by a viewer will be considered. FIGS. 41 to 44 are diagrams showing images perceived by a viewer according to:

(1) whether a difference between the object motion velocity (=block motion amount [Vs]) and the line-of-sight motion amount [Ve] is positive or negative; and (2) whether or not the object motion velocity (=block motion amount [Vs]) is larger than the line-of-sight motion amount [Ve].

Namely, FIGS. 41 to 44 respectively show states in which:
Vs−Ve<0 and Vs>Vp;
Vs−Ve<0 and Vs<Vp;
Vs−Ve>0 and Vs<Vp; and
Vs−Ve>0 and Vs>Vp.

Through comparison between a perceived image and an original image in each of FIGS. 41 to 44, whether or not inversion of the pixel arrangement has occurred in the perceived image with respect to the original image will be discussed.

In each of FIGS. 41 to 44, the pixel sequence of (a) an object is compared with that of (c) a perceived image. The following is the result.

Figure 41:
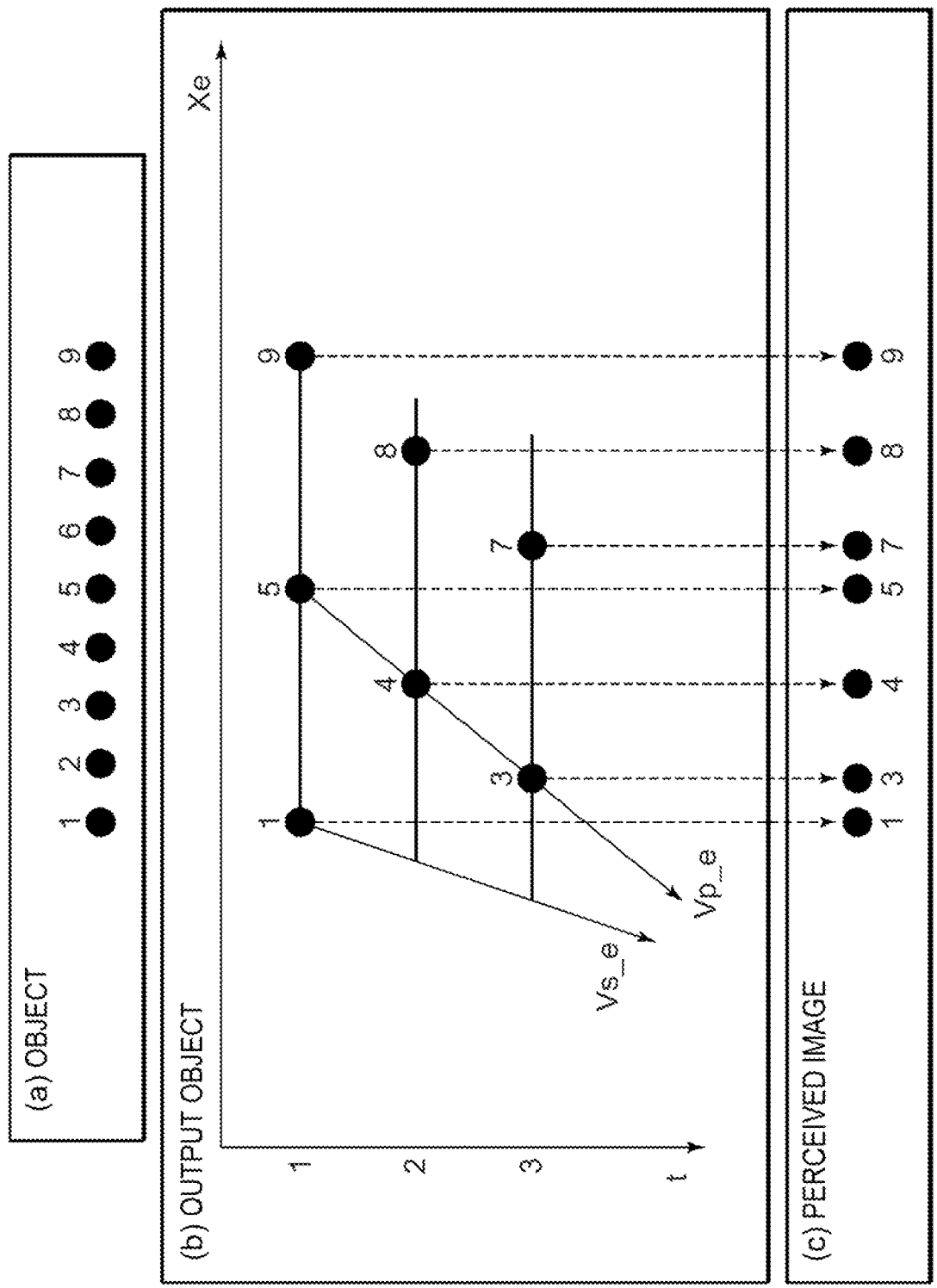
FIG. 41 is a diagram explaining analytical processing as to conditions for causing inversion of the pixel arrangement in an image perceived by a viewer.

(1) When Vs−Ve<0 and Vs>Vp as in FIG. 41, inversion of the pixel sequence does not occur between the (a) object and the (c) perceived image.

Figure 42:
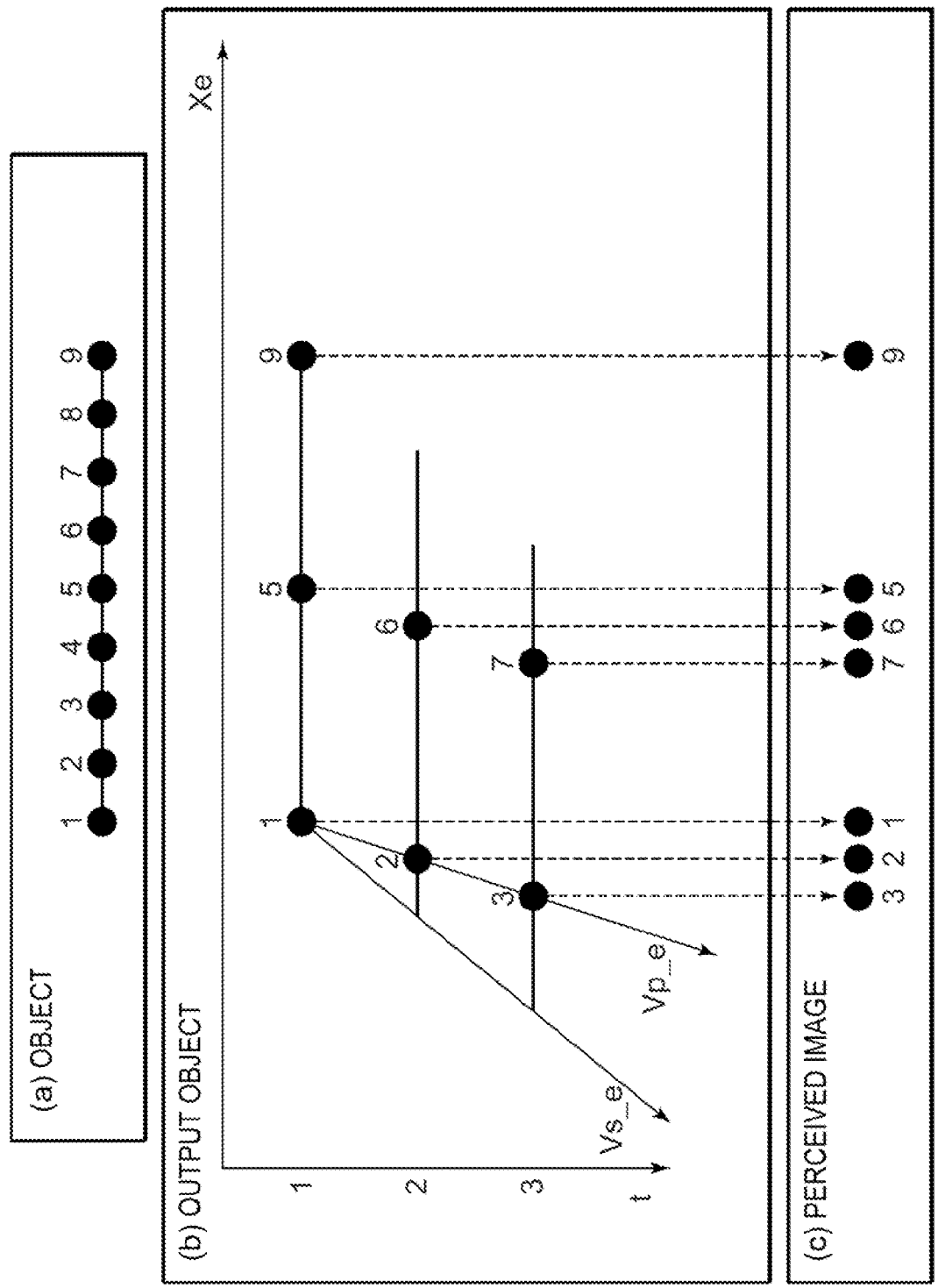
FIG. 42 is a diagram explaining the analytical processing as to conditions for causing inversion of the pixel arrangement in an image perceived by the viewer.

(2) When Vs−Ve<0 and Vs<Vp as in FIG. 42, inversion of the pixel sequence occurs between the (a) object and the (c) perceived image.

Figure 43:
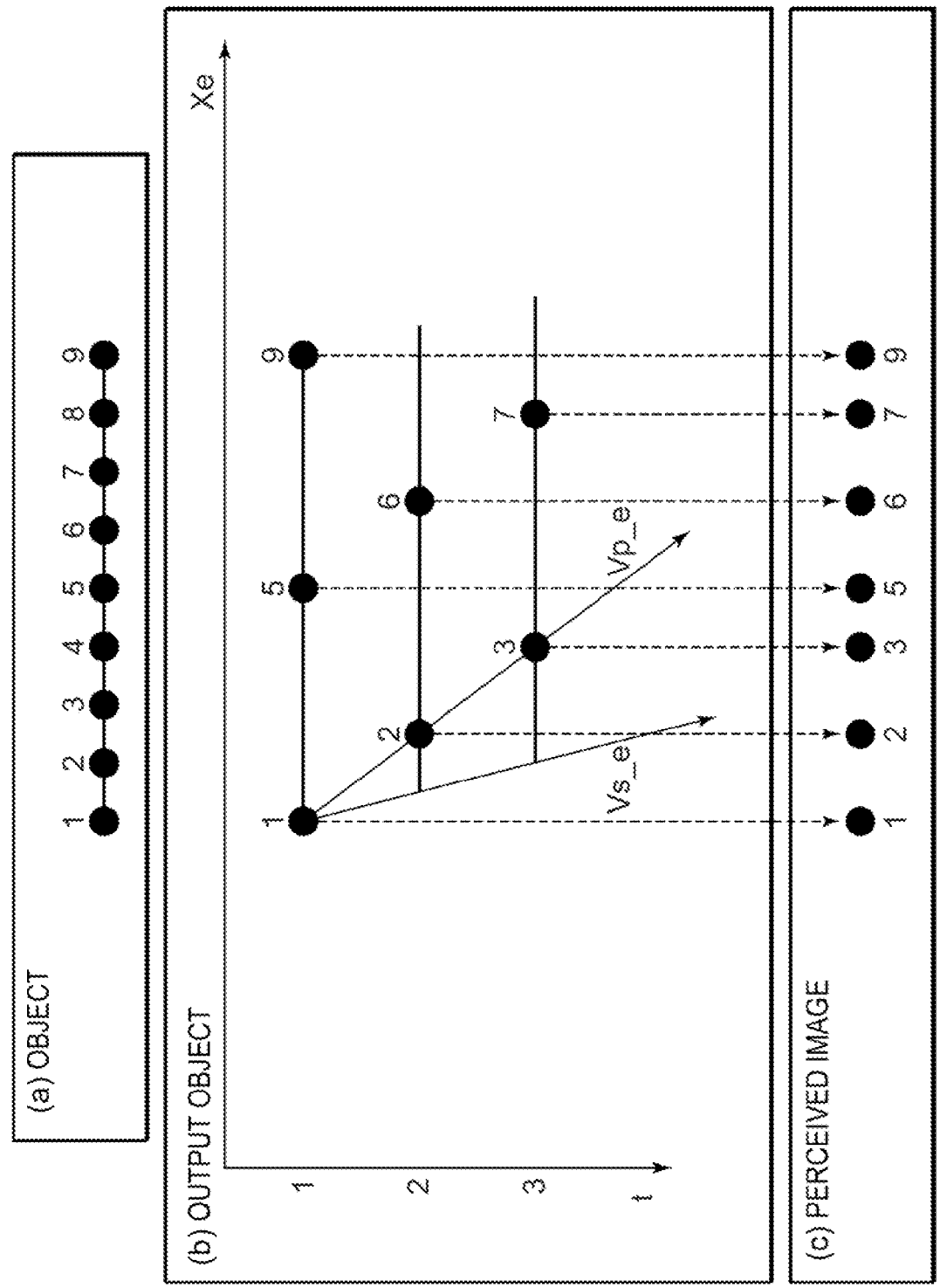
FIG. 43 is a diagram explaining the analytical processing as to conditions for causing inversion of the pixel arrangement in an image perceived by the viewer.

(3) When Vs−Ve>0 and Vs<Vp as in FIG. 43, inversion of the pixel sequence does not occur between the (a) object and the (c) perceived image.

Figure 44:
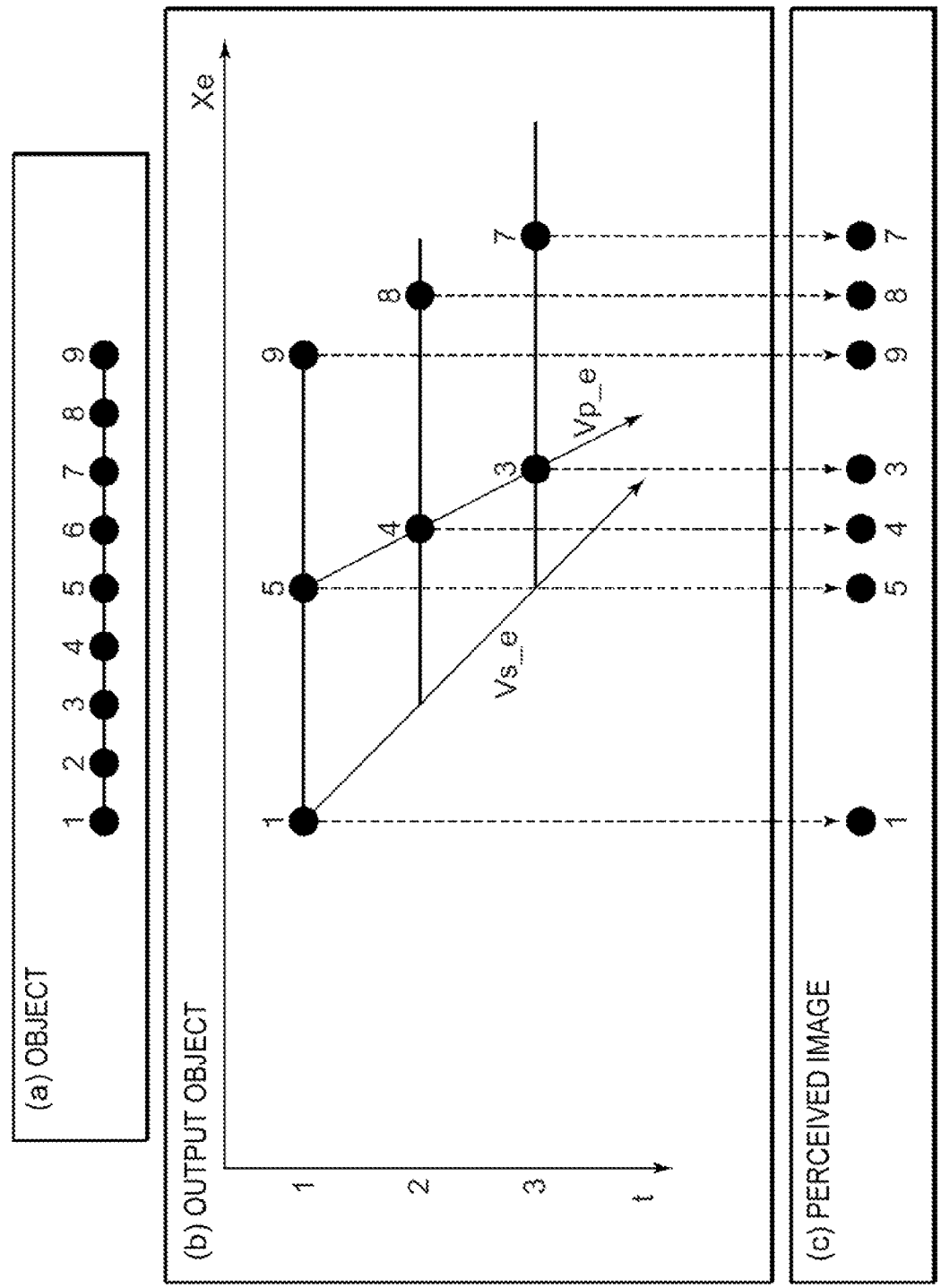
FIG. 44 is a diagram explaining the analytical processing as to conditions for causing inversion of the pixel arrangement, in an image perceived by the viewer.

(4) When Vs−Ve>0 and Vs>Vp as in FIG. 44, inversion of the pixel sequence occurs between the (a) object and the (c) perceived image.

The above result is obtained. From this result, it is eventually considered that inversion of pixels does not occur if the absolute value [Vp_e] of the sampling point phase change amount in the retina coordinate system is larger than the absolute value |Vs−Ve| of the object motion velocity in the retina coordinate system, and thus the conditions for causing inversion of the pixels can be summarized as follows.

|Vp_e*|>|Vs−Ve|→pixel sequences do not invert
|Vp_e*|<|Vs−Ve|→pixel sequences invert Provided that Vp_e* is a sampling point phase change amount in the retina coordinate system [Vp_e (=Vp−Ve)] whose sign (positive or negative) equals the sign of Vs−Ve. Namely, if Vs−Ve>0, Vp_e*>0, and if Vs−Ve<0, Vp_e*<0.

The sampling point phase change amount in the retina coordinate system [Vp_e] described with reference to (Eq. 6) above is always positive. However, Vp_e* in the above equation can be obtained without changing the sampling point position. Let Vp_e whose sign is inverted be Vp_e−, then Vp_e− can be calculated according to the following equation.

$$Vp\_e-=Vp\_e-M \quad (Eq.\ 7)$$

Let M=4 and Vp_e=1, for example. Next, Vp_e−=−3. Namely, when $Vs-Ve>0$, $Vp\_e^*=Vp\_e$, and when $Vs-Ve<0$, $$Vp\_e^*=Vp\_e- \quad (Eq.\ 8)$$

Figure 45:
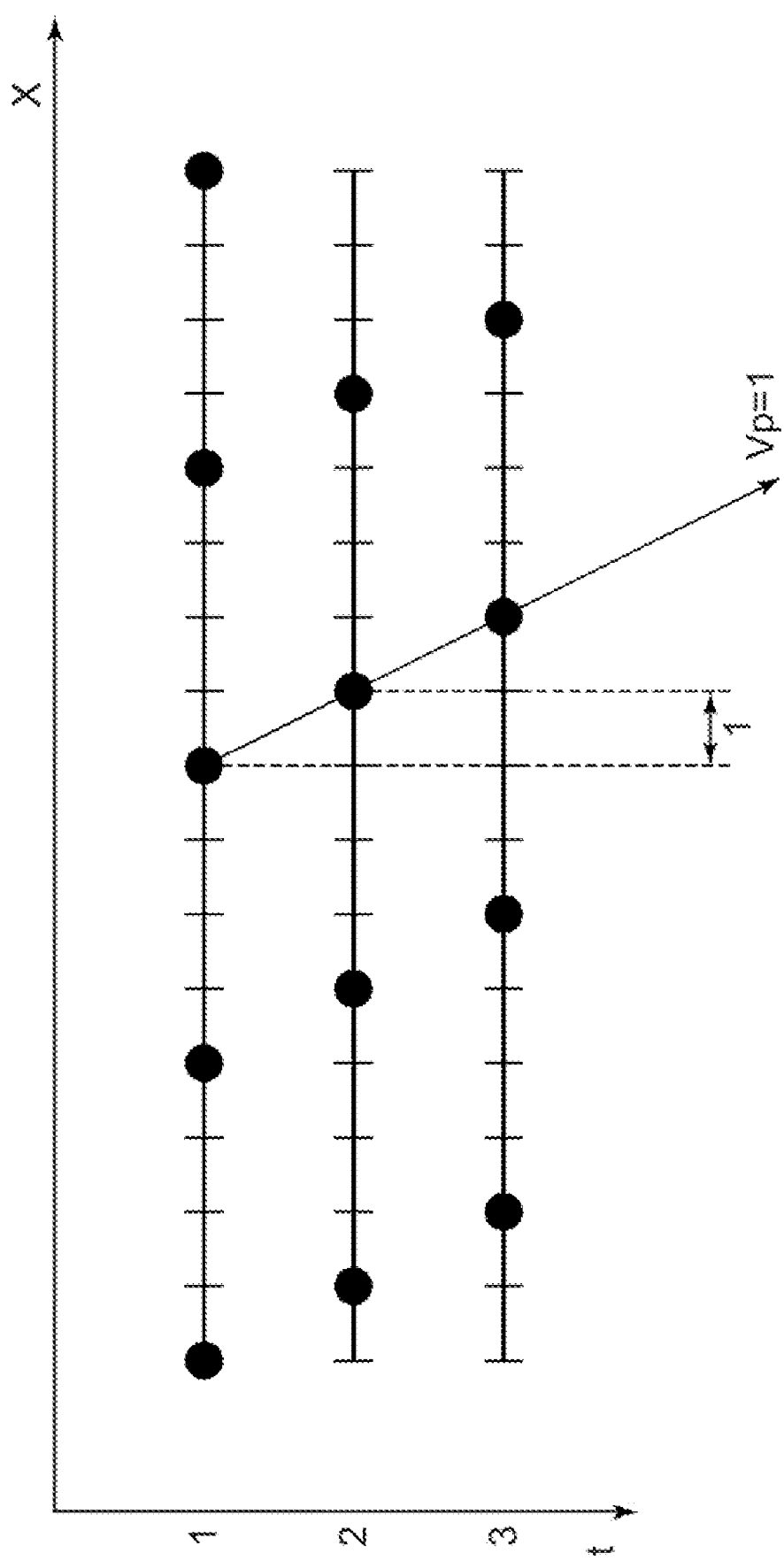
FIG. 45 is a diagram explaining correspondence between sampling point, phase change amounts Vp_e, Vp_e− and sampling point positions in a retina coordinate system.
Figure 46:
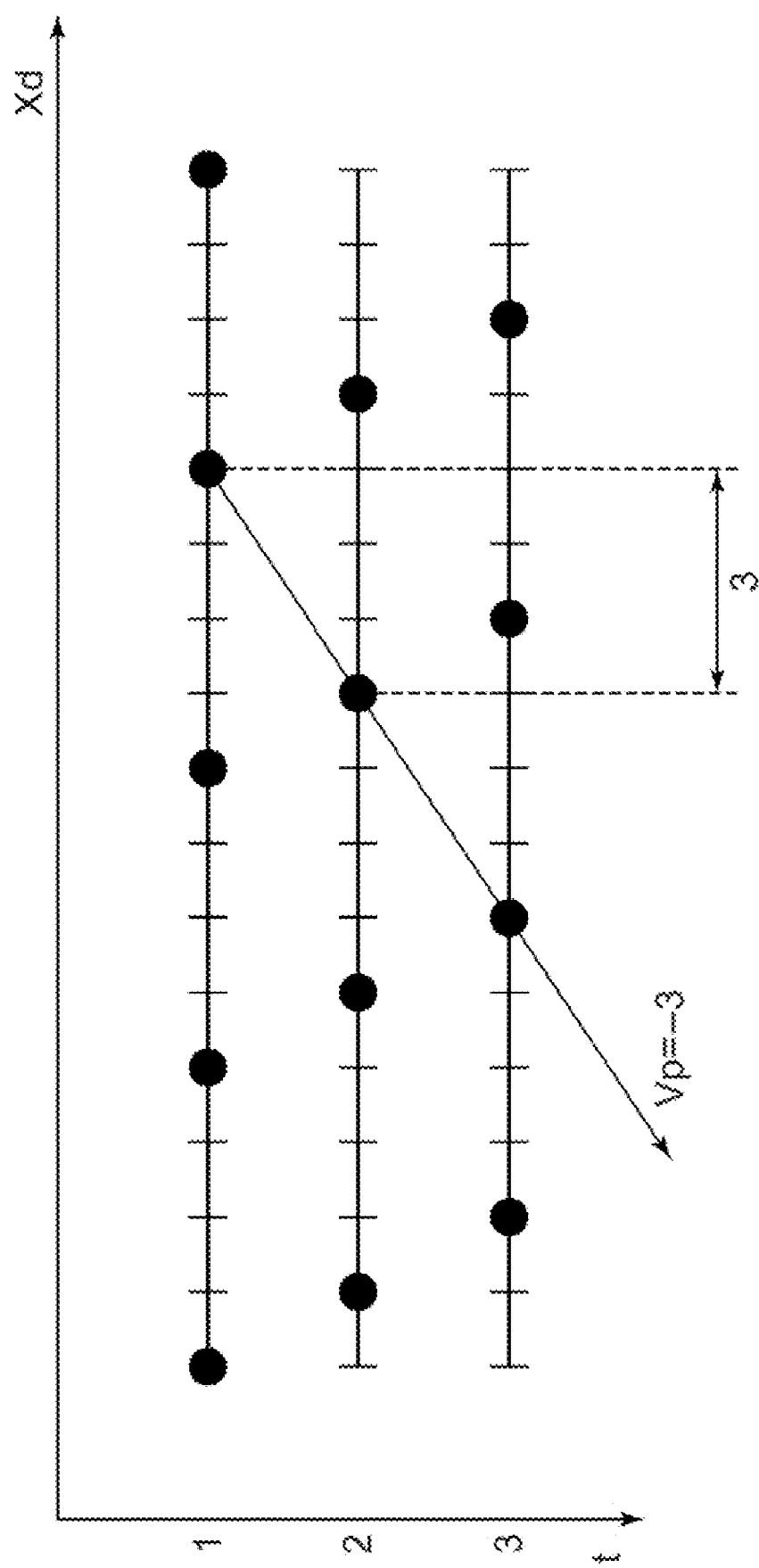
FIG. 46 is a diagram explaining correspondence between sampling point phase change amounts Vp_e, Vp_e− and sampling point positions in the retina coordinate system.

Referring to FIGS. 45 and 46, a description will be given of the fact that the conversion in the above (Eq. 7) is merely a modification of the expression and that the sampling point position according to Vp_e equals that according to Vp_e− (the decimation results are the same).

FIG. 45 shows a change according to time (t=1, 2, 3 . . . ) of sampling point positions (the positions of solid circles in the figure) in a certain coordinate system (which may be either the display coordinate system or the retina coordinate system). The motion of an object is not considered here. An arrow in the figure indicates the sampling point phase change amount [Vp] visually. In an example shown in FIG. 45, the sampling point phase change amount Vp=1 pixel/frame, and a state is seen in which the phase of the sampling points is changing in the right direction. Turning attention next to FIG. 46, it is seen that the sampling point phase change amount Vp=−3 pixels/frame. However, the sampling points in FIGS. 45 and 46 are exactly the same. Namely, it can be verified that the positive or negative sign of Vp_e can be converted in the above (Eq. 6).

On the basis of the above result, in the second step processing, the sampling point phase change amount determining unit 306 determines a single sampling point phase change amount for not inverting the pixel arrangement, from among the sampling point phase change amount candidates determined in the first step processing.

Namely, in the second step processing, the sampling point phase change amount determining unit 306 determines such a sampling point phase change amount as not to invert the pixel arrangement, i.e., a sampling point phase change amount satisfying $|Vp\_e^*|>|Vs-Ve|$ from among the sampling point phase change amount [Vp] candidates which are selected as associated with a block motion amount [Vs] in the first step processing and which can provide image quality ratings above the threshold T, further on the basis of a line-of-sight motion amount [Ve] supplied thereto from the line-of-sight motion amount detecting unit 306.

In the above equation, Vp_e* is a sampling point phase change amount on the retina coordinate system [Vp_e (=Vp−Ve)] whose sign (positive or negative) equals the sign of Vs−Ve. The sampling point phase change amount determining unit 306 calculates, on the basis of the block motion amount [Vs] supplied thereto from the motion, amount detecting unit 302 and the line-of-sight motion amount [Ve] supplied thereto from the line-of-sight motion amount detecting unit 306, such a sampling point phase change amount as not to invert the pixel arrangement, i.e., a value |Vp_e*| satisfying $|Vp\_e^*|>|Vs-Ve|$ and further determines a sampling point phase change amount on the retina coordinate system. Vp_e on the basis of this Vp_e*. Next, according to a relational expression $Vp\_e=Vp-Ve$, the unit 306 finally determines a sampling point phase change amount [Vp] for the decimation executing unit 303, for output thereto.

Referring to flowcharts shown in FIGS. 47 to 50, processing performed by the sampling point phase change amount determining unit 306 on a single block will be described. The sampling point phase change amount determining unit 306 performs this processing on all the blocks.

Figure 47:
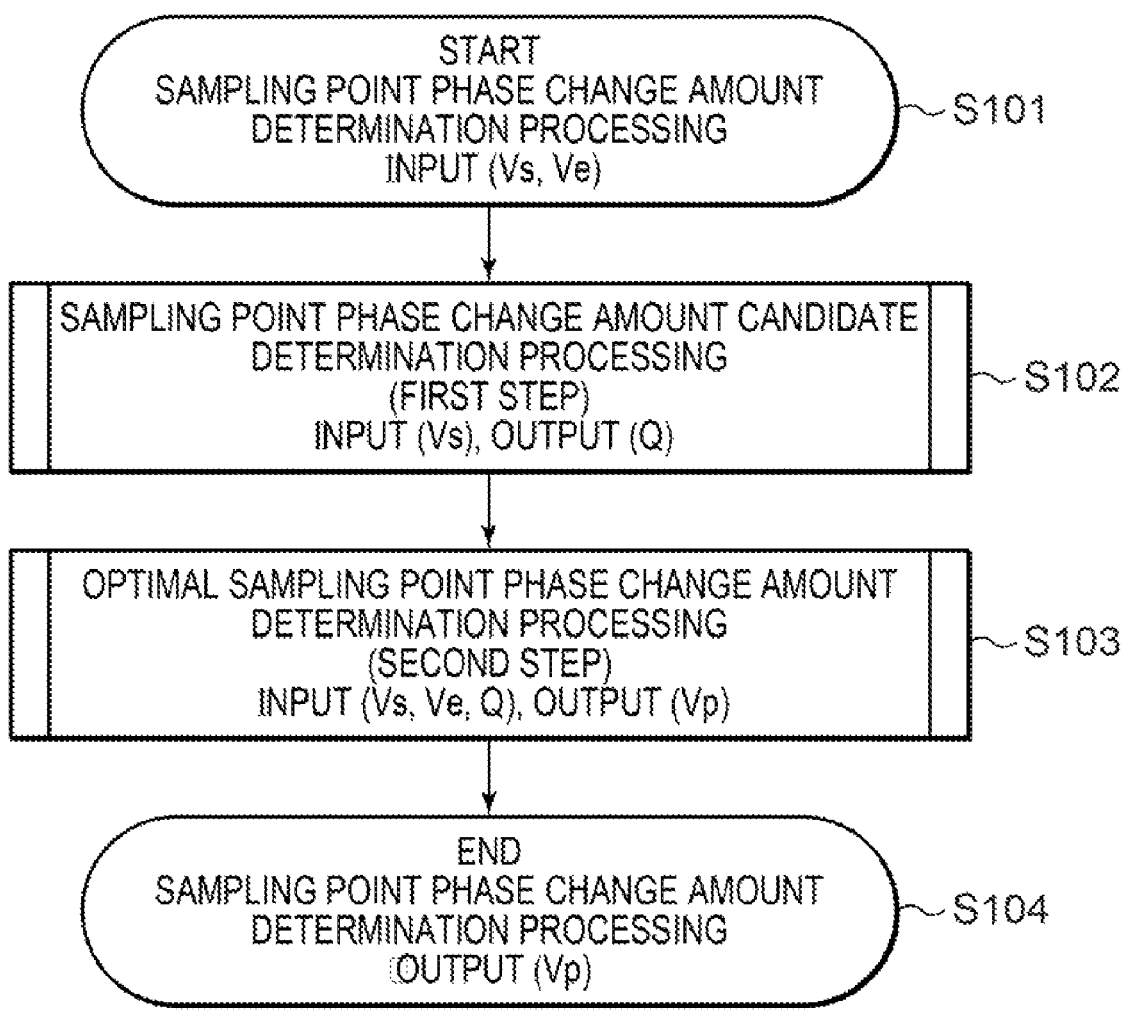
FIG. 47 is a flowchart for explaining processing per formed on a single block by a sampling point phase change amount determining unit.

Referring first to the flowchart shown in FIG. 47, overall processing by the sampling point phase change amount determining unit 306 will be described. In step S101, the sampling point phase change amount determining unit 306 receives as input an object motion velocity (=block motion amount [Vs]) and a line-of-sight motion amount [Ve], both corresponding to a block for which a sampling point, phase change amount is determined, from the motion amount detecting unit 302 and from the line-of-sight motion amount detecting unit 305, respectively.

In step S102, the unit 306 executes the candidate determination processing for determining sampling point phase change amount [Vp] candidates based on the image quality rating characteristics in the above-described (first step processing). Here, the unit 306 selects curves that can provide ratings T (preset reference rating) and above, by applying the image quality rating curves described with reference to FIGS. 28 to 32 above, on the basis of the object motion velocity (=block motion amount [Vs]) corresponding to the block inputted from the motion amount detecting unit 302, and outputs a set of sampling point phase change amounts [Vp] corresponding to the selected curves as selected candidates "Q".

Next, in step S103, the unit 306 executes the final determination processing for determining a sampling point phase change amount [Vp] optimal for the line-of-sight velocity in the above-described (second step processing). Here, the unit 306 selects a single sampling point phase change amount for not inverting the pixels when a moving image is viewed at the line-of-sight motion amount [Ve], from the sampling point phase change amount candidates "Q" determined in step S102, on the basis of the object motion velocity (=block motion amount [Vs]) and the line-of-sight motion amount [Ve] inputted from the detecting unit 305, corresponding to the block. The unit 306 sets the selected amount as the sampling point phase change amount [Vp].

Finally, in step S104, the unit 306 outputs the sampling point phase change amount [Vp] determined in step S103 to the decimation executing unit 303.

Figure 48:
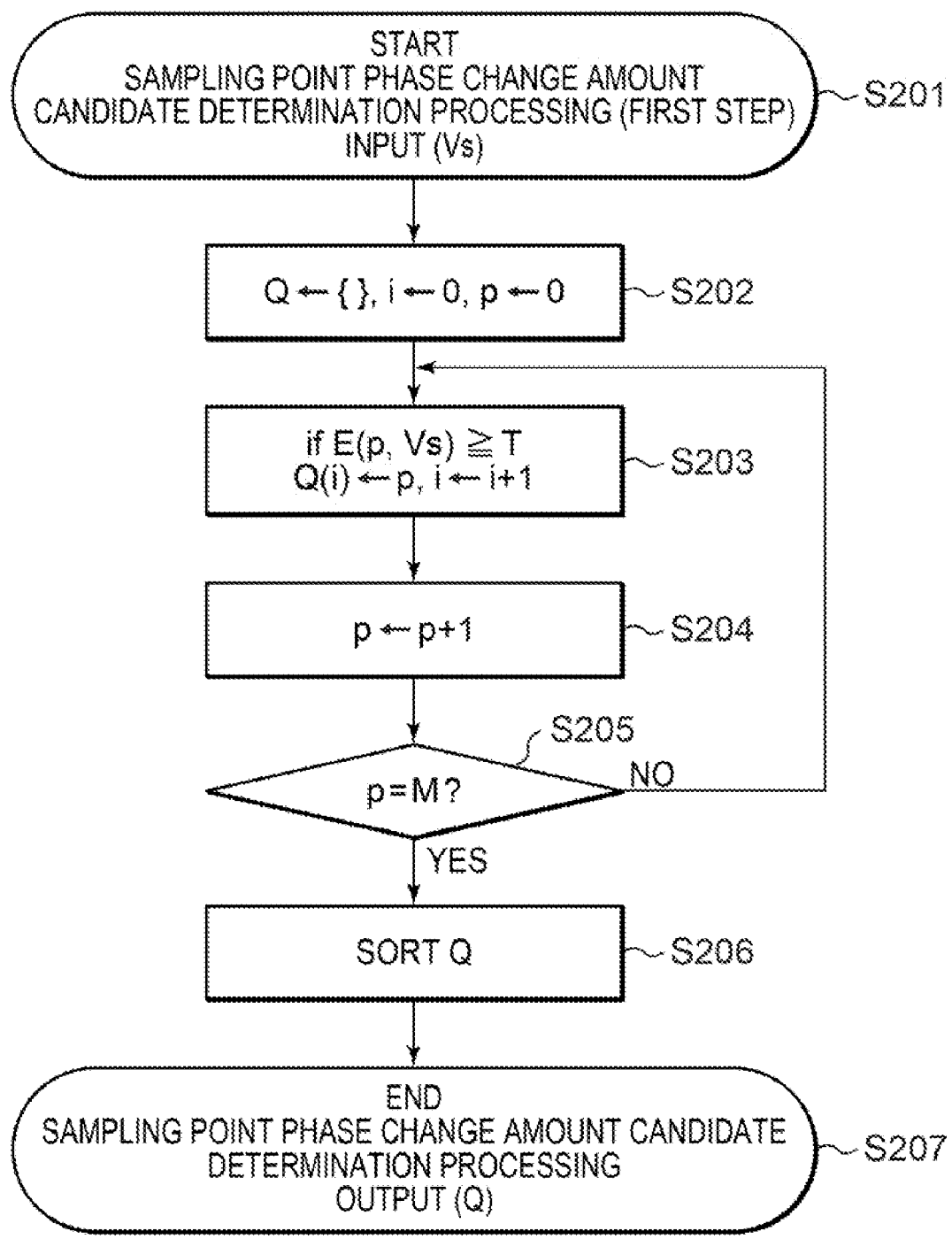
FIG. 48 is a flowchart for explaining processing performed on the single block by the sampling point phase change amount determining unit.

Referring next to the flowchart shown in FIG. 48, a detailed sequence of the first step processing executed by the sampling point phase change amount determining unit 306 in step S102 will be described. It should, be noted that in this processing example, the decimation amount is M and the image quality rating threshold is T. Also, a table showing a relationship between an object motion velocity (=block motion amount [Vs]) and the corresponding image quality rating for all sampling point phase change amounts is a table E. The table E allows one to reference image quality ratings in the form of E (Vp, Vs) on the basis of an object motion velocity (=block motion amount [Vs]) and a sampling point phase change amount [Vp]. The table E is generated on the basis of, e.g., the graph shown in FIG. 32. Instead, of a table, a graph may be referenced directly.

In the first step processing for sampling point phase change amount determination, first, in step S201, the unit 306 receives as input the object motion velocity (=block motion amount [Vs]). Next, in step S202, the unit 306 performs initialization processing. The initialization processing is processing for setting to 0 a variable i corresponding to a counter and a variable [p] corresponding to a sampling point phase change amount [Vp], and further sets a set of sampling point phase change amount candidates Q to an empty set: i.e., the set Q in which an ith member can be referenced by Q(i) is set to an empty set.

Next, in steps S203 to S205, it is checked, for all sampling point phase change amounts Vp within a range of 0 to M−1, if a rating E (p, Vs) at the object motion velocity (=block mot ion amount. [Vs]) exceeds the threshold T. If the rating E exceeds the threshold T, the value of p is added to the set Q. Step S203 corresponds to this judgment step. As a result, only those sampling point phase change amounts whose rating is judged as exceeding the threshold T are set as members of the set Q, Steps S204 and S205 are steps of updating the variable p and of determining whether or not the variable p equals M, respectively.

If it is determined in step S205 that p=M, the unit 306 judges that its rating check is terminated for all the sampling point phase change amounts Vp, and thus proceeds to step S206, in which the unit 306 sorts the members of the set Q so as to be arranged in descending order in terms of the corresponding ratings, i.e., arranged in order of higher ratings. In step S207, the unit 306 outputs the set Q.

Referring next to the flowchart shown in FIG. 49, a detailed sequence of the second step processing executed by the sampling point phase change amount determining unit 306 in step S103 of the overall flow shown in FIG. 47 will be described. In the second step processing, first, in steps 301, the unit 306 receives as input the object motion velocity (=block motion amount [Vs]) corresponding to the block, the line-of-sight motion amount [Ve], the decimation amount M, and the set Q consisting of the sampling point phase change amount candidates generated in the first step processing.

Next, in step S302, the unit 306 initialises the sampling point phase change amount [Vp] by setting Vp=Q(0). Since the members of the set Q are sorted in order of higher ratings, Q(0) is a sampling point phase change amount for maximizing the rating for the object motion velocity (=block motion amount)=Vs.

In step S303, the unit 306 compares the line-of-sight motion amount [Ve] with the object motion velocity (=block motion amount [Vs]). If Ve=Vs, the unit 306 jumps to step S310, in which the unit 306 directly outputs Vp=Q(0), i.e., the sampling point phase change amount for maximizing the rating in step S102 being the first step processing shown in FIG. 47, as the final sampling point phase change amount [Vp], after which it ends the processing. This step corresponds to a case where the line-of-sight motion amount [Ve] equals the object motion velocity (=block motion amount [Vs]), i.e., a case where a viewer is viewing the object by following its motion.

In step S303, if Ve=Vs is not established, i.e., the line-of-sight motion amount [Ve] does not equal the object motion velocity (=block motion amount [Vs]), the unit 306 executes step S304 and forward.

In steps S304 to S309, the unit 306 checks the members of the sampling point phase change amount candidates Q as to whether inversion of the pixels has occurred or not in order of higher ratings (S305), if (Q(i) for a certain i is a sampling point phase change amount that does not cause the inversion of the pixel sequence (S306→3307), the unit 306 sets Vp to Q(i) (S307) and then ends the processing (S309). If Q(i) for a certain i is a sampling point phase change amount for causing inversion of the pixel sequence (S306→S308), the unit 306 increments i for checking a next candidate (S308). At this point of the processing, if i equals as many members |Q| as the set Q (all the candidates have been checked), the unit 306 ends the processing (S309), and outputs Vp=Q(0) set in step S302.

Referring to the flowchart shown in FIG. 50, details of the pixel arrangement inversion checking processing in step S305 of FIG. 49 will be described. First, in step S401, the unit 306 receives as input the object motion velocity (=block motion amount [Vs]), the sampling point phase change amount [N], and the line-of-sight motion amount [Ve]. The sampling point, phase change amount [N] is a member Q(i) of the sampling point phase change amount candidates Q. It should be noted that the members are arranged in order of higher ratings.

Next, in step S402 and forward, the unit 306 checks how the sequence of pixels forming the object moving at the velocity Vs changes, if the sampling point phase change amount is N (=Q(i)) and a viewer views the object at the line-of-sight motion velocity Ve. First, in step S402, the unit 306 determines that $$Vs>Ve$$

is established. Namely, the unit 306 checks whether Vs−Ve is positive or negative.

If it is determined in step S402 that Vs−Ve is positive, the unit 306 proceeds to step S404, in which the unit 306 sets the value of the sampling point phase change amount N (=Q(i)) for verification directly to Vp_e*, i.e., $$Vp\_e^*=N$$

It should be noted that as described earlier, Vp_e* is a sampling point phase change amount in the retina coordinate system [Vp_e (=Vp−Ve)] whose sign (positive or negative) equals the sign of Vs−Ve. Namely, if Vs−Ve>0, Vp_e*>0, and if Vs−Ve<0, Vp_e*<0.

If it is determined in step S402 that Vs−Ve is not positive, the unit 306 proceeds to step S403, in which the unit 306 calculates Vp_e* by setting Vp_e*=N−M, on the basis of the earlier-described equation (Eq. 7), i.e., $$Vp\_e-=Vp\_e-M$$

Next, in step S405, the unit 306 checks if Vp_e* satisfies the condition for not causing reversal of the pixels. This is executed as processing for determining whether or not Vp_e* satisfies the earlier-described determination inequality $$|Vp\_e^*|>|Vs-Ve|$$

If the obtained Vp_e* satisfies |Vp_e*|>|Vs−Ve| in step S405, the unit 306, judging that Vp_e* satisfies the condition for not causing reversal of the pixels, proceeds to step S406, in which the unit 306 sets an inversion identifier [Z] to 1. If the obtained Vp_e* does not satisfy |Vp_e*|>|Vs−Ve|, the unit 306, judging that Vp_e* does not satisfy the condition for not causing reversal of the pixels, proceeds to step S407, in which the unit 306 sets the inversion identifier [Z] to 0. The inversion identifier [Z]=1 indicates that the inversion does not occur, whereas the inversion identifier [Z]=0 indicates that the inversion occurs.

In step S408, the unit 306 outputs the inversion identifier [Z].

Figure 49:
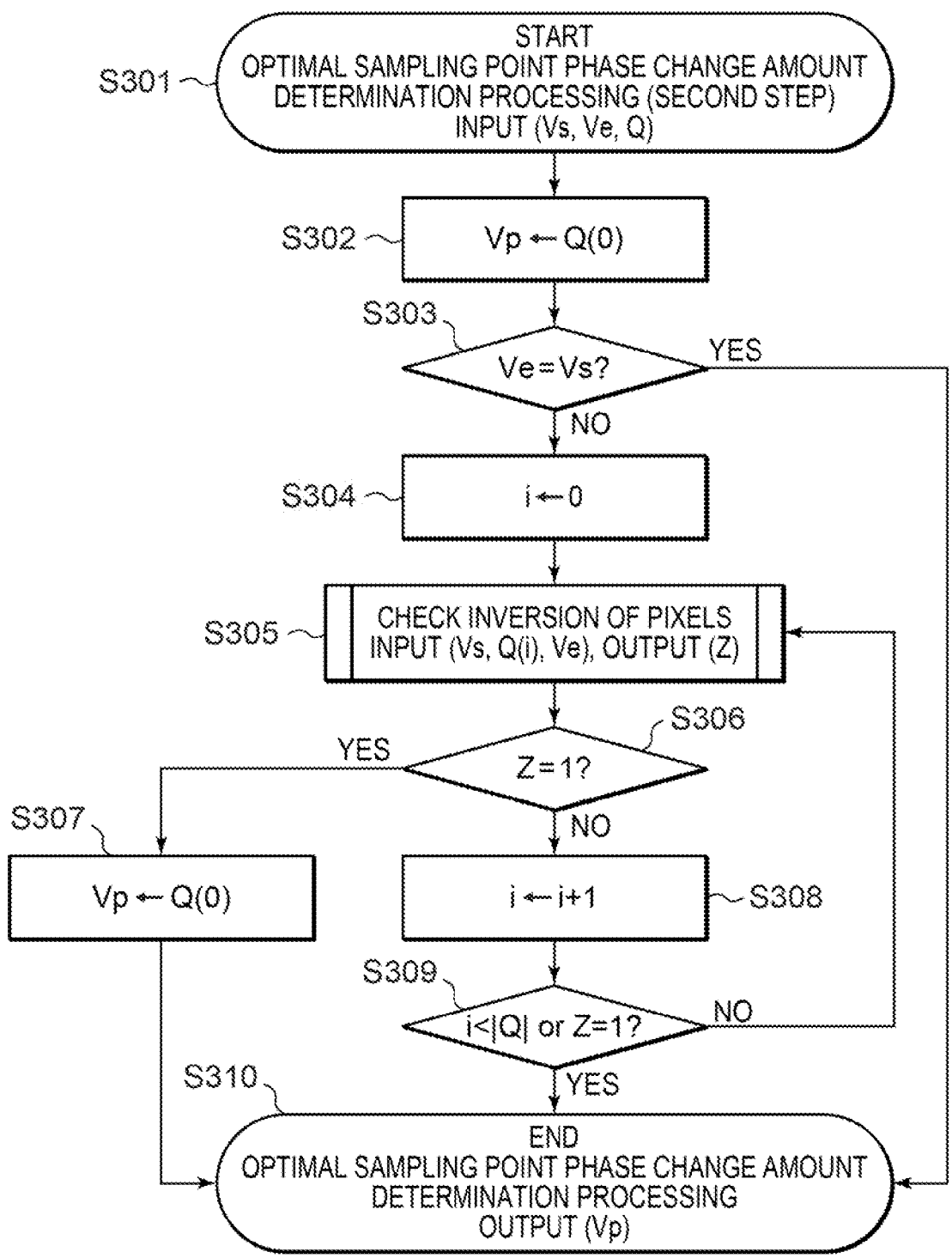
FIG. 49 is a flowchart for explaining processing performed on the single block by the sampling point phase change amount determining unit.
Figure 50:
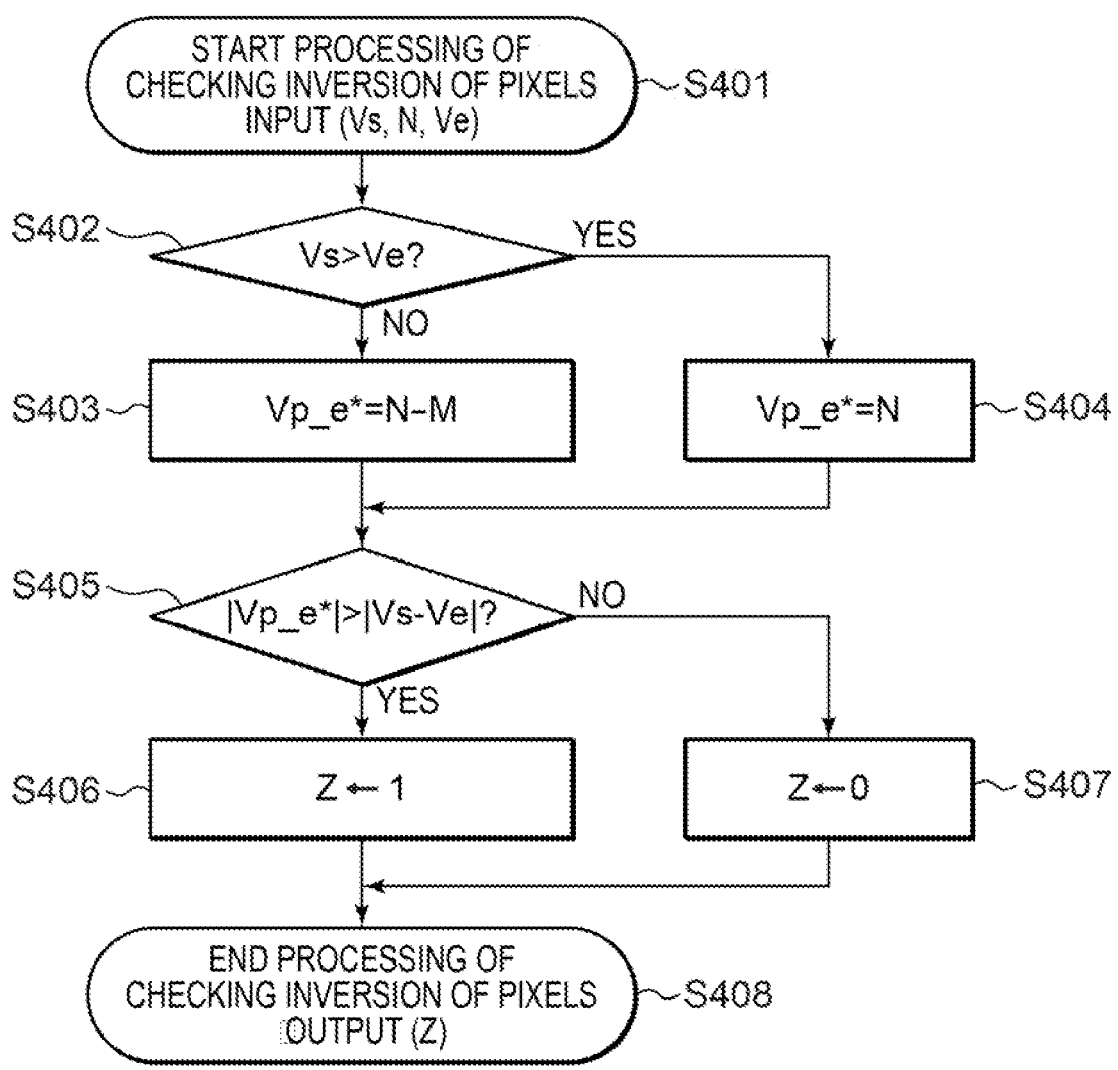
FIG. 50 is a flowchart for explaining processing per formed on the single block by the sampling point phase change amount determining unit.

In step S305 of the flow shown in FIG. 49, the above processing is executed, whereby the inversion identifier [Z] indicating whether or not the sampling point phase change amount causes inversion of the pixel arrangement is obtained for Q(i) for a certain i. In step S306, whether Z=1 or not is determined.

If it is determined in step S306 that Z=0 being the identifier indicating that inversion occurs, the member Q(i) of the sampling point phase change amount candidates Q for verification is improper. Thus, in step S308, the unit 306 increments i to check a next candidate. In step S309, the unit 306 determines whether i equals as many members |Q| as the set Q. If so (when all the candidates have been checked), the unit 306 ends the processing (S310), and outputs Vp=Q(0) set in step S302. Namely, the unit 306 outputs the sampling point phase change amount [Vp] for producing the highest rating.

If it is determined in step S306 that Z=1 being the identifier indicating that inversion does not occur, the member Q(i) of the sampling point phase change amount candidates Q for verification is proper. Thus, in step S307, the unit 306 determines this as the sampling point phase change amount [Vp], and proceeds to step S310, in which the unit 306 outputs the determined sampling point phase change amount [Vp] and ends the processing.

It should be noted that the maximum of |Vp_e*| is M−1, whereas the maximum of |Vs−Ve| can take an infinitely large value. If |Vs−Ve| exceeds M−1, inversion of the pixel sequence cannot be prevented no matter what sampling point phase change amount one may use. However, when |Vs−Ve| is large means when the line-of-sight motion velocity greatly differs from the object motion velocity, and under such a condition, it is experimentally demonstrated that image quality degradation is not recognised even if inversion of the pixel sequence occurs.

Thus, the sampling point phase change amount determining unit 306 determines the optimal sampling point phase change amount [Vp] for not causing reversal of the pixels in spatial pixel decimation processing to be performed on the block by the decimation executing unit 303, on the basis of the line-of-sight motion amount [Ve] corresponding to the block supplied thereto from the line-of-sight motion amount detecting unit 305 and the object motion velocity (=block motion amount [Vs]) corresponding to the block supplied thereto from the motion amount detecting unit 302, for supply to the decimation executing unit 303.

It should be noted, that the sampling point phase change amount determining unit 306 may be configured to execute processing for consecutively determining an optimal sampling point phase change amount [Vp] on the basis of a line-of-sight motion amount [Ve] supplied thereto from the line-of-sight motion amount detecting unit 305 and an object motion velocity (=block motion amount [Vs]) supplied thereto from the motion amount defecting unit 302. Alternatively, the sampling point, phase change amount determining unit 306 may be configured to calculate optimal sampling point phase change amounts for possible combinations of object motion velocities (=block motion amounts [Vs]) and line-of-sight motion amounts [Ve] beforehand by the above-mentioned processing, record the calculated results in the form of, e.g., a look-up table in a storage section, and acquire an optimal sampling point phase change amount [Vp] from the look-up table on the basis of the inputted line-of-sight motion amount [Ve] and object motion velocity (=block motion amount [Vs]).

Next, processing by the decimation executing unit 303 will be described. The decimation executing unit 303 performs spatial pixel decimation processing on the block supplied thereto from the block dividing unit 301. In doing so, the unit 303 judges whether or not it actually performs the decimation processing and in which direction, horizontal or vertical, it performs the decimation processing, if it performs the decimation processing, on the basis of motion amount information corresponding to the block supplied thereto from the motion amount detecting unit 302, i.e., the block motion amount [Vs]. Furthermore, the unit 303 determines a sampling point phase change amount. [Vp] for performing the decimation processing on the basis of the sampling point phase change amount [Vp] inputted from the sampling point phase change amount determining unit 306.

For the judgment as to whether or not the decimation processing is performed, the unit 303 first compares an X-direction component Vx with a Y-direction component Vy as the motion amounts (=block motion amounts [Vs]) supplied thereto from the motion amount detecting unit 302. If a value V of the component having the larger absolute value exceeds a preset threshold Vt, the unit 303 performs pixel decimation. If |Vy|>|Vx| at this time, the unit 303 performs pixel decimation in the vertical direction. Otherwise, the unit 303 performs pixel decimation in the horizontal direction. If V is below the threshold Vt, the decimation executing unit 303 does not perform spatial pixel decimation on the block.

If having determined to perform pixel decimation, the decimation executing unit 303 executes the decimation processing by applying the sampling point phase change amount [Vp] corresponding to the block supplied thereto from the sampling point phase change amount, determining unit 306. Specific processing examples of pixel decimation, will be described below.

Figure 51:
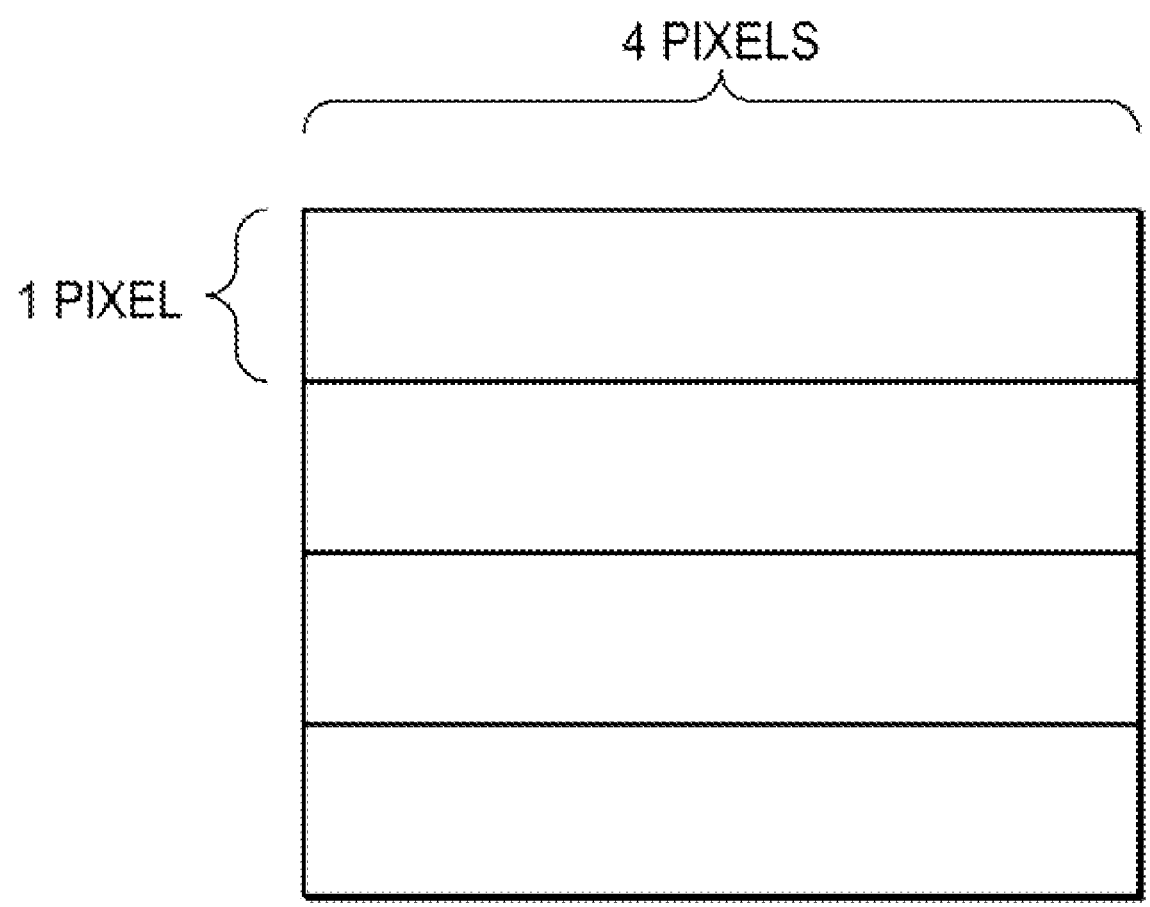
FIG. 51 is a diagram explaining an example of spatial pixel decimation processing performed by a decimation executing unit.

Referring to FIGS. 51 to 62, processing examples of spatial pixel decimation performed by the decimation executing unit 303 will be described. In these examples, the size of a single block is set to 4 pixels×4 pixels such as shown in FIG. 51. Also, the pixel decimation processing performed by the decimation executing unit 303 takes 1 pixel, out of 4 pixels as an output pixel. Namely, data is reduced to ¼ in a pixel-decimated block.

It should be noted that this decimation processing mode is an example. Various processing units may be set for pixel decimation. Also, in the processing examples described here, the threshold Vt for motion amounts with which pixel decimation is performed is set to Vt=2 pixels/frame. Namely, as to the horizontal motion amount Vx and the vertical motion amount Vy, if $|Vy|>|Vx|$ and $|Vy|\geq 2$, pixel decimation processing in the vertical direction is performed, and if $|Vx|\geq |Vy|$ and $|Vx|>2$, pixel decimation processing in the horizontal direction is performed.

However, since the decimation amount for obtaining a good quality has upper limits corresponding to motion velocities, it is preferable to perform the processing under these upper limits. The upper limits and the general relationship between the decimation amount and the motion velocities are explained in detail in Japanese Patent Application Publication No. 2005-198268, together with explanations on the human visual characteristics and the principle of the super-resolution effect. It should be noted that if it is supposed that 1 pixel out of M pixels is outputted in pixel decimation processing, an applicable block size would be PM pixels×QM pixels (P, Q=1, 2, ...). Furthermore, the range of values possibly taken by the sampling point phase change amounts supplied thereto from the sampling point phase change amount determining unit 306 would be 0 to M−1 (pixel (s)/frame). Processing to which the sampling point phase change amounts are applied will be described later.

Referring to FIGS. 51 to 56, pixel decimation processing in the horizontal direction performed by the decimation executing unit 303 will be described. The condition for executing the pixel decimation processing in the horizontal direction is, as described earlier, $|Vx|\geq |Vy|$ and $|Vx|>Vt$, and if a block satisfies the above motion amount condition, the decimation executing unit 303 executes the pixel decimation processing in the horizontal direction.

To perform the pixel decimation processing in the horizontal direction, the decimation executing unit 303 first divides a block consisting of 4×4 pixels into a set of groups each consisting of 1 pixel (long)×4 pixels (wide). Furthermore, the decimation executing unit 303 performs pixel decimation processing for replacing the pixel values p1 to p4 of 1×4 pixels in each group with one of these pixel values according to one of modes shown in FIGS. 52 to 55.

Decimation Processing with Sampling Point Phase Change Amount =0

First, a decimation processing example will be described in which the sampling point phase change amount [Vp] inputted from the sampling point phase change amount, determining unit 306 is 0.

Figure 52:
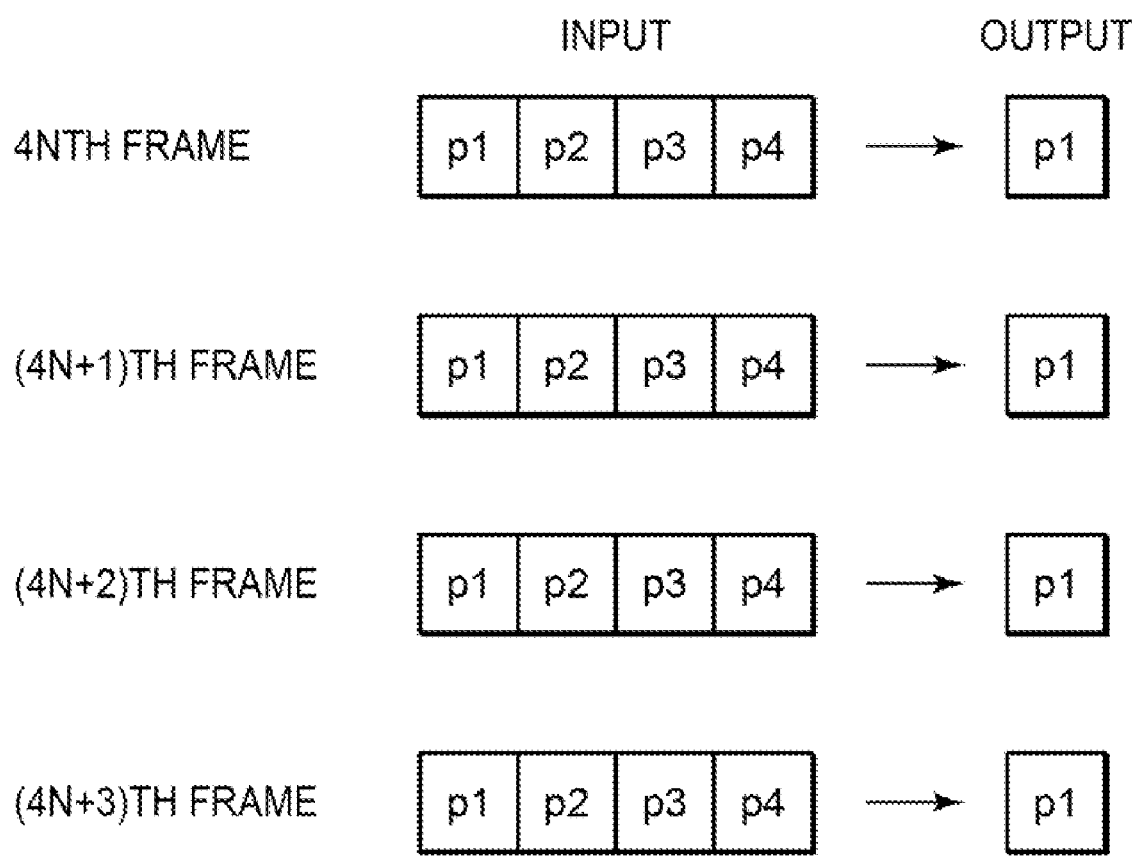
FIG. 52 is a diagram explaining an example of the spatial pixel decimation processing performed by the decimation executing unit.

Decimation processing shown in FIG. 52 is pixel decimation processing in which the sampling point phase change amount equals 0 pixel/frame. When the sampling point phase change amount equals 0 pixel/frame, processing is performed in which the value of a pixel staying at the same position in all of frames is set as a value representing 4 pixels, i.e., as a sampling point, irrespective of the current frame number (where the current frame occurs in a sequence of the frames from the start of the processing). While p1 is the sampling point in an example of FIG. 52, any of the pixel values p1 to p4 may be the sampling point.

Decimation Processing with Sampling Point Phase Change Amount =1

Next, a decimation processing example will be described in which the sampling point phase change amount [Vp] inputted from the sampling point phase change amount determining unit 306 is 1. It should be noted that this processing example is equivalent to decimation processing with the sampling point phase change amount [Vp]=−3, if it is ¼ decimation processing.

Figure 53:
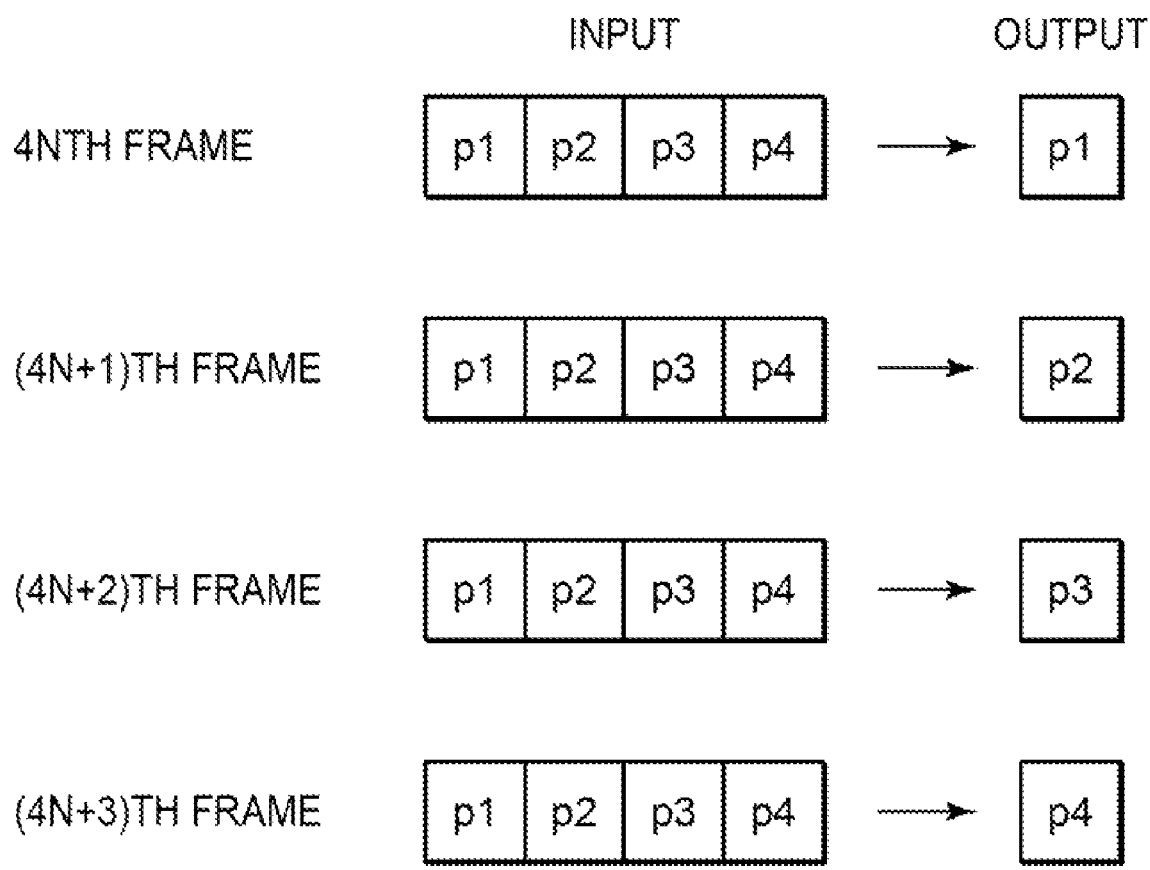
FIG. 53 is a diagram explaining an example of the spatial pixel decimation processing performed by the decimation executing unit.

Decimation processing shown in FIG. 53 is pixel decimation processing in which the sampling point phase change amount equals 1 pixel/frame. When the sampling point phase change amount equals 1 pixel/frame, the sampling point position changes to right (when the right direction is set as being positive) by 1 pixel every time the frame number increments. Namely, representing the currently processed frame number as 4N+k (k=0, 1, 2, 3), and the coordinates of the leftmost pixel of the 4 pixels as (X, Y), processing is performed in which the value of a pixel staying at a position (X+k, t) is set as a value representing the 4 pixels, i.e., as a sampling point. It should be noted that the range of k for a decimation amount M is from 0 to M−1.

In the pixel decimation processing with the sampling point phase change amount being 1 pixel/frame shown in FIG. 53, if the sampling point in a frame 0 is p1, decimation processing in which the pixel position of the sampling point within a block consisting of 4×4 pixels is shifted to right by 1 pixel as forwarding the frame is performed repeatedly in units of 4 frames, as follows:

4Nth frame (0th, 4th, 3th frames); sampling point =p1;

(4N+1)th frame (1st, 5th, 9th frames): sampling point =p2;

(4N+2)th frame (2nd, 6th, 10th frames): sampling point = p3; and (4N+3)th frame (3rd, 7th, 11th frames); sampling point = p4.

Decimation Processing with Sampling Point Phase Change Amount =2

Next, a decimation processing example will be described in which the sampling point phase change amount [Vp] inputted from the sampling point phase change amount determining unit 306 is 2. It should be noted that this processing example is equivalent to decimation processing with the sampling point phase change amount [Vp]=−2, if it is ¼ decimation processing.

Figure 54:
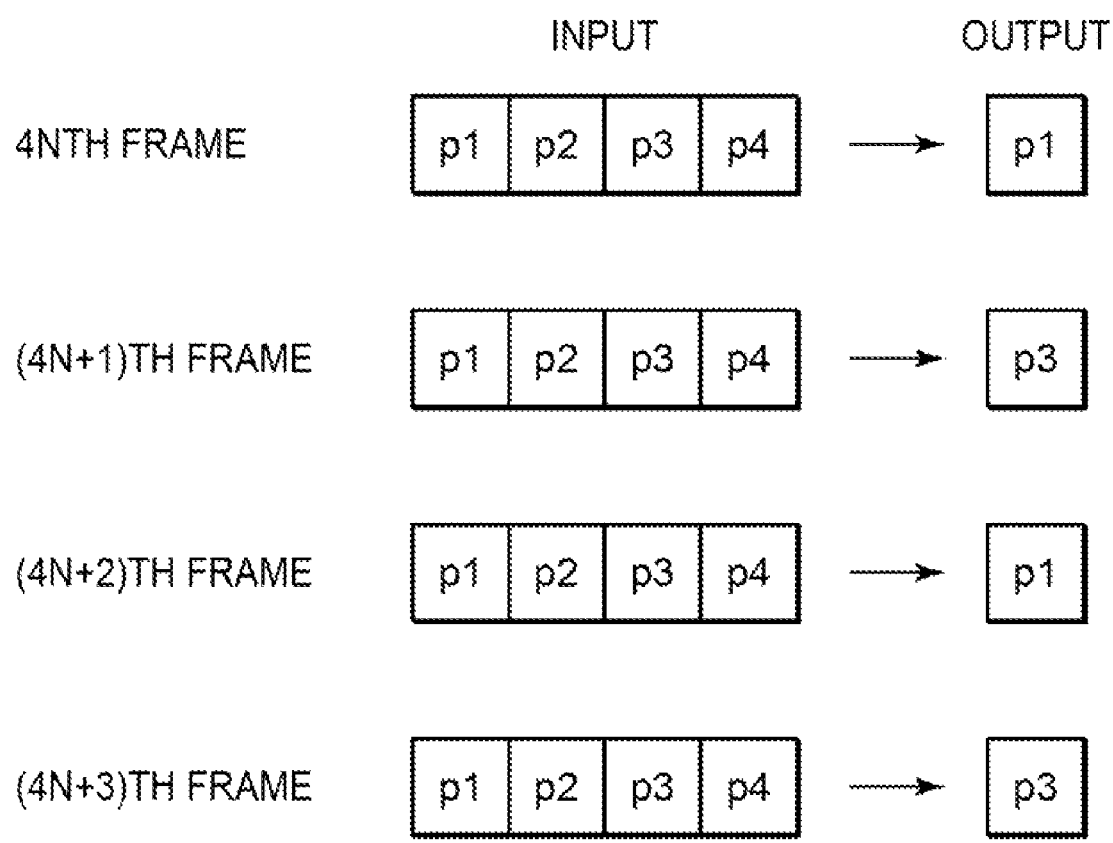
FIG. 54 is a diagram explaining an example of the spatial pixel decimation processing performed by the decimation executing unit.

Decimation processing shown in FIG. 54 is pixel decimation processing in which the sampling point phase change amount equals 2 pixels/frame. When the sampling point phase change amount equals 2 pixels/frame, the sampling point position changes to right by 2 pixels every time frame number increments. Namely, representing the currently processed frame number as 4N+k, and the coordinates of the leftmost pixel of the 4 pixels as (X, Y), processing is performed in which the value of a pixel staying at a position (X+(2k MOD 4), Y) is set as a value representing the 4 pixels, i.e., as a sampling point, where MOD means modulo. It should be noted that the value of a pixel staying at a position (X+(2k MOD M), Y) is the sampling point for a generalized decimation amount M.

In the pixel decimation processing with the sampling point phase change amount being 2 pixels/frame shown in FIG. 54, if the sampling point in a frame 0 is p1, decimation processing in which the pixel position of the sampling point within a block consisting of 4×4 pixels is shifted to right by 2 pixels as forwarding the frame is performed repeatedly in units of 2 frames, as follows;

4Nth frame: sampling point =p1;
(4N+1)th frame: sampling point =p3;
(4N+2)th frame: sampling point =p1; and
(4N+3)th frame: sampling point =p3.

Decimation Processing with Sampling Point Phase Change Amount =3

Next, a decimation processing example will be described in which the sampling point phase change amount [Vp] inputted from the sampling point phase change amount determining unit 306 is 3. It should be noted that this processing example is equivalent to decimation processing with the sampling point phase change amount [Vp]=−1, if it is ¼ decimation processing.

Figure 55:
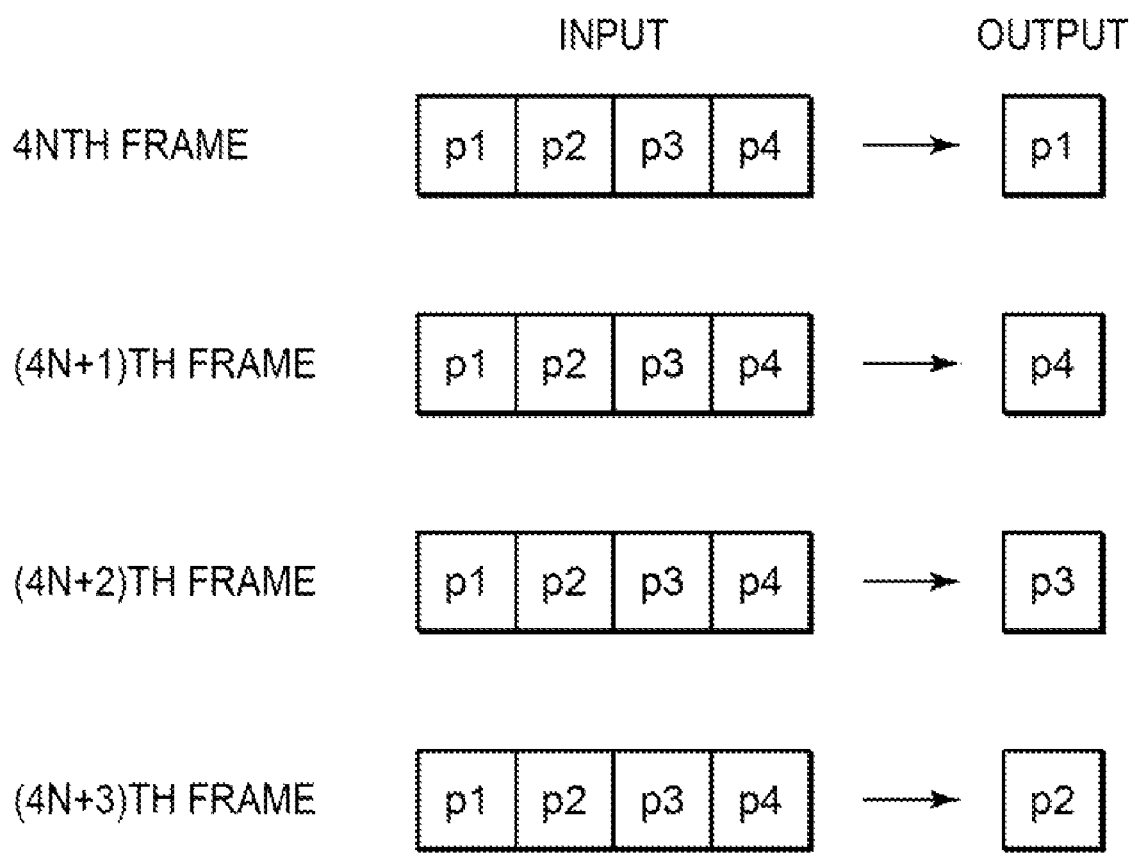
FIG. 55 is a diagram explaining an example of the spatial pixel decimation processing performed by the decimation executing unit.

Decimation processing shown in FIG. 55 is pixel decimation processing in which the sampling point phase change amount, equals 3 pixels/frame. When the sampling point phase change amount equals 3 pixels/frame, the sampling point position changes to right by 3 pixels every time the frame number increments. Namely, representing the currently processed frame number as 4N+k, and the coordinates of the leftmost, pixel of the 4 pixels as (X, Y), processing is performed in which the value of a pixel staying at a position (X+(3k MOD 4), Y) is set as a value representing the 4 pixels, i.e., as a sampling point. It should be noted that the value of a pixel staying at a position (X+(3k MOD M), Y) is the sampling point for the generalized decimation amount M.

In the pixel decimation processing with the sampling point phase change amount being 3 pixels/frame shown in FIG. 55, if the sampling point in a frame 0 is p4, decimation processing in which the pixel position of the sampling point within a block consisting of 4×4 pixels is shifted to left by 1 pixel as forwarding the frame is performed repeatedly in units of 4 frames, as follows:

4Nth frame: sampling point=p4;
(4N+1)th frame; sampling point =p3;
(4N+2)th frame: sampling point =p2; and
(4N+3)th frame: sampling point =p1.

Thus, the decimation processing shown in FIGS. 53 to 55 is decimation processing in which the pixel position of a different sampling point is set as a pixel value representing the values of 4 pixels in each of frames. It should be noted that the above processing deals with the cases where the decimation amount M=4.

Figure 56:
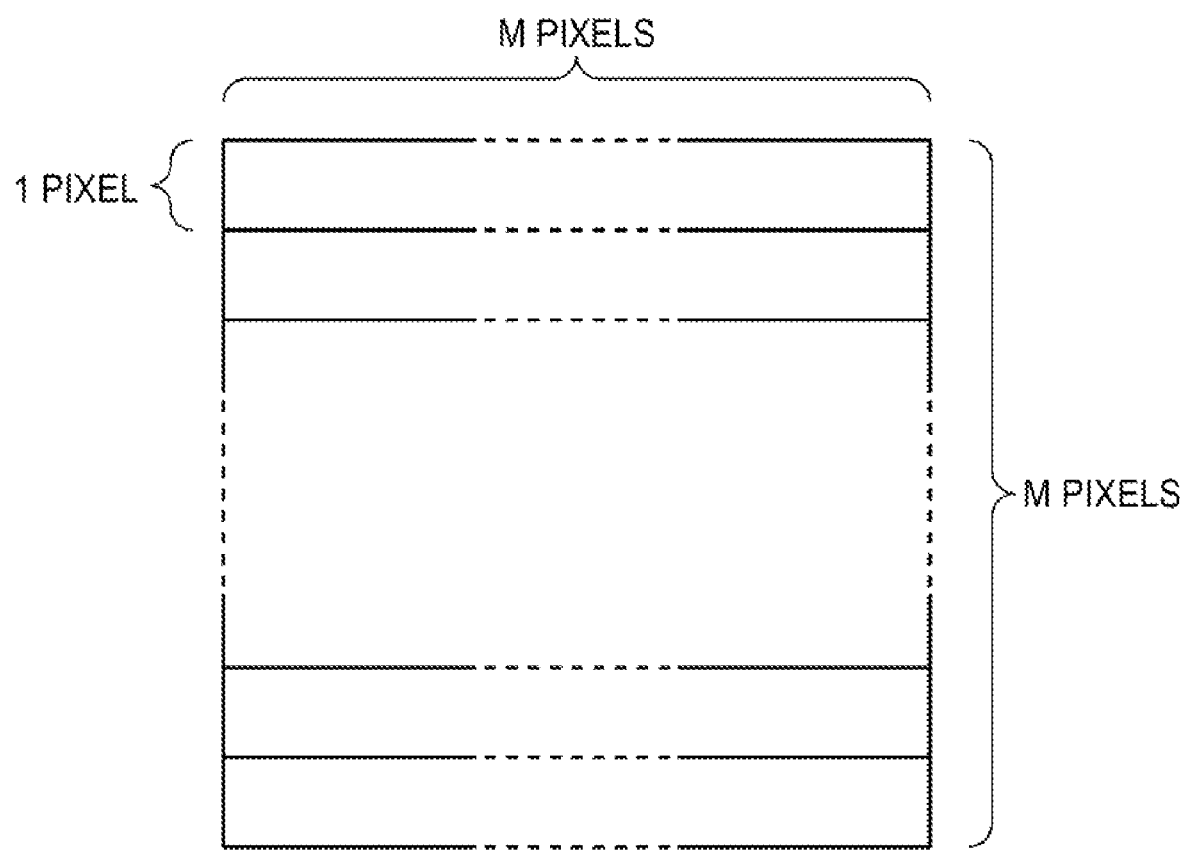
FIG. 56 is a diagram explaining an example of the spatial pixel decimation processing performed by the decimation executing unit.
Figure 57:
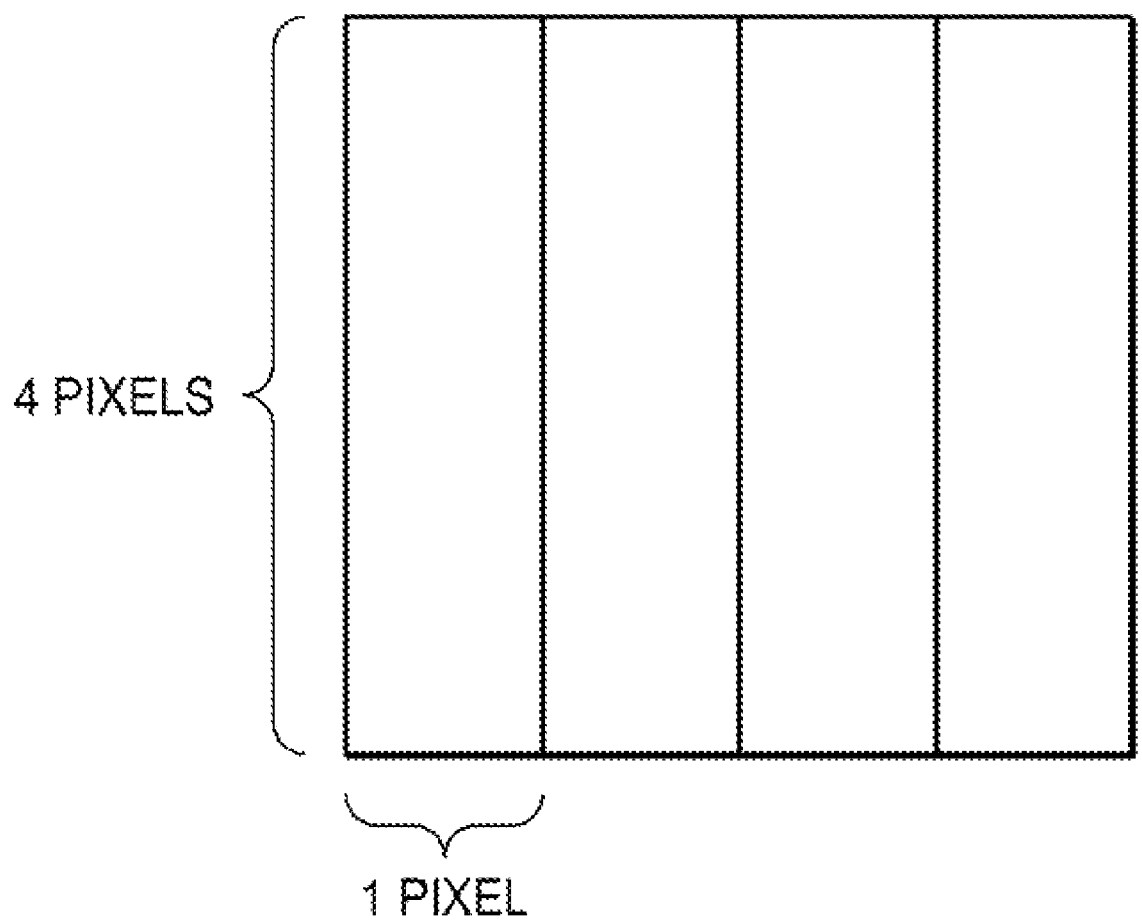
FIG. 57 is a diagram explaining an example of the spatial pixel decimation processing performed by the decimation executing unit.

Processing will be described in which the decimation amount M is set to an arbitrary number. Typically, when the decimation amount is M, the decimation executing unit 303 first divides a block of M×M into a set of groups each consisting of 1 pixel (long)×M pixels (wide), as shown in FIG. 56. It should be noted that the sampling point phase change amount P can take values ranging from 0 to M=1. At this time, representing the currently processing frame number as MN+k, and the coordinates of the leftmost pixel of the M pixels as (X, Y), the decimation executing unit 303 sets the value of a pixel staying at the position of (X+(P×k MOD M), Y) as a value representing the M pixels, i.e., as a sampling point.

Referring to FIGS. 57 to 62, pixel decimation in the vertical direction will be described. To perform the pixel decimation processing in the vertical direction, the decimation executing unit 303 first divides a block consisting of 4×4 pixels into a set of groups each consisting of 1 pixel (long)×4 pixels (wide). Furthermore, the decimation executing unit 303 performs pixel decimation processing for replacing the pixel values p1 to p4 of 4×1 pixels in each group with one of these pixel values according to one of modes shown in FIGS. 58 to 61.

Decimation Processing with Sampling Point Phase Change Amount =0

Next, a decimation processing example will be described in which the sampling point phase change amount [Vp] inputted from the sampling point phase change amount determining unit 306 is 0.

Figure 58:
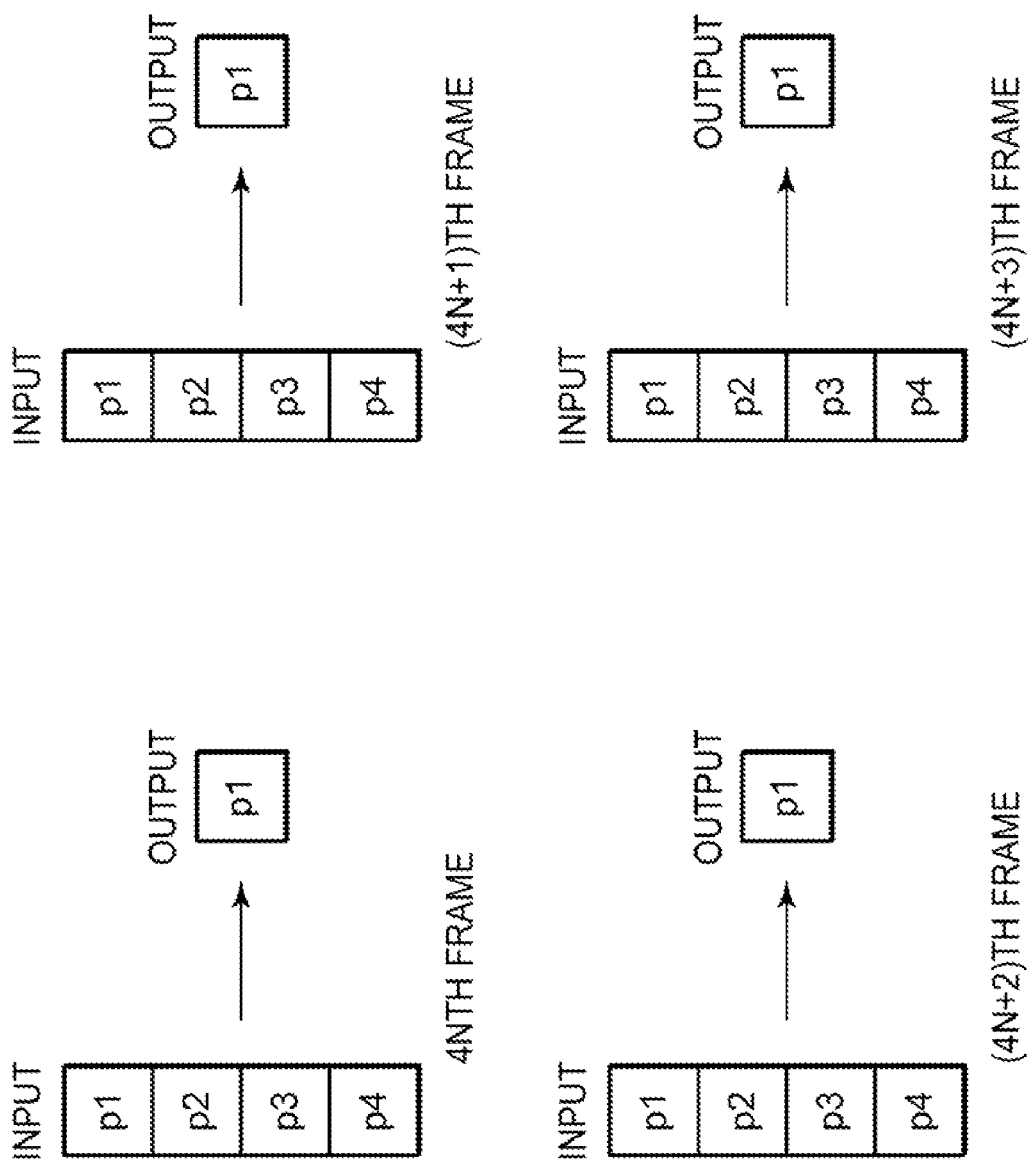
FIG. 58 is a diagram explaining an example of the spatial pixel decimation processing performed by the decimation executing unit.

Decimation processing shown in FIG. 58 is pixel decimation processing in which the sampling point phase change amount equals 0 pixel/frame. When the sampling point, phase change amount equals 0 pixel/frame, processing is performed in which the value of a pixel staying at the same position in all of frames is set as a value representing 4 pixels, i.e., as a sampling point, irrespective of the current frame number (where the current frame occurs in a sequence of the frames from the start of the processing). While p1 is the sampling point in an example of FIG. 58, any of the pixel values p1 to p4 may be the sampling point.

Decimation Processing with Sampling Point Phase Change Amount =1

Next, a decimation processing example will be described in which the sampling point phase change amount [Vp] inputted from the sampling point phase change amount determining unit 306 is 1. It should be noted that this processing example is equivalent to decimation processing with the sampling point phase change amount [Vp]=−3, if it is ¼ decimation processing.

Figure 59:
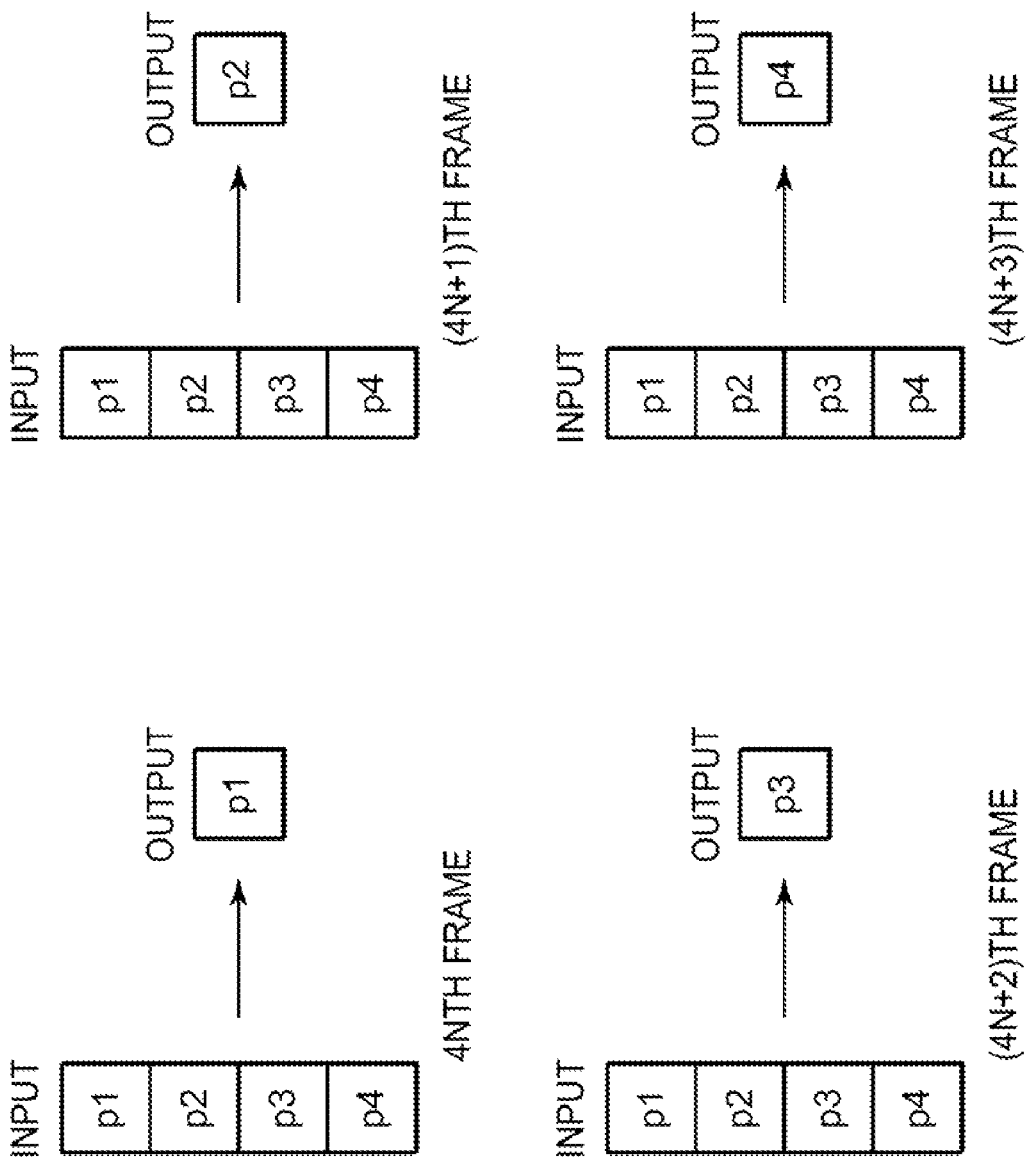
FIG. 59 is a diagram explaining an example of the spatial pixel decimation processing performed by the decimation executing unit.

Decimation processing shown in FIG. 59 is pixel decimation processing in which the sampling point phase change amount equals 1 pixel/frame. When the sampling point phase change amount equals 1 pixel/frame, the sampling point position changes down (when the down direction is set as being positive) by 1 pixel every time the frame number increments. Namely, representing the currently processed frame number as 4N+k (k=0, 1, 2, 3), and the coordinates of the uppermost pixel of the 4 pixels as (X, Y), processing is performed in which the value of a pixel staying at a position (X, Y+k) is set as a value representing the 4 pixels, i.e., as a sampling point. It should be noted that the range of k for a decimation amount M is from 0 to M−1.

In the pixel decimation processing with the sampling point phase change amount being 1 pixel/frame shown in FIG. 59, if the sampling point in a frame 0 is p1, decimation processing in which the pixel position of the sampling point within a block consisting of 4×4 pixels is shifted down by 1 pixel as forwarding the frame is performed repeatedly in units of 4 frames, as follows;

4Nth frame (0th, 4th, 3th frames): sampling point =p1;
(4N+1)th frame; (1st, 5th, 9th frames) sampling point =p2;

(4N+2)th frame; (2nd, 6th, 10th frames) sampling point = p3; and (4N+3)th frame: (3rd, 7th, 11th frames) sampling point = p4.

Decimation Processing with Sampling Point Phase Change Amount =2

Next, a decimation processing example will, be described in which the sampling point phase change amount [Vp] inputted from the sampling point phase change amount determining unit 306 is 2. It should be noted that this processing example is equivalent to decimation processing with the sampling point phase change amount [Vp]=−2, if it is ¼ decimation processing.

Figure 60:
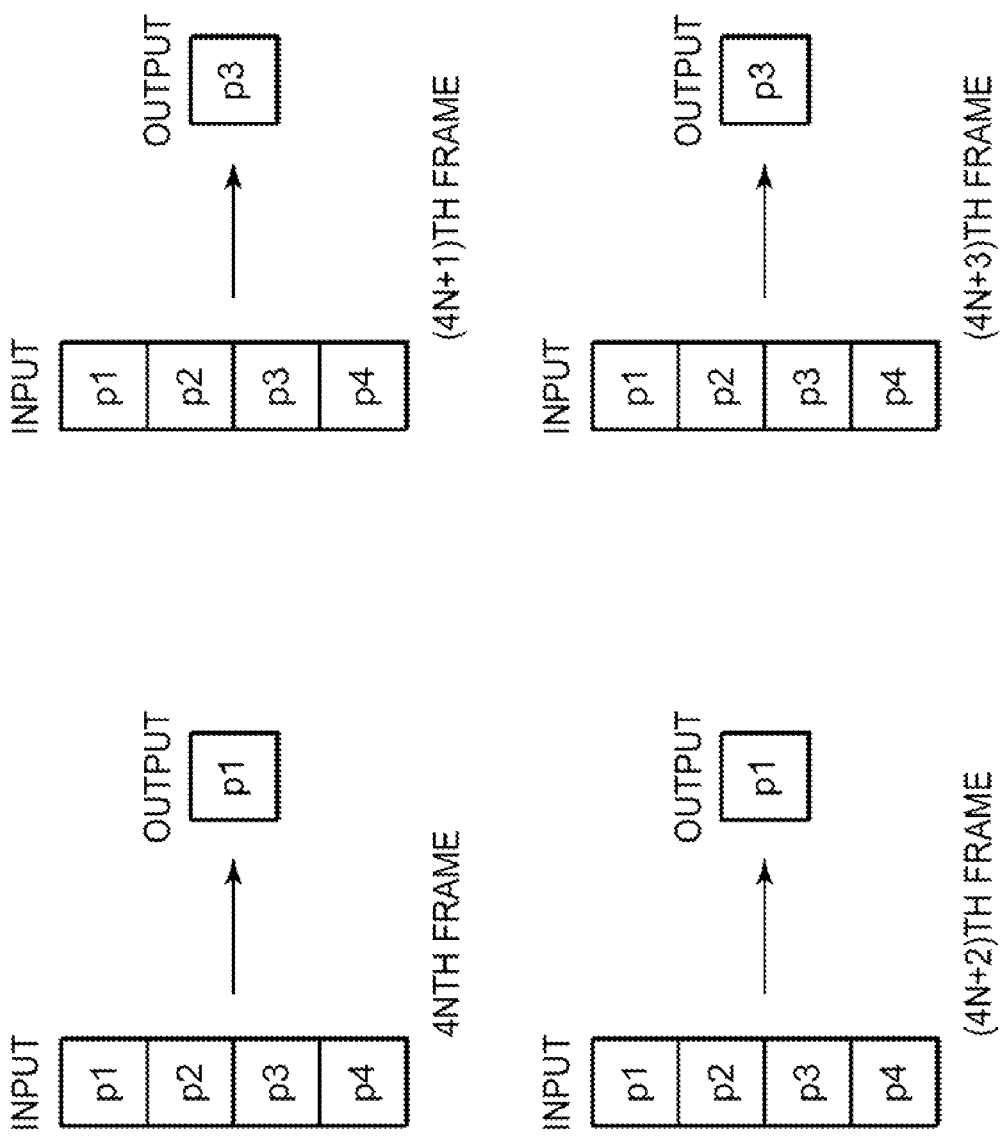
FIG. 60 is a diagram explaining an example of the spatial pixel decimation processing performed by the decimation executing unit.

Decimation processing shown in FIG. 60 is pixel decimation processing in which the sampling point phase change amount equals 2 pixels/frame. When the sampling point phase change amount equals 2 pixels/frame, the sampling point position changes down by 2 pixels every time the frame number increments. Namely, representing the currently processed frame number as 4N+k, and the coordinates of the uppermost pixel of the 4 pixels as (X, Y), processing is performed in which the value of a pixel staying at a position (X, Y+(2×k MOD 4)) is set as a value representing the 4 pixels, i.e., as a sampling point. It should be noted that the value of a pixel staying at a position (X, Y t (2×k MOD M)) is the sampling point for a generalised decimation amount M.

In the pixel decimation processing with the sampling point phase change amount being 2 pixels/frame shown in. FIG. 60, if the sampling point in a frame 0 is p1, decimation processing in which the pixel position of the sampling point within a block consisting of 4×4 pixels is shifted down by 2 pixels as forwarding the frame is performed repeatedly in units of 2 frames, as follows:

4Nth frame: sampling point =p1;
(4N+1)th frame: sampling point =p3;
(4N+2)th frame: sampling point =p1; and
(4N+3)th frame: sampling point =p3.

Decimation Processing with Sampling Point Phase Change Amount =3

Next, a decimation processing example will be described in which the sampling point phase change amount [Vp] inputted from the sampling point phase change amount determining unit 306 is 3. It should be noted that this processing example is equivalent to decimation processing with the sampling point phase change amount [Vp]=−1, if it is ¼ decimation processing.

Figure 61:
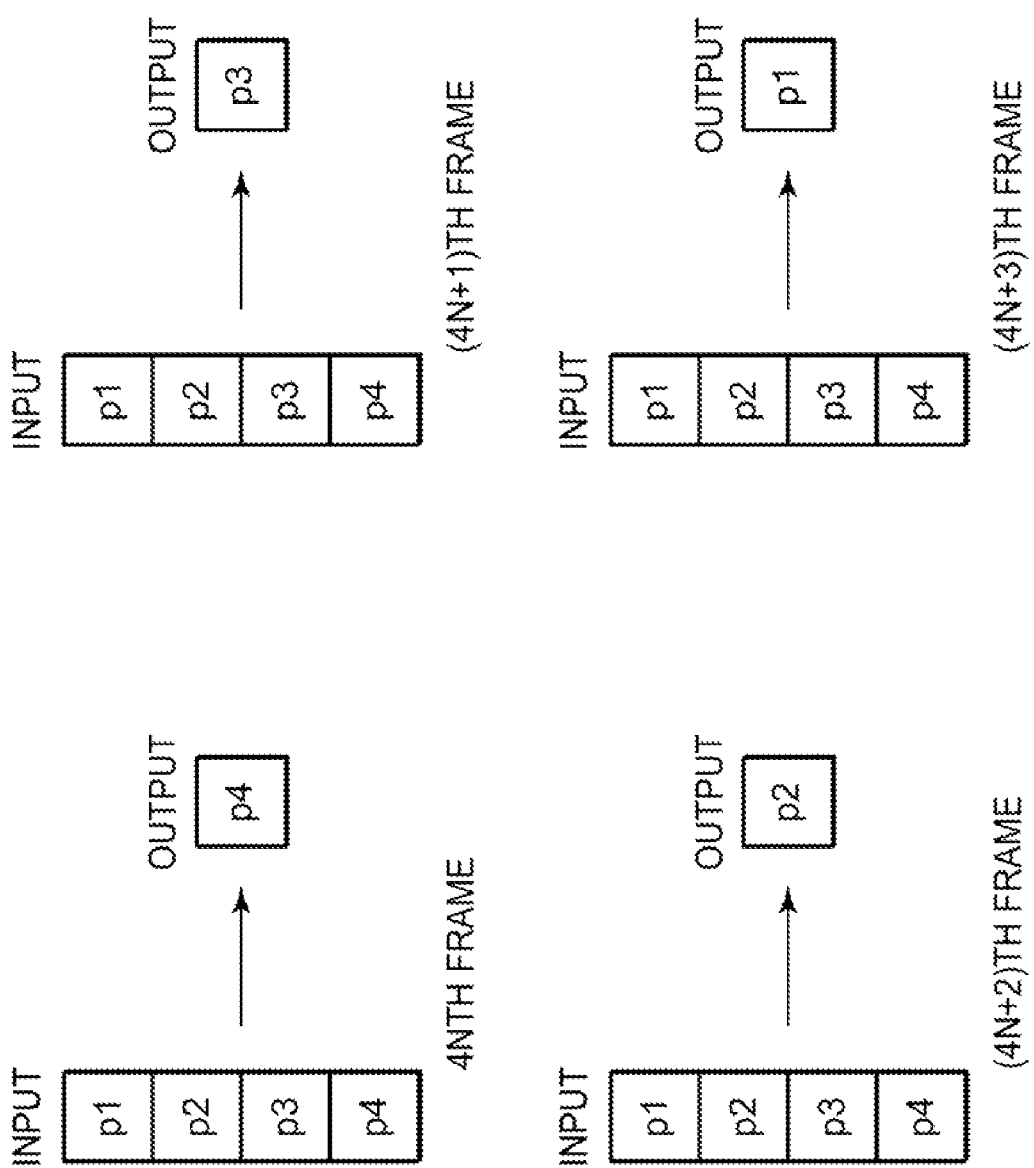
FIG. 61 is a diagram explaining an example of the spatial pixel decimation processing performed by the decimation executing unit.

Decimation processing shown in FIG. 61 is pixel decimation processing in which the sampling point, phase change amount equals 3 pixels/frame. When the sampling point phase change amount equals 3 pixels/frame, the sampling point position changes down by 3 pixels every time the frame number increments. Namely, representing the currently processed frame number as 4N+k, and the coordinates of the uppermost pixel of the 4 pixels as (X, Y), processing is performed in which the value of a pixel staying at a position (X, Y+(3×k MOD 4)) is set as a value representing the 4 pixels, i.e., as a sampling point. It should be noted that the value of a pixel staying at a position (X, Y+(3×k MOD M)) is the sampling point for the generalised decimation amount M.

In the pixel decimation processing with the sampling point phase change amount being 3 pixels/frame shown in FIG. 61, if the sampling point in a frame 0 is p4, decimation processing in which the pixel position of the sampling point within a block consisting of 4×4 pixels is shifted up by 1 pixel as forwarding the frame is performed repeatedly in units of 4 frames, as follows;

4Nth frame: sampling point =p4;
(4N+1)th frame: sampling point =p3;
(4N+2)th frame: sampling point =p2; and
(4N+3)th frame: sampling point =p1.

Thus, the decimation processing shown in FIGS. 59 to 61 is decimation processing in which the pixel position of a different, sampling point is set as a pixel value representing the values of 4 pixels in each of frames. It should be noted that the above processing deals with the cases where the decimation amount M=4.

Figure 62:
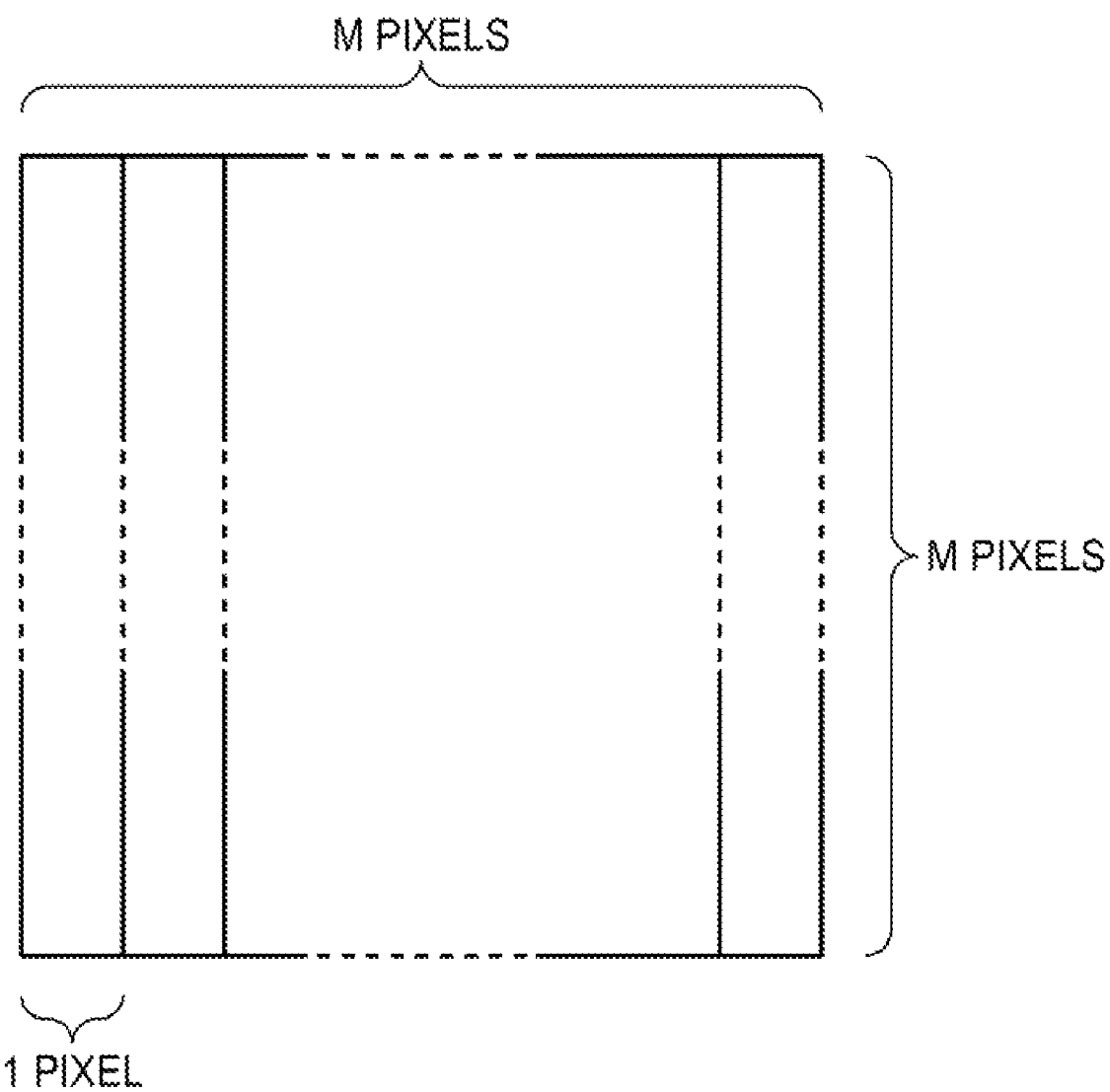
FIG. 62 is a diagram explaining an example of the spatial pixel decimation processing performed by the decimation executing unit.

Processing will be described in which the decimation amount M is set to an arbitrary number. Typically, when the decimation amount is M, the decimation executing unit 303 first divides a block consisting of M×M into a set of groups each consisting of 1 pixel (long)×M pixels (wide), as shown in FIG. 62. It should be noted that the sampling point phase change amount P can take values ranging from 0 to M−1. At this time, representing the currently processing frame number as MN+k, and the coordinates of the uppermost pixel of the M pixels as (X, Y), the decimation executing unit 303 sets the value of a pixel staying at a position (X, Y+(P×k MOD M)) as a value representing the M pixels, i.e., as a sampling point.

Finally, the output unit 304 will be described. The output unit 304 outputs data on data-reduced blocks supplied thereto from the decimation executing unit 303 or on original blocks, and information about what processing is performed on each block. Information about the processing content includes information indicating whether or not decimation processing is performed, information indicating in which direction (horizontal/vertical) decimation processing is performed if spatial decimation processing is performed, information indicating a sampling point phase change amount in the spatial decimation processing, and information related to the frame rate and space resolution of an original moving image. Other information may also be added.

It should be noted that downstream of the output unit 304, a storage medium such as, e.g., a hard disk or a DVD, or a network output means is connected, whereby data compressed by data conversion is stored, or is outputted via a network.

The present invention has been described above in great detail with reference to the specific embodiments. However, it is self-explanatory that those skilled in the art can make modifications to and substitutions for the embodiments without departing from the scope and spirit of the present invention. Namely, the present invention has been disclosed by way of examples, and thus should not be construed in a restrictive sense. In order to judge the scope and the spirit of the present invention, the appended claims should be taken into consideration.

Furthermore, the series of processing described in the specification can be performed by hardware, software, or a configuration in which both are combined. In a case where processing based on software is executed, the processing could be executed by installing a program having recorded processing sequences therein in a memory within a computer incorporated into dedicated hardware, or by installing the program in a general-purpose computer that can execute various processing.

For example, the program can be recorded on a hard disk or a ROM (Read Only Memory) as a recording medium beforehand. Alternatively, the program can be stored (recorded) temporarily or permanently on a removable recording medium, such as a flexible disk, a CD-ROM (Compact Disc Read Only Memory), a MO (Magneto Optical) disk, a DVD (Digital Versatile Disc), a magnetic disk, or a semiconductor memory. Such a removable recording medium can be provided as so-called package software.

It should be noted that the program can be installed in a computer not only from a removable recording medium such as those mentioned above, but also through wireless transmission to the computer from a downloading site, wired transmission to the computer via a network such as a LAN or the Internet to allow the computer to receive the thus transmitted program for installation in a storage medium such as a hard disk incorporated therein.

It should be noted that the various processing described in the specification is executed net only time-sequentially according to the description, but may also be executed in parallel or separately, as necessary, according to the processing capacity of an apparatus assigned to execute the processing. In addition, the system used in the present specification means a logical set configuration of a plurality of apparatuses, and is not limited to one wherein apparatuses each having its own configuration are grouped within the same enclosure.

As described in the foregoing, according to an embodiment of the present invention, it is configured to determine an optimal compression processing mode corresponding to the motion of an object within an image and to the motion of the viewer's line of sight, and perform data conversion processing in the optimal mode for each of areas according to the determined mode. Therefore, a moving image converting apparatus can be realised which enables data reduction processing independent of the motion of the viewer's line of sight and with extremely small image quality degradation.

According to an embodiment of the present invention, it is configured to detect an object motion amount (block motion amount [Vs]) and a line-of-sight motion amount [Ve] in each of blocks forming moving image data, determines sampling point phase change amount [Vp] on the basis of the detected object motion amount and line-of-sight motion amount, and execute spatial decimation processing by applying the determined sampling point phase change amount [Vp]. Therefore, when the viewer views the object by following its motion, the super-resolution effect can be induced, and even when the viewer does not view the object by following its motion, change in the arrangement of pixels forming the image can be minimized, whereby a moving image converting apparatus realizing data conversion in which image quality degradation is suppressed can be provided.

Furthermore, according to an embodiment of the present invention, it is configured, in spatial decimation processing with a decimation amount M, to select a plurality of optimal sampling point phase change amount candidates for obtaining image quality ratings which are equal to or greater than a preset reference rating with respect to the motion velocity of a block for processing under a motion-following viewing condition, using mapping data between the object motion velocity (or motion amount) and the image quality rating, which is generated on the basis of decimated data obtained by decimation processing with sampling point phase change amounts ranging from 0 to M−1, and to further select an optimal sampling point phase change amount for a non-motion-following viewing condition, from among the candidates. Therefore, a moving image converting apparatus can be provided which realizes data conversion enabling presentation of high-quality images corresponding to various motion amounts of a block for processing and various line-of-sight motions of a viewer.

The present application contains subject matter related to Japanese Patent Applications JP 2006-184973 filed in the Japanese Patent Office on Jul. 4, 2006, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A moving image converting apparatus for executing data conversion processing of moving image data, the apparatus comprising:

a block dividing unit for executing block division processing for each frame that forms the moving image data;

a motion amount detecting unit for detecting a block motion amount corresponding to the motion amount of an object contained in each of a plurality of blocks obtained by the block division processing in the block dividing unit;

a line-of-sight motion amount detecting unit for calculating a line-of-sight motion amount of a viewer who views the moving image data;

a sampling point phase change amount determining unit for receiving the block motion amount and the line-of-sight motion amount as input, and for determining a block-corresponding sampling point phase change amount to be applied to spatial decimation processing on each of the blocks, wherein the sampling point phase change amount determining unit is configured to execute the sampling point phase change amount determination processing, to which image quality rating curves as results of measurement of image quality rating corresponding to various values of the block motion amounts are applied, such that the sampling point phase change amount determining unit executes a first step processing of selecting sampling point phase change amount candidates that obtain the ratings equal to or above the present reference rating in the image quality rating curves on the basis of the block motion amount, and a second step processing of analyzing the sampling point phase change amount candidates selected in the first processing to check if pixel inversion is caused or not in an image perceived by a viewer who views a played-back image obtained by reconstructing an image converted by the moving image converting apparatus, whereby to select a sampling point phase change amount that does not cause the pixel inversion in the perceived image; and a decimation executing unit for receiving the blocks obtained by the block division processing in the block dividing unit as input, and for executing the spatial decimation processing being executed by applying the block-corresponding sampling point phase change amount determined by the sampling point phase change amount determining unit, and wherein the block-corresponding sampling point phase change amount is determined by selecting a sampling point phase change amount which corresponds to a rating equal to or above the present reference rating.

2. The moving image converting apparatus according to claim 1, wherein the line-of-sight motion amount detecting unit is configured to calculate the line-of-sight motion amount corresponding to each of the blocks obtained by the block division processing in the block dividing unit, and among block motion amounts, the apparatus is configured to calculate a block motion amount having a higher occurrence as the line-of-sight motion amount, the block motion amounts corresponding to blocks contained in a block expansion area which is an area up to which a block for calculation of the line-of-sight motion amount is expanded, and the block expansion area containing the block for calculating the line-of-sight motion amount.

3. The moving image converting apparatus according to claim 1, wherein
the line-of-sight motion amount detecting unit is configured to calculate a line-of-sight motion amount by analyzing a line of sight of a viewer who views a moving image to be subjected to the processing.

4. The moving image converting apparatus according to claim 1, wherein
in the selecting the sampling point phase change amount that does not cause the pixel inversion in the perceived image, the sampling point phase change amount determining unit executes determination processing to which the block motion amount, the line-of-sight motion amount, and a sampling point change amount in a retina coordinate system are applied.

5. The moving image converting apparatus according to claim 1, wherein
the sampling point phase change amount determining unit is configured to execute processing of determining a sampling point phase change amount for one of 0 to (M−1),
if the spatial decimation processing executed by the decimation executing unit is 1/M decimation processing for reducing the number of pixels to 1/M.

6. The moving image converting apparatus according to claim 1, wherein
the decimation processing unit is configured to determine a decimation processing mode on the basis of a horizontal motion amount Vx and a vertical motion amount Vy of the block obtained from block motion amount information inputted from the motion amount detecting unit, and a preset threshold Vt, and
executes pixel decimation processing in a horizontal direction
if Vx>Vy and Vx>Vt, and
executes pixel decimation processing in a vertical direction if Vy>Vx and Vy>Vt, and
executes no spatial pixel decimation processing
if both Vx and Vy are below Vt.

7. A moving image converting method for executing data conversion processing of moving image data in a moving image converting apparatus, the method comprising:
executing block division processing for each frame that forms the moving image data, in a block dividing unit;
detecting a block motion amount corresponding to a motion amount of an object contained in each of a plurality of blocks obtained by the block division processing in the block dividing unit, in a motion amount detecting unit;
calculating a line-of-sight motion amount of a viewer who views the moving image data, in a line-of-sight motion amount detecting unit;
receiving the block motion amount and the line-of-sight motion amount as input, and determining a block corresponding sampling point phase change amount to be applied to spatial decimation processing on each of the blocks, in a sampling point phase change amount determining unit, wherein in the sampling point phase change amount determining, sampling point phase change amount determination processing is executed, the sampling point phase change amount determination processing being processing to which image quality rating curves as results of measurement of image quality rating corresponding to various values of the block motion amounts are applied, and wherein in the sampling point phase change amount determining, a first step processing and a second step processing are executed,
the first step processing selects sampling point phase change amount candidates that obtain the ratings equal to or above the preset reference rating in the image quality rating curves on the basis of the block motion amount, and
the second step processing analyzes the sampling point phase change amount candidates selected in the first step processing to check if pixel inversion is caused or not in an image perceived by the viewer who views a played-back image obtained by reconstructing an image converted by the moving image converting apparatus, whereby to select a sampling point phase change amount that does not cause the pixel inversion in the perceived image; and
receiving the blocks obtained by the block division processing in the block dividing unit as input, executing the spatial decimation processing on the inputted blocks, and executing the spatial decimation processing to which the block-corresponding sampling point phase change amount determined by the sampling point phase change amount determining unit is applied, in a decimation processing unit, wherein the block-corresponding sampling point phase change amount is determined by selecting a sampling point phase change amount which corresponds to a rating equal to or above a preset reference rating.

8. The moving image converting method according to claim 7, wherein
in the line-of-sight motion amount detecting, the line-of-sight motion amount corresponding to each of the blocks obtained by the block division processing in the block dividing unit is calculated, and
among block motion amounts, a block motion amount having a higher occurrence is calculated as the line-of-sight motion amount, the block motion amounts corresponding to blocks contained in a block expansion area which is an area up to which a block for calculation of the line-of-sight motion amount is expanded, and the block expansion area containing the block for calculating the line-of-sight motion amount.

9. The moving image converting method according to claim 7, wherein
in the line-of-sight motion amount detecting, the line-of-sight motion amount is calculated by analyzing a line of sight of a viewer who views a moving image for processing.

10. The moving image converting method according to claim 7, wherein
in the selecting the sampling point phase change amount that does not cause the pixel inversion in the perceived image, the sampling point phase change amount determining executes determination processing to which the block motion amount, the line-of-sight motion amount, and a sampling point change amount in a retina coordinate system are applied.

11. The moving image converting method according to claim 7, wherein
in the sampling point phase change amount determining, processing of determining a sampling point phase change amount for one of 0 to (M−1),
if the spatial decimation processing executed by the decimation executing unit is 1/M decimation processing for reducing the number of pixels to 1/M.

12. The moving image converting method according to claim 7, wherein
 in the decimation processing
  a decimation processing mode on the basis of a horizontal motion amount Vx and a vertical motion amount Vy of the block obtained from block motion amount information inputted from the motion amount detecting unit, and a preset threshold Vt, and
  the pixel decimation processing is executed in a horizontal direction
   if Vx>Vy and Vx>Vt,
  the pixel decimation processing is executed in a vertical direction
   if Vy>Vx and Vy>Vt, and
  no spatial pixel decimation processing is executed
   if both Vx and Vy are below Vt.

13. A non-transitory computer readable medium storing a computer program for causing a moving image converting apparatus to execute data conversion process of moving image data, the program comprising the steps of:
 a block dividing step of executing block division processing for each frame that forms the moving image data, in a block dividing unit;
 a motion amount detecting step of detecting a block motion amount corresponding to a motion amount of an object contained in each of a plurality of blocks obtained by the block division processing in the block dividing unit, in a motion amount detecting unit;
 a line-of-sight motion amount detecting step of calculating a line-of-sight motion amount of a viewer who views the moving image data, in a line-of-sight motion amount detecting unit;
 a sampling point phase change amount determining step of receiving the block motion amount and the line-of-sight motion amount as input, and determining a block-corresponding sampling point phase change amount applied to spatial decimation processing on each of the blocks, in a sampling point phase change amount determining unit,
 wherein in the sampling point phase change amount determining step, sampling point phase change amount determination processing is executed, the sampling point phase change amount determination processing being processing to which image quality rating curves as results of measurement of image quality rating corresponding to various values of the block motion amounts are applied, and wherein in the sampling point phase change amount determining step, a first step processing and a second step processing are executed,
  the first step processing selects sampling point phase change amount candidates that obtain the ratings equal to or above the preset reference rating in the image quality rating curves on the basis of the block motion amount, and
  the second step processing analyzes the sampling point phase change amount candidates selected in the first step processing to check if pixel inversion is caused or not in an image perceived by the viewer who views a played-back image obtained by reconstructing an image converted by the moving image converting apparatus, whereby to select a sampling point phase change amount that does not cause the pixel inversion in the perceived image; and
 a decimation executing step of receiving the blocks obtained by the block division processing in the block dividing unit as input, executing the spatial decimation processing on the inputted blocks, and executing the spatial decimation processing to which the block-corresponding sample point phase change amount determined by the sampling point phase change amount determining unit is applied, in a decimation processing unit, wherein the block-corresponding sampling point phase change amount is determined by selecting a sampling point phase change amount which corresponds to a rating equal to or above a preset reference rating.

* * * * *